(12) United States Patent
Xia et al.

(10) Patent No.: US 11,337,222 B2
(45) Date of Patent: May 17, 2022

(54) COORDINATED STATIONS IN A SINGLE BSS WITH SHARED TXOP IN THE FREQUENCY DOMAIN

(71) Applicant: SONY GROUP CORPORATION, Tokyo (JP)

(72) Inventors: Qing Xia, San Jose, CA (US); Mohamed Abouelseoud, San Francisco, CA (US); Liangxiao Xin, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/141,840

(22) Filed: Jan. 5, 2021

(65) Prior Publication Data
US 2021/0410149 A1    Dec. 30, 2021

Related U.S. Application Data

(60) Provisional application No. 63/043,217, filed on Jun. 24, 2020.

(51) Int. Cl.
*H04W 72/08* (2009.01)
*H04W 74/00* (2009.01)
*H04W 72/12* (2009.01)
*H04W 72/00* (2009.01)
*H04W 72/04* (2009.01)
*H04W 84/12* (2009.01)

(52) U.S. Cl.
CPC ......... *H04W 72/08* (2013.01); *H04W 72/005* (2013.01); *H04W 72/044* (2013.01); *H04W 72/1242* (2013.01); *H04W 72/1268* (2013.01); *H04W 72/1284* (2013.01); *H04W 74/004* (2013.01); *H04W 84/12* (2013.01)

(58) Field of Classification Search
CPC . H04W 72/005; H04W 72/044; H04W 72/08; H04W 72/1242; H04W 72/1268; H04W 72/1284; H04W 74/004; H04W 84/12
See application file for complete search history.

(56) References Cited

U.S. PATENT DOCUMENTS

| | | | |
|---|---|---|---|
| 10,966,152 B2 * | 3/2021 | Wang | H04W 72/0446 |
| 2014/0269544 A1 | 9/2014 | Zhu et al. | |
| 2018/0027591 A1 | 1/2018 | Shinohara | |
| 2019/0029037 A1 | 1/2019 | Wang et al. | |
| 2021/0315009 A1 * | 10/2021 | Xia | H04W 12/06 |
| 2021/0410163 A1 * | 12/2021 | Xia | H04W 72/005 |

FOREIGN PATENT DOCUMENTS

WO    WO-2017/106457 A1    6/2017

* cited by examiner

*Primary Examiner* — Kashif Siddiqui
(74) *Attorney, Agent, or Firm* — O'Banion & Ritchey LLP; John P. O'Banion

(57) ABSTRACT

A wireless local area network (WLAN) protocol allowing a Transmit Opportunity (TXOP) holder to share the TXOP with other stations acting cooperatively. An intent to share the TXOP is communicated to other stations that a TXOP is available for sharing, and notifying the Access Point (AP) station of the stations willing to join that TXOP. When the TXOP occurs, the stations can access the channel over different frequency domain simultaneously and for the duration specified, thus providing increased use of the TXOP to improve efficiency.

24 Claims, 55 Drawing Sheets

FIG. 46

| Element ID | Length | STA Info 1 | ... | STA Info n |
|---|---|---|---|---|
Octets: 1 | 1 | 2 | | 2

| AID | TXOP share holder | TXOP share participant | Reserved |
|---|---|---|---|
| B0  B7 | B8 | B9 | B10  B15 |
Bits: 8 | 1 | 1 | 6

| Frame Control | Duration | RA | TA | BSS ID | STA Share Offer/Request 1 | ... | STA Share/Request n | FCS |
|---|---|---|---|---|---|---|---|---|
Octets: 2 | 2 | 6 | 6 | 6 | 4 | | 4 | 4

| Priority | STA AID | TXOP Share Request | TXOP Resource Request | TXOP Share Offered | TXOP Resource Offered | Reserved |
|---|---|---|---|---|---|---|
| B0  B3 | B4  B11 | B12 | B13  B18 | B19 | B20  B25 | B26  B31 |
Bits: 4 | 8 | 1 | 6 | 1 | 6 | 6

| Frame Control | Duration | RA | TA | STA TXOP Access Allocation 1 | ... | STA TXOP Access Allocation n | FCS |
|---|---|---|---|---|---|---|---|
| 2 | 2 | 6 | 6 | 6 | ... | 6 | 4 |

Octets:

| TXOP Holder MAC Address | TXOP Participant MAC Address | Allocation Control Info |
|---|---|---|
| 1 | 1 | 4 |

Octets:

| Priority | AID12 | UL BW | RU Allocation | Reserved |
|---|---|---|---|---|
| 4 | 12 | 4 | 8 | 4 |

B0  B3 B4          B15 B16    B19 B20       B27 B28    B31

Bits:

↙ 1290

COORDINATED STATIONS IN A SINGLE BSS WITH SHARED TXOP IN THE FREQUENCY DOMAIN

This application claims priority to, and the benefit of, U.S. provisional patent application Ser. No. 63/043,217 filed on Jun. 24, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communication, and more particularly to sharing a transmit opportunity (TXOP) with other stations in a single Basic Service Set (BSS) scenario in the frequency domain.

2. Background Discussion

Use of Wi-Fi networks are growing rapidly, with fast developments in novel applications and an increasing number of smart-devices accessing the internet through Wi-Fi, while the demands of Wi-Fi users keeps increasing. To address these needs several targets of ongoing communication network design includes high throughput, low latency and high efficiency. Some applications, such as real time applications (RTAs) (e.g., data acquisition or gaming), communicate data which is very sensitive to delay, and thus have a need for low latency packet communication.

However, current Wi-Fi network protocols are not directed to minimize latency for these time sensitive applications.

Accordingly, a need exists for an apparatus and method for reducing RTA packet latency. The present disclosure fulfills that need and provides additional benefits over previous technologies.

BRIEF SUMMARY

Stations (STA) can share their Transmit Opportunity (TXOP) in a wireless LAN network with other STAs in a single BSS scenario in the frequency domain by performing the following steps. Exchanging messages with the Access Point (AP) station to inform and/or gain approval of sharing its Transmit Opportunity (TXOP) with other STAs. Upon gaining access to the channel, information is exchanged with other STAs to indicate that the coming TXOP is available to be shared and identify the non-AP shared TXOP participant STAs based on the responses received.

Messages are sent to non-AP shared TXOP participant STAs that are willing to join the next shared TXOP and information on the Resource Unit (RU) that each non-AP shared TXOP participant STA should use to transmit UpLoad (UL) DATA during channel access.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 46 is a data field diagram of a STA TXOP shareability element according to at least one embodiment of the present disclosure.

FIG. 47 is a data field diagram of a of a STA Info field according to at least one embodiment of the present disclosure.

FIG. 48 is a data field diagram a sharing offer/request frame format according to at least one embodiment of the present disclosure.

FIG. 49 is a data field diagram of a STA share offer/request info field format having the following fields according to at least one embodiment of the present disclosure.

FIG. 60 is a data field diagram of a TXOP holder configuration frame format according to at least one embodiment of the present disclosure.

FIG. 61 is a data field diagram of a frame format of the STA TXOP Access Allocation field according to at least one embodiment of the present disclosure.

FIG. 62 is a data field diagram is a priority subfield of the Allocation Control Info subfield indicates the priority of the traffic of the TXOP share participant STA according to at least one embodiment of the present disclosure.

DETAILED DESCRIPTION

1. Introduction

Figure 1:
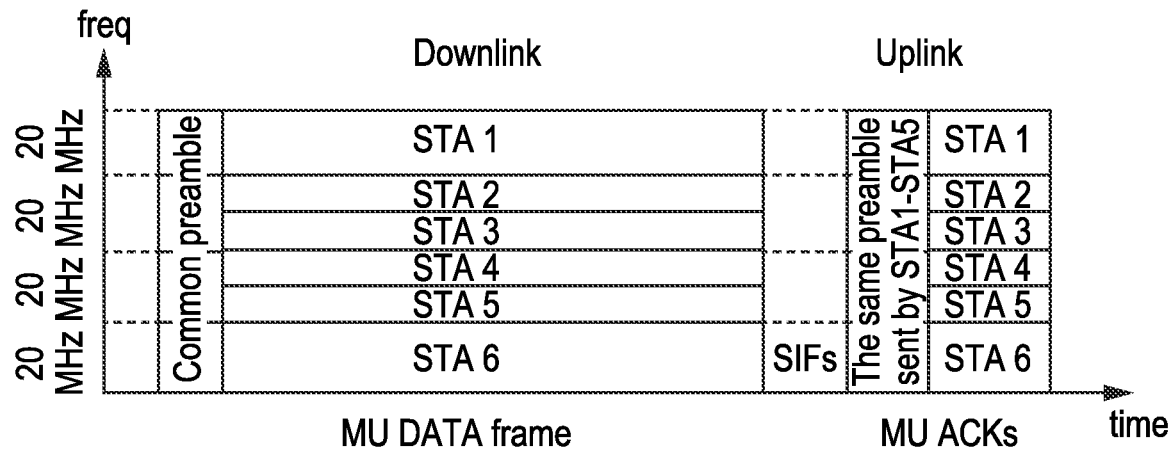
FIG. 1 is a slotted transmission diagram of DL OFDMA MIMO transmission in IEEE 802.11.

Many 802.11 amendments have been proposed to improve the performance of WLANs, specifically in the 2.4 GHz and 5 GHz bands. Numerous data rate improvements have been devised in the PHY layer, such as increasing bandwidth from 20 MHz to 160 MHz, new modulation and coding schemes and improving MIMO systems.

Other MAC layer improvements have been introduced to reduce transmission overhead and hence increase data throughput. This being accomplished, for example, by reducing interframe spacing, aggregating and segmenting packets, and applying power consumption protocols to alternate between an awake state and a dozing state for STAs to conserve their power.

IEEE 802.11ax introduced an Orthogonal Frequency Division Multiple Access (OFDMA) technique, where adjacent subcarriers are grouped into resource units (RUs). By assigning RUs for Multiple-users (MU) on both UpLink (UL) and Down Link (DL) DATA transmissions, the technique maximizes transmission rate.

The use of OFDMA allows many users to simultaneously utilize the same time resources by splitting the frequency domain amongst them. The technique improves resource utilization and reduces latency since more users can be scheduled at the same time.

However, the current 802.11 technique initiates uplink (UL) multi-user (MU) transmission at the AP level. This means, if non-AP STAs need to send UL DATA to the AP and sense that channel access is available, they cannot merely start a transmission. The non-AP STAs have to wait until they receive a trigger frame from the associated AP to start the UL DATA transmission.

The present disclosure describes a shared TXOP protocol that is initiated at the non-AP STA level for the MU UL OFDMA transmission. In the present disclosure, the non-AP STA that gains channel access is enabled to initiate the shared TXOP and assign different channel resources to other non-AP STAs for the MU UL DATA transmission.

2.1. WLAN Features Impacting Packet Delay 2.1.1. Channel Access and Delay Tolerance Both contention-based and contention free access are allowed in WLAN devices. The contention based access requires the device to sense the channel and contend every time if the channel is busy in order to gain access to the channel. This need for contention introduced extra transmission delays, but was necessary to provide proper collision avoidance. Contention free channel access allowed the AP to gain access to the channel without contention. This is allowed in the Hybrid Controlled Channel Access where channel access coordination is accomplished by using a shorter inter-frame spacing equal to PIFs (PCF inter-frame spacing) compared to the DIFS (distributed inter-frame spacing) used by other STAs. Although contention free access appeared like a tenable solution for avoiding contention delay, it was not widely deployed and the majority of Wi-Fi devices are using contention based access.

For a STA to access the channel it has to sense the channel and determine that it is not busy. A channel is considered busy when any of the following conditions are detected: (1) the STA detects a preamble of a frame, whereas the channel is considered busy for the length of the detected frame; (2) the STA detects in band energy at more than 20 dB of the minimum sensitivity; or (3) the STA detects that the channel is virtually busy by reading the Network Allocation Vector (NAV) of a detected frame. It will be appreciated that NAV is a virtual carrier-sensing mechanism used with wireless network protocols in which the NAV represents the number of microseconds the sending STA intends to hold the medium busy (maximum of 32,767 microseconds).

802.11ax introduced two NAVs to avoid collision that might arise by faulty resetting of the NAV timer. One NAV is for the BSS STAs and the other NAV is for the non-BSS STAs. The STA maintains the two NAVs separately.

802.11ax uses CSMA/CA for channel access as in all legacy 802.11 WLAN devices. For an AP to send a trigger frame for UL MIMO transmission it first needs to contend for channel access. In order to enable the AP to win (obtain) channel access over any STA in its BSS, 802.11ax introduced a second set of EDCA for 802.11ax devices only. This allows legacy non 802.11ax devices to access the channel freely with EDCA and increase the chance of the AP to gain access of the channel in order to schedule UL or DL OFDMA MIMO data transmission.

2.1.2. Multi-User Transmission and Reception 802.11 WLAN devices allow the use of MIMO antennas for transmission and reception as well as OFDMA channel access. IEEE 802.11ax supports multi-user transmission in both uplink and downlink.

The use of multi-user communications allows multi-stream transmission to one or more users through up to 8 streams for example in SU-MIMO DL in 802.11ac or through multi-user transmission to more than one user through MU-MIMO DL transmission as defined in 802.11ac. This allows the AP to assign one or more streams to STAs in its BSS.

With the use of wide channels for data transmission, up to 160 MHz, the channel is expected to be interference frequency selective where some frequencies experience different interference levels than others, which affects expected achievable rate and degrades performance. To solve this problem 802.11ax introduced OFDMA where adjacent sub-carriers are grouped into resource units (RUs). These RUs can be assigned to different receivers to maximize transmission rate. This scheduling can result in maximizing the SINR for each receiver and hence allows higher Modulation and coding scheme (MCS) and therefore increase achieved throughput.

OFDMA allows many users to simultaneously utilize resources by splitting the frequency domain amongst them. This improves resource use and reduces latency since more users can be scheduled at the same time. In addition, by allowing STAs with small amounts of data to occupy narrow RUs increases scheduling efficiency and allows improved distribution of resources among applications that require channel access for communicating small amounts of data, thus aiding in reducing channel access time and overhead required for frame headers and preambles.

OFDMA efficiency can be improved when it is combined with MIMO transmission. An RU can be used to send multiple spatial streams to a STA depending on the MIMO capacities of the STAs. Also, one RU can be assigned for sharing by more than one STA, where each STA can have one or more spatial streams depending on the MIMO capacities of the STAs. Packing more STAs in the same resource reduces latency for the STAs and APs.

FIG. 1 depicts an example of DL OFDMA MIMO transmission. The AP is sending a PHY preamble to all STAs to specify the frequency/RUs mapping and RUs assignment for STAs. Following the preamble, the AP DL DATA is sent using a specific RU assignment for a given STA. The Multi-user ACK transmission should be synchronized to the reception of DL DATA frame where STAs start transmission of a Short Interframe Spacing (SIFS) after the reception of the DL trigger frame.

Figure 2:
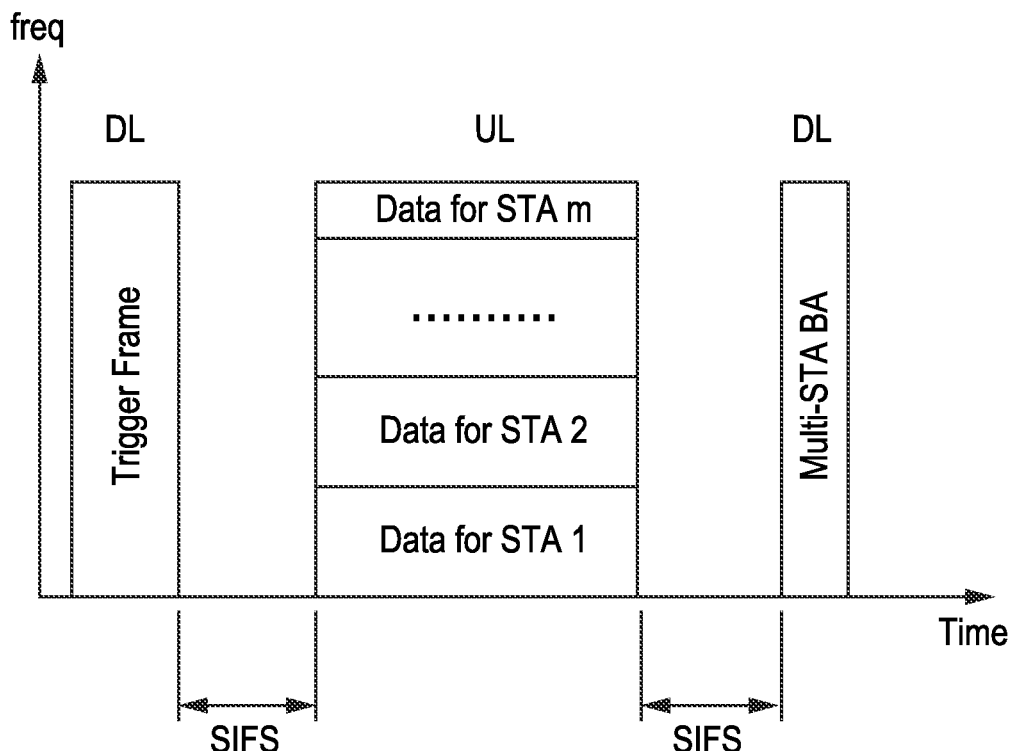
FIG. 2 is a slotted transmission diagram of UL OFDMA MIMO transmission in IEEE 802.11.

FIG. 2 is an example of an UL OFDMA MIMO transmission, in which the AP is sending a trigger frame to all STAs which contains the frequency, RU mapping, and RU assignment for the STAs. The UL MIMO transmission should be synchronized to the reception of the frame where the STAs commence transmission of a SIFS after the reception of the DL trigger frame.

2.1.4. Retransmission

Figure 3:
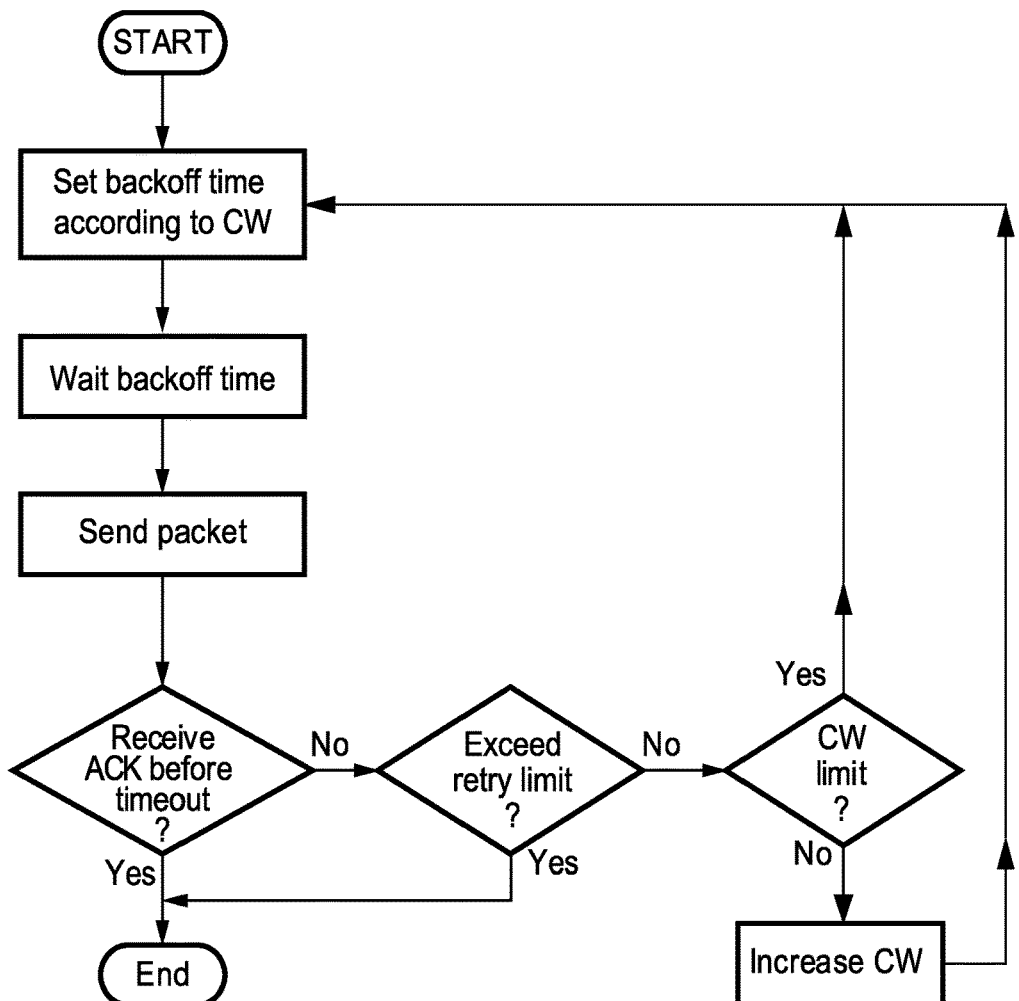
FIG. 3 is a flow diagram of a conventional UL OFDMA MIMO transmission.

FIG. 3 illustrates using CSMA/CA to allow STAs to have channel access for packet transmission and retransmission in WLAN systems under IEEE 802.11. In a CSMA/CA system, before each transmission and retransmission, the STA has to sense the channel and set a backoff time to contend for channel access. The backoff time is decided by a uniform random variable between 0 and the size of contention window. After the STA waits for the backoff time and senses that the channel is idle, the STA sends a packet. A retransmission is required if the STA does not receive an ACK before timeout. Otherwise, the transmission succeeds. When a retransmission is required, the STA checks the number of retransmissions of the packet. If the number of retransmissions exceeds the retry limit, then the packet is dropped and no retransmission is scheduled. Otherwise, the retransmission is scheduled, and another backoff time is needed to contend for retransmission channel access. If the size of the contention window does not reach an upper limit, then the STA increases it. The STA sets another backoff time depending on the new size of the contention window. The STA waits the backoff time for retransmission and so on.

Figure 4:
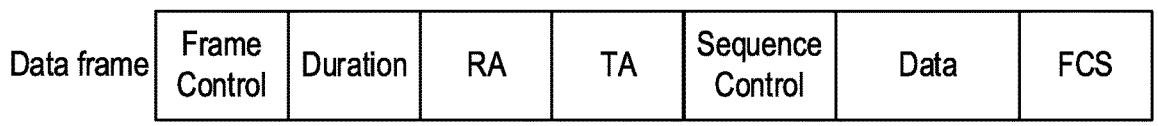
FIG. 4 is a data field diagram of a data frame format in a regular WLAN system.

FIG. 4 illustrates a data frame format in a regular WLAN system and its fields. A Frame Control field indicates the type of frame. A Duration field contains NAV information used for CSMA/CA channel access. An RA field contains an address for the recipient of the frame. A TA field contains the address of the STA that transmitted the frame. A Sequence control field contains the fragment number and the sequence number of the packet.

Figure 5:
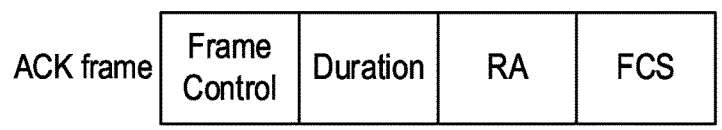
FIG. 5 is a data field diagram of an ACK frame format in a regular WLAN system.

FIG. 5 illustrates the ACK frame format in a regular WLAN system, and its fields. A Frame Control field indicates the type of frame. A Duration field contains NAV information used for CSMA/CA channel access. An RA field contains an address for the recipient of the frame.

Figure 6:
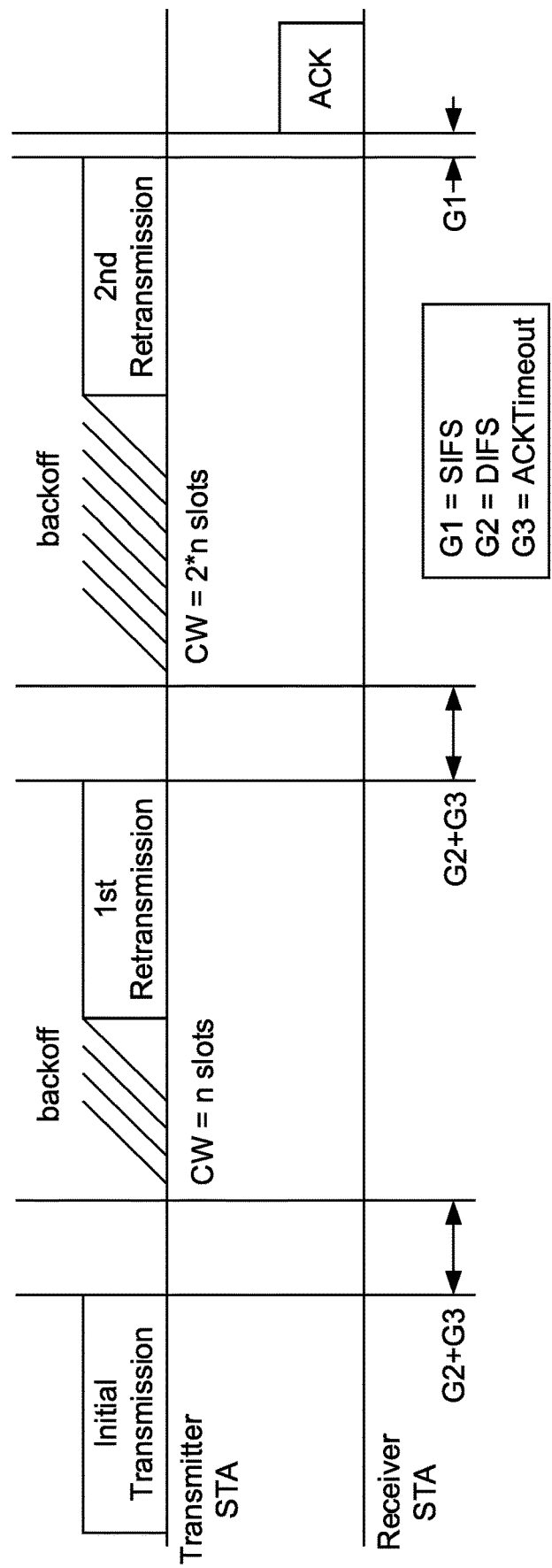
FIG. 6 is a communication sequence diagram of conventional retransmission in CSMA/CA where the backoff time is increased due to retransmission.

FIG. 6 illustrates one example of the retransmission in CSMA/CA where the backoff time is increased due to retransmission. The data packet frame and the ACK frame use the formats as shown in FIG. 4 and FIG. 5, respectively. After the transmitter transmits the initial transmission of a packet, it does not receive the ACK before timeout. Then, it sets another backoff time, whereby the size of the contention window is n slots. After waiting the backoff time, the transmitter STA retransmits the packet for the first time. However, in this example the retransmission also fails. The transmitter STA needs to retransmit the packet and sets the backoff time again to contend for channel access. This time, the size of the contention window is doubled, which is 2*n slots, due to the retransmission. The expected backoff time is also doubled by the contention window size. The 2nd retransmission succeeds since it receives an ACK before timeout.

Figure 7:
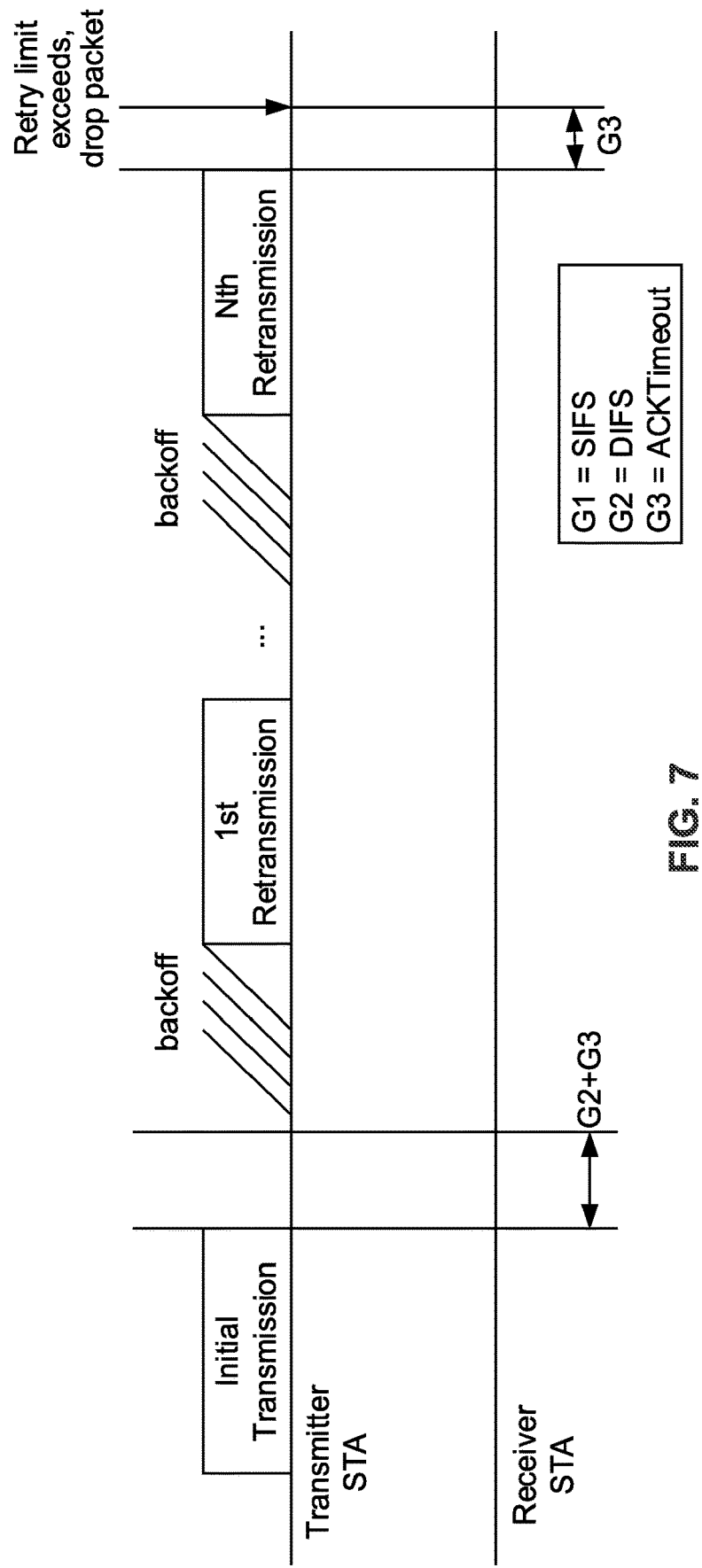
FIG. 7 is a communication sequence diagram of dropping a packet after the number of retransmissions exceeds the retry limit.

FIG. 7 illustrates one example in which the packet is dropped after the number of retransmission exceeds the retry limit. The data packet frame and the ACK frame use the formats as shown in FIG. 4 and FIG. 5, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

Figure 8:
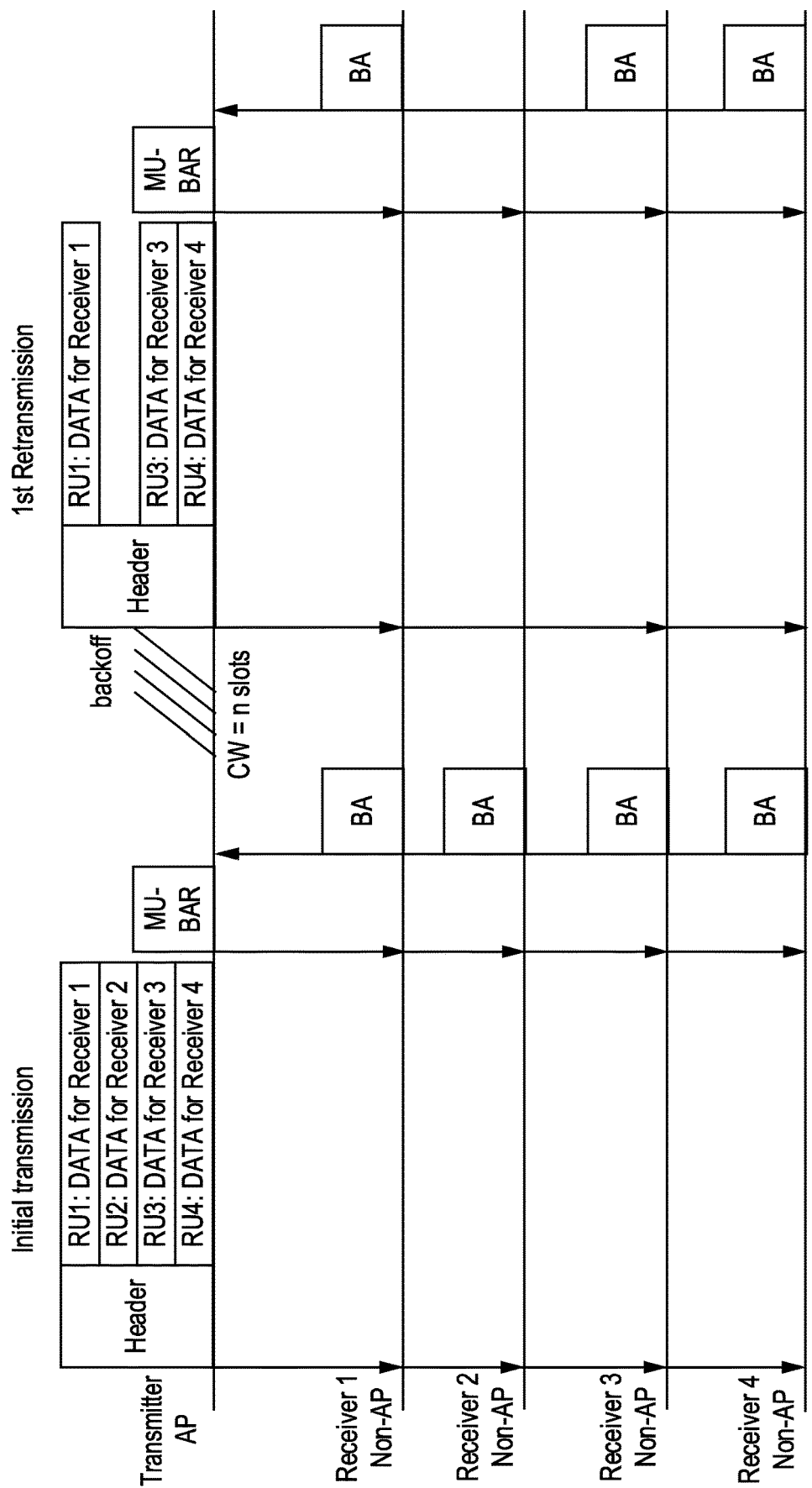
FIG. 8 is a communication sequence diagram of a conventional downlink multi-user transmission using OFDMA.

FIG. 8 is an example of a downlink multi-user transmission using OFDMA. The transmitter AP transmits data packets to its receivers 1, 2, 3, and 4. The data packet could use the HE MU PPDU format. After finishing the initial transmission, the AP sends a multi-user Block ACK request (MU-BAR) to all the receivers. The receivers then send a block ACK (BA) back to the AP. According to the content in the BAs, the AP decides to retransmit the packets to receivers 1, 3, and 4. The AP contends for the channel and waits the backoff time. The first retransmission occurs after the AP gains channel access.

Figure 9:
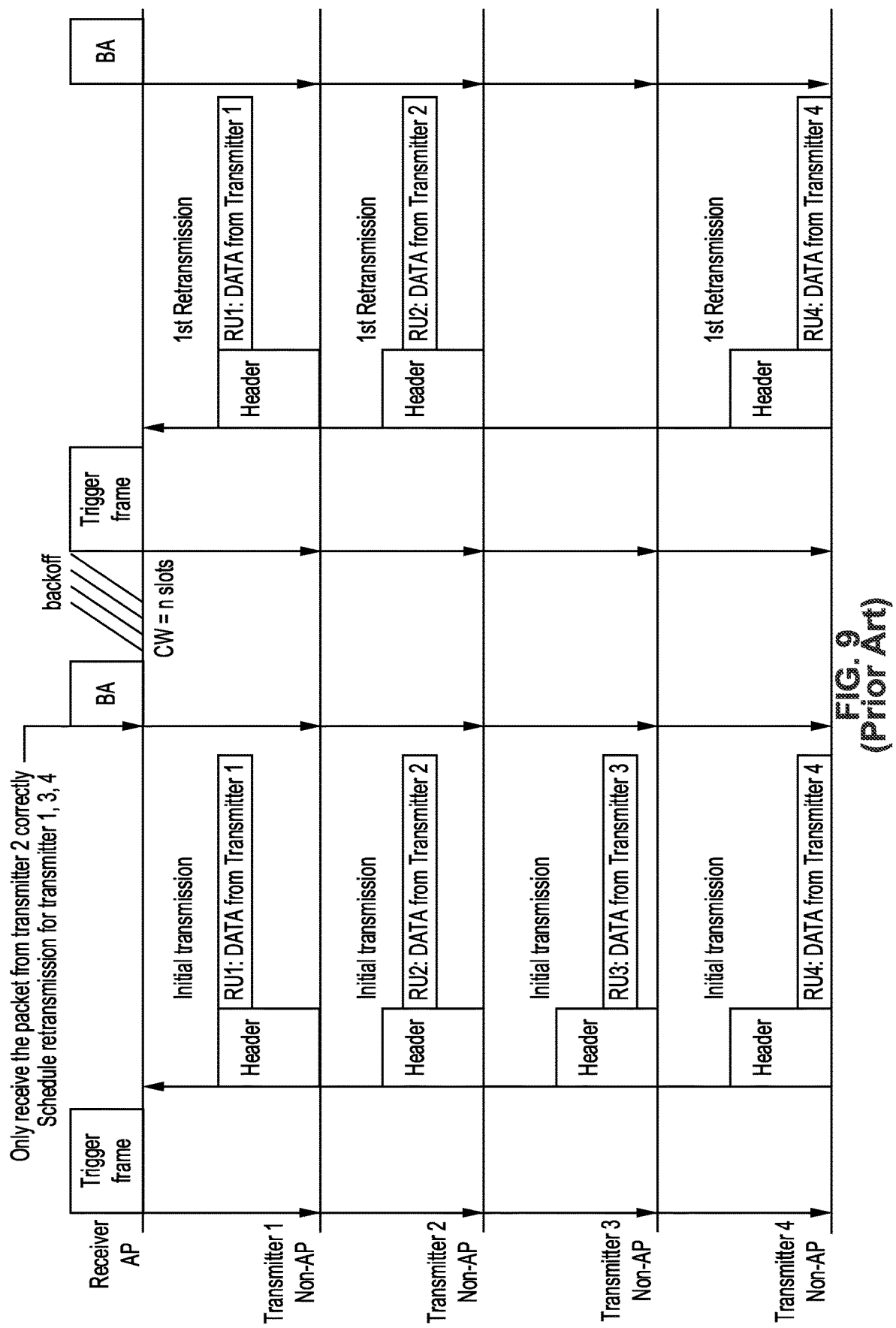
FIG. 9 is a communication sequence diagram of a conventional uplink multi-user transmission using OFDMA.

FIG. 9 is an example of uplink multi-user transmission using OFDMA. The AP first sends a trigger frame to all the transmitters 1, 2, 3, and 4. The transmitters receive the trigger frame and starts the initial transmission using the channel resource allocated by the trigger frame. The data packets can use the HE TB PPDU format. The AP receives the data packets from the transmitters and sends a BA frame to report proper reception of the transmission. In this example only the packet from transmitter 3 is seen being received correctly. The retransmission needs to be scheduled for transmitters 1, 2, and 4. The AP contends for the channel and waits a backoff time to gain channel access. Then, the retransmission proceeds at the same time as the initial transmission.

2.1.5. UL OFDMA Random Access 802.11ax introduced UL OFDMA random access for UL transmission when the AP does not know which STA has data to transmit or when an unassociated STA wants to transmit data. The trigger frame can allocate some RUs for random UL channel access. When the AP assigns specific RUs for uplink random access the STAs use an OFDMA back-off procedure to decide whether they will access the random access channel or not. This is accomplished by selecting a back-off random value and comparing it to the number of RUs assigned for random access. If the current back-off random value is less than the number of RUs, the STA randomly accesses one of the RUs assigned for random access. Random access is expected to increase efficiency for short packet transmissions.

3. Problem Statement

For MU UL transmissions, previous techniques, such as 802.11n/ac implement Request-To-Send/Clear-To-Send (RTS/CTS) or RTS/CTS with extensions in a channel access scheme to help avoid collisions. However, this scheme only allows one user to occupy the channel at a time. Besides, a long delay is introduced by the overhead of RTS/CTS frame exchange.

As a comparison, the 802.11ax technique implemented the OFDMA scheme, which allows different users to access the channel simultaneously, which improves channel utilization efficiency and reduces the average delay. However, the current 802.11ax technique relies on the AP station to initiate UL transmissions for a shared TXOP. Accordingly, if a non-AP STA senses that the channel is idle and it has DATA to transmit to the AP, it has to wait until receiving a trigger frame from the associated AP to start the UL DATA transmission. Also, it has to rely on the AP to schedule and distribute available channel resources between this non-AP STA which obtained the channel and the other non-AP STAs. In this case, the advent of OFDMA introduces several problems including low channel utilization efficiency and thus increased delay.

4. Contribution of the Present Disclosure

This present disclosure proposes a new solution to enable multi-user UL transmission in the shared TXOP in a single BSS. The phrase "shared TXOP" is used herein to mean that during one TXOP, the channel access is shareable between different users. More specifically, when the non-AP STA obtains the channel, it is able to initiate the MU UL transmission without waiting for the trigger frame from the AP. This non-AP STA performs as the TXOP holder STA, which can initiate the shared TXOP access and schedule the channel resources for other non-AP STAs that join the following shared TXOP. The studied scenarios focus on the case of a single BSS. The proposed solution improves channel utilization efficiency and decreases the delay on the non-AP STA side, thus improving flexibility and RTA performance on the non-AP STA side.

5. Non-AP STA Hardware Setup

Figure 10:
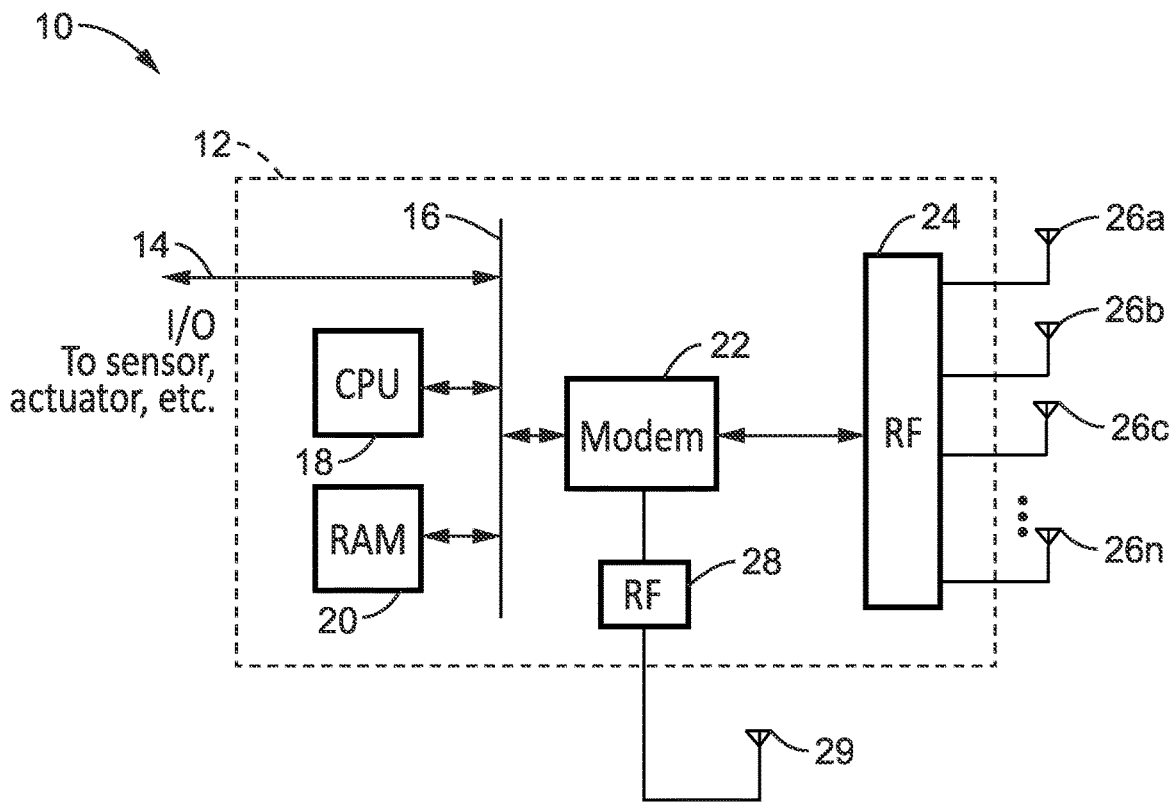
FIG. 10 is a block diagram of station (STA) hardware according to at least one embodiment of the present disclosure.

FIG. 10 illustrates an example embodiment 10 of a non-AP STA having external I/O 14 into bus 16 of station circuitry 12 having a CPU 18 and RAM 20 for executing a program(s) which implements the wireless network communication protocol, as well as for storing data. The station hardware of present disclosure can be configured for communication in various ways, which may include directional and/or omni-directional communications.

The host machine 12 accommodates at least one modem 22 to support communications coupled to at least one RF module 24, 28 connected to one or more antennas 26a, 26b, 26c through 26n, and 29 for performing communications, such as on the sub-6 GHz band (e.g., 2.4, 5, 6 Ghz), and/or for communicating over millimeter wavelengths (mmW). In the example shown RF antenna 29 is an omni-directional antenna. By way of example, RF module 24 is shown having multiple antennas to support beamforming for transmission and reception on that band. In this way, the STA can transmit signals using multiple sets of beam patterns. It should be appreciated that although the examples describe sub-6 Ghz communications, that any desired bands can be supported by the teachings of the present disclosure. It should also be noted that multiple STAs may be grouped (clustered) in any desired configuration without departing from the teachings of the present disclosure.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a non-AP (regular) station (STA). It should also be appreciated that the programming is configured to operate in different modes (source, transmitter, intermediate, destination, receiver, first AP, other AP, non-AP stations associated with the first AP, non-AP TXOP holder station, non-AP TXOP participant stations, non-AP TXOP non-participant stations, stations associated with another AP, coordinator, coordinate and so forth), depending on what role it is playing in the current communications context.

It should be appreciated that the present disclosure can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs.

Figure 66:
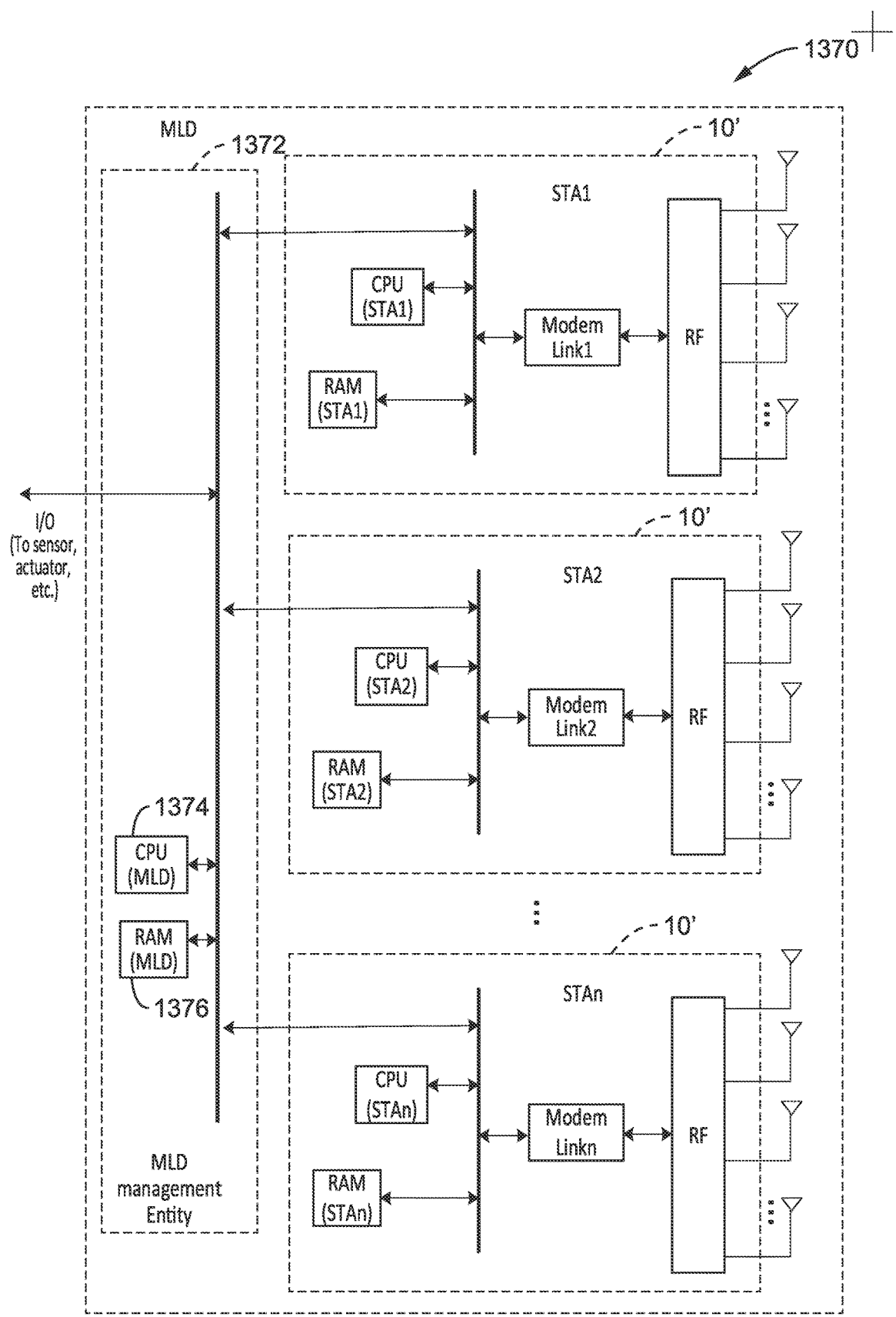
FIG. 66 is a block diagram of station (STA) hardware in which the stations are affiliated in a multi-link device (MLD) configuration according to at least one embodiment of the present disclosure.

FIG. 66 illustrates a variation of FIG. 10, as embodiment 1370 in which wireless communication stations are affiliated in a multi-link device (MLD) hardware configuration. Each STA within the MLD operates on a link of a different frequency. Each station 10' can be as that described in FIG. 10, with each having CPU, RAM, Modem, RF circuits and one or more antennas. It is seen in the figure that each of the n stations shown provide a different link (e.g., Link1, Link2 through Linkn are shown).

The MLD is also seen with circuitry 1372 of an MLD management entity having at least one processor (CPU) 1374, memory 1376 which provides external I/O to access applications of the MLD and to implement communication protocols at the MLD level. The MLD is configured to distribute tasks to, and collect information from, each affiliated STA and share information between affiliated STAs.

It should also be appreciated that each STA of the MLD need not have its own processor and memory. In at least one embodiment, one or more of the stations within the MLD may share processors and memory between themselves, or share the processor and memory of the MLD circuit. Thus the present disclosure contemplates many possible arrangements for communication over multiple links within an MLD.

6. Topology and Scenario Descriptions 6.1. Topology Under Study

Figure 11:
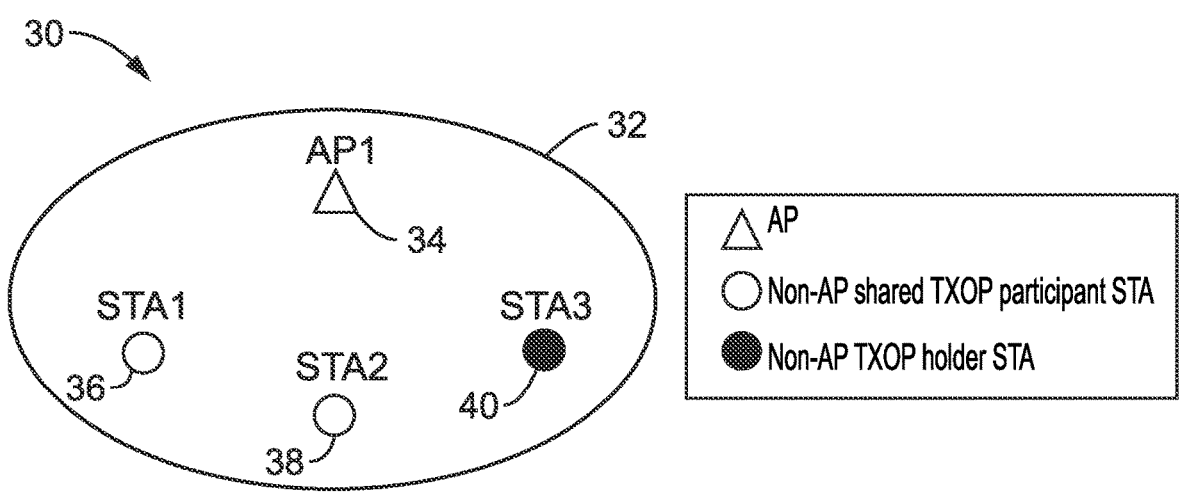
FIG. 11 is a network topology diagram example according to at least one embodiment of the present disclosure.

FIG. 11 illustrates an example embodiment 30 of a scenario (topology) for a single WLAN BSS 32 scenario, as utilized by way of example and not limitation in the following operational discussions of the present disclosure. This scenario provides a topology to aid explanation of the operations described herein, without limiting the use of the teachings herein to any particular network scenario. The single WLAN BSS 32 consists of one AP 34 and multiple stations, exemplified as STA1 36, STA2 38 and STA3 40. STA3 is the non-AP TXOP holder STA, which is the STA that obtains the channel and is willing to share the following (subsequent) TXOP with other non-AP STAs, and the other two STAs are non-AP shared TXOP participant STAs which don't obtain the channel but are willing to join the following TXOP shared by the TXOP holder STA. This example is used for illustration of the proposed solution which can be applied to any WLAN topology without limitation.

6.2. Scenario Description

The studied BSS contains one AP and multiple non-AP STAs. Each non-AP STA has packets that can be generated periodically or frequently for transmission to the AP. The present disclosure is focusing on the UpLink (UL) OFDMA transmission, for which the latency is always a critical issue due to the more complex scheduling required between each non-AP STA and the AP.

In 802.1 lax technology multiple STAs can send UL DATA sequences simultaneously within a shared TXOP, which improves TXOP utilization efficiency. In 802.11ax, the AP can initiate the UL data transmission. The AP usually sends a trigger frame (e.g., Buffer Status Report Polling (BSRP)) to the non-AP STAs to inquire on their buffer status and their traffic priorities. Upon receiving a response frame (e.g., Buffer Status Report (BSR)) from those non-AP STAs, the AP sends another trigger frame (e.g., Basic Trigger) with the resource allocation information to those non-AP STAs for them to use in transmitting a UL data sequence. In the existing technology the AP initiated TXOP cannot support the dynamic needs of the non-AP STAs, especially if those non-AP STAs have RTA (Real Time Application) packets to be transmitted. Although the RTA packets are generally of a small size, they are requesting fast (low latency) transmission.

In the present disclosure a new solution is provided from the perspective of the non-AP STAs. Specifically for those non-AP STAs that sense the channel is available and have packets to send to the AP immediately. The shared TXOP scheme is enabled by the STA which obtains channel access and is willing to share channel access in the following TXOP with other STAs. The shared TXOP scheme efficiently decreases the latency by reducing backoff delay and providing more efficient channel utilization to the STAs contending for channel access.

More specifically, the present disclosure has the following characteristics. Once any non-AP STA gains channel access, it can initiate the shared TXOP immediately. This non-AP STA is referred to herein as the non-AP TXOP holder STA. The non-AP STAs that are willing to participate in the shared TXOP are referred to herein as non-AP shared TXOP participant STAs. The non-AP TXOP holder STA shares the TXOP duration in the frequency domain with other non-AP shared TXOP participant STAs that are either in the same BSS or in another BSS. The non-AP TXOP holder STA does not need to wait for the AP to initiate shared TXOP access. The non-AP TXOP holder STA is capable of scheduling and distributing the available frequency resources to other non-AP shared TXOP participant STAs. The non-AP TXOP holder STA can send the scheduling to the AP once the TXOP is reserved. The potential non-AP TXOP holder STAs can use a predetermined schedule to allocate channel access resources.

The present disclosure can benefit WLAN operations by reducing latency for accessing the channel and also increasing channel utilization efficiency.

Figure 12:
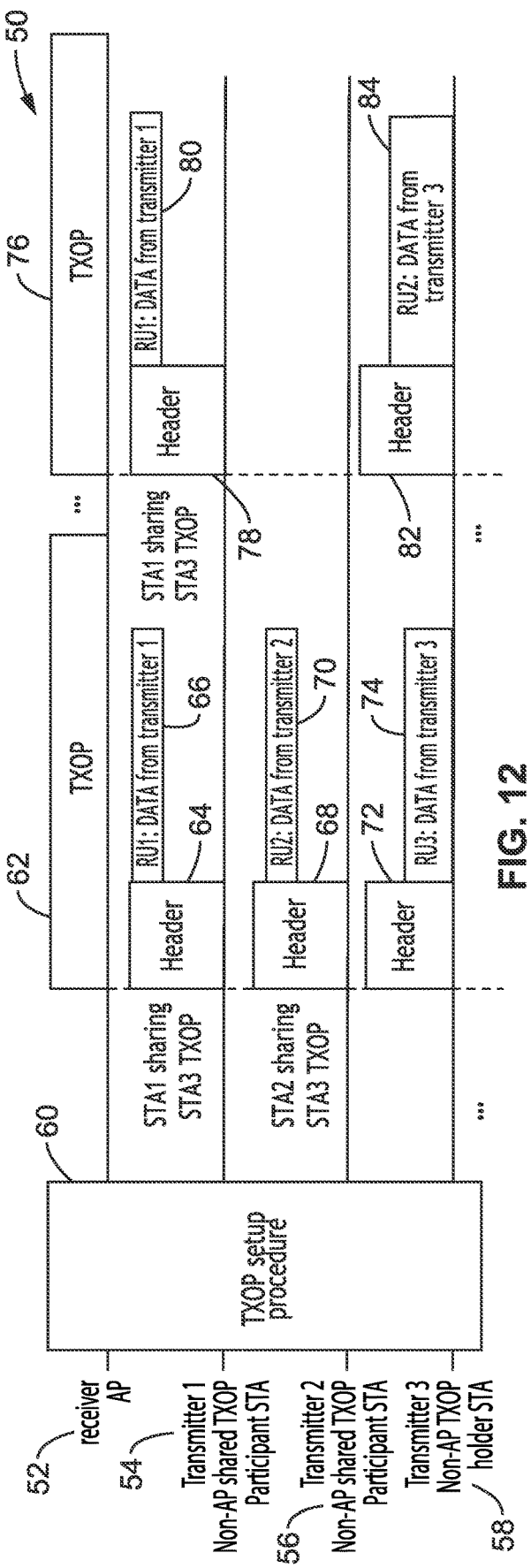
FIG. 12 is a communication sequence diagram of a proposed shared TXOP protocol initiated by the non-AP TXOP holder STA according to at least one embodiment of the present disclosure.

FIG. 12 illustrates an example embodiment 50 of a high-level example of the proposed shared TXOP protocol initiated by the non-AP TXOP holder STA. In the TXOP setup procedure, the non-AP STAs including the non-AP TXOP holder STA and the non-AP shared TXOP participant STAs, exchange the TXOP shareability information through the coordination of the AP.

The figure depicts interactions between a receiver AP 52, two non-AP transmitters as shared TXOP participants 54, 56, and a non-AP transmitter TXOP holder 58. A TXOP setup procedure is performed 60. When the non-AP TXOP holder STA 58 obtains the channel, it initializes the UL shared TXOP. The TXOP holder STA may need to confirm which non-AP STAs are willing to participate in the following shared TXOP. Then, a first shared TXOP access 62 starts, with headers 64, 68 and 72 being sent from the transmitting non-AP STAs. The TXOP holder STA transmits UL DATA on the reserved RU 74, while the non-AP shared TXOP participant STAs transmit UL DATA on the RUs 66, 70 as were assigned by the non-AP TXOP holder STA. A second TXOP 76 is also shown, and after headers 78, 82, the TXOP holder 58 utilizes a larger amount of resources in RU2 84, while the only other non-AP shared TXOP participant transmits in RU1 80.

6.3. Scenario Classification

In the present disclosure different solutions are described regarding two different scenarios, which include a dynamic scenario and a semi-static scenario. For both scenarios, solutions are discussed from two aspects, for example with and without using an AP to participate as a coordinator. A solution in the single BSS scenario is described in Section 7 with an associated frame format described in Section 8, while Section 9 summarizes the proposed solution.

7. Protocol Design 7.1. Overview of Protocol Design

Figure 13:
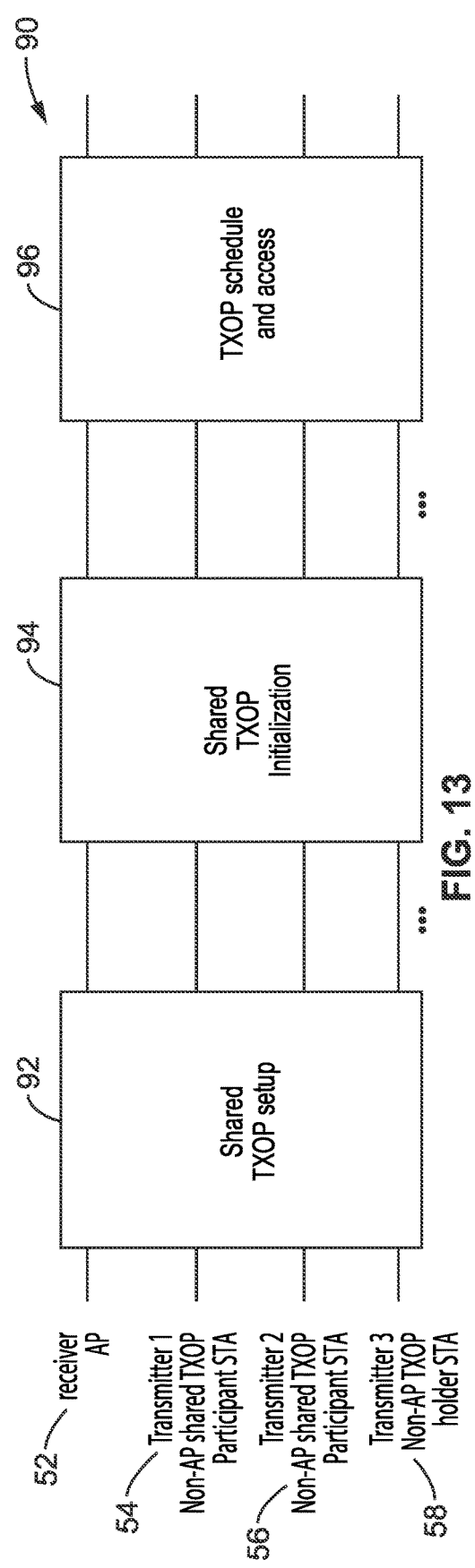
FIG. 13 is a protocol design general overview according to at least one embodiment of the present disclosure.

FIG. 13 illustrates an example embodiment 90 of a general overview of the proposed protocol in which for example, a non-AP STA which senses that the channel is available and obtains (grabs) the channel and shares this channel access in the frequency domain with other STAs. Again the figure depicts interactions between a receiver AP 52, two non-AP transmitters as shared TXOP participants 54, 56, and a non-AP transmitter TXOP holder 58. If other STAs also have UL DATA to transmit, they will access the channel following the scheduling as determined by the shared TXOP holder STA or based on the predetermined semi-static scheduling scheme. The protocol of the present disclosure includes three stages and can be applied to different channel access designs such as random access and scheduled access.

In the first stage of shared TXOP setup 92, the non-AP STAs, including the TXOP holder STA and the shared TXOP participant STAs, exchange the TXOP shareability information which indicates the willingness of the STA to share (offer/request) the TXOP by embedding this information in the authentication, association or any other frames that it exchanges through coordination of the AP.

In the second stage as a shared TXOP initialization stage 94, the non-AP TXOP holder STA gains channel access and announces that it is willing to share the following TXOP with other non-AP STAs. In at least one embodiment this process is performed, for example, by broadcasting a MU-RTS-share frame to the potential shared TXOP participant STAs to indicate that the following TXOP is shareable. The other non-AP STAs who are willing to join the following shared TXOP respond to the TXOP holder STA to confirm their participation, such as by sending back a CTS-share frame.

In the third stage as a TXOP schedule and access stage 96, the non-AP TXOP holder STA and the non-AP shared TXOP participant STAs access the channel simultaneously. The non-AP TXOP holder STA transmits UL DATA using the reserved RU. The non-AP shared TXOP participant STAs transmit UL DATA using the assigned RUs or randomly accessing the remaining RUs, depending on which channel access mode has been selected.

A system can work with a subset of these stages and thus all stages are not mandatory.

7.2. Dynamic Scenario without AP as Coordinator

In this case, after the non-AP TXOP holder STA grabs the channel, instead of waiting for AP to send trigger frames. The non-AP TXOP holder STA is able to initiate the MU UL transmission with other non-AP STAs. The non-AP TXOP holder STA can directly coordinate with other non-AP STAs that are willing to participate in the following shared TXOP.

Figure 14:
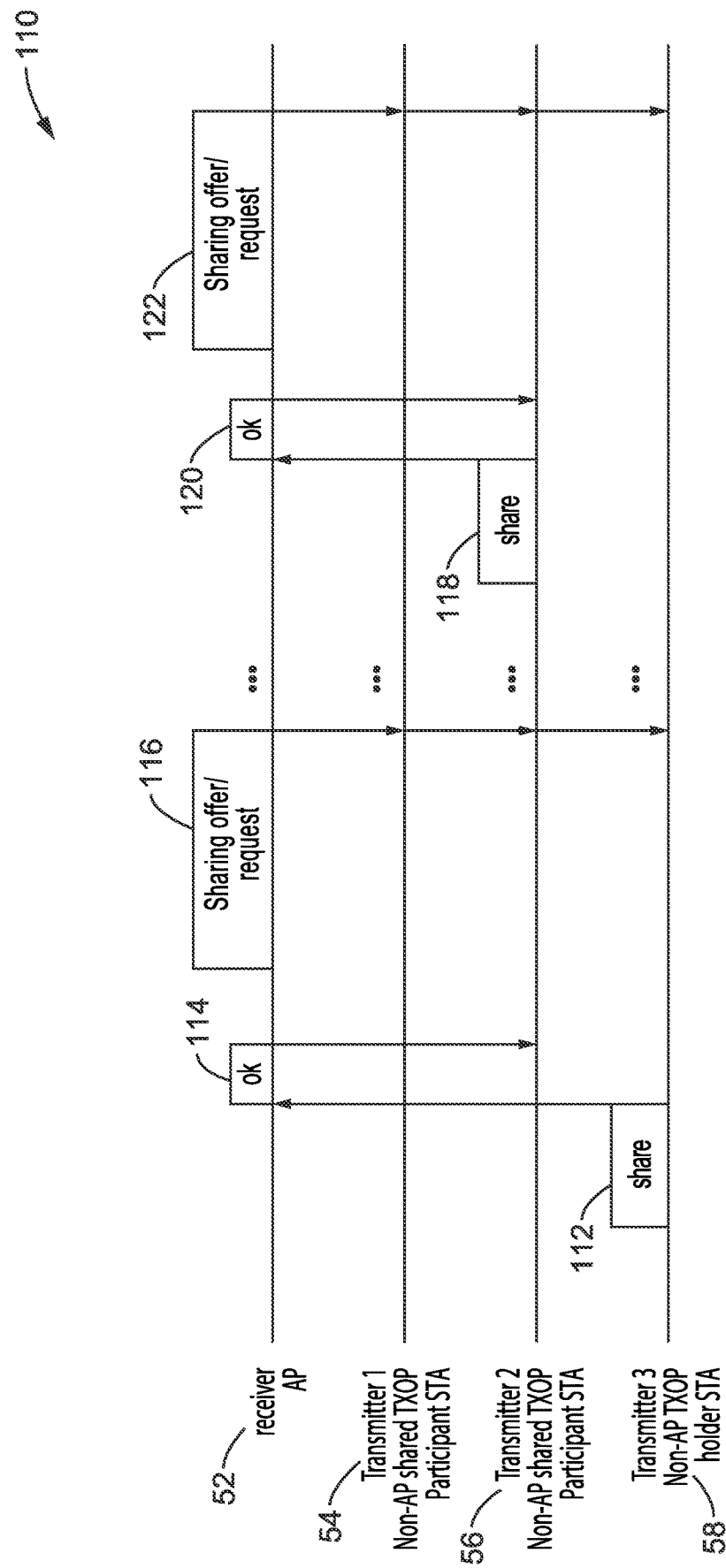
FIG. 14 is a communication sequence diagram of shared information exchange in the shared TXOP setup stage according to at least one embodiment of the present disclosure.

FIG. 14 illustrates an example embodiment 110 of a procedure of shared information exchange in the shared TXOP setup stage. Again, by way of example and not limitation, this figure is shown with the same AP and STA participants as in previous figures. The non-AP STAs indicate their shareability in a frame exchanged with the AP, for example an element containing share information 112 can be attached to the authentication, association frame or any other frame exchanged with the AP, which are sent to the associated AP. Once the AP receives the authentication or the association frame, it checks the share information and responds with a frame 114 to confirm successful reception. Then the AP broadcasts shareability information to all associated non-AP STAs with a sharing offer/request frame 116. In this case, once a non-AP STA receives a sharing offer/request frame, it becomes aware of the shareability in regard to which station is willing to share the TXOP and which stations are requesting TXOP time from the other non-AP STAs.

Toward the right in the figure, STA2 56 is requesting to obtain a share of a TXOP by sending a sharing request 118, to which the AP responds 120 and afterward communicates the share information 122 to the other STAs.

The shared TXOP setup stage is a common stage for the dynamic scenarios with/without the AP as coordinator. The shareability information is implemented in management frames through a new element designed as STA TXOP Shareability element.

Figure 15:
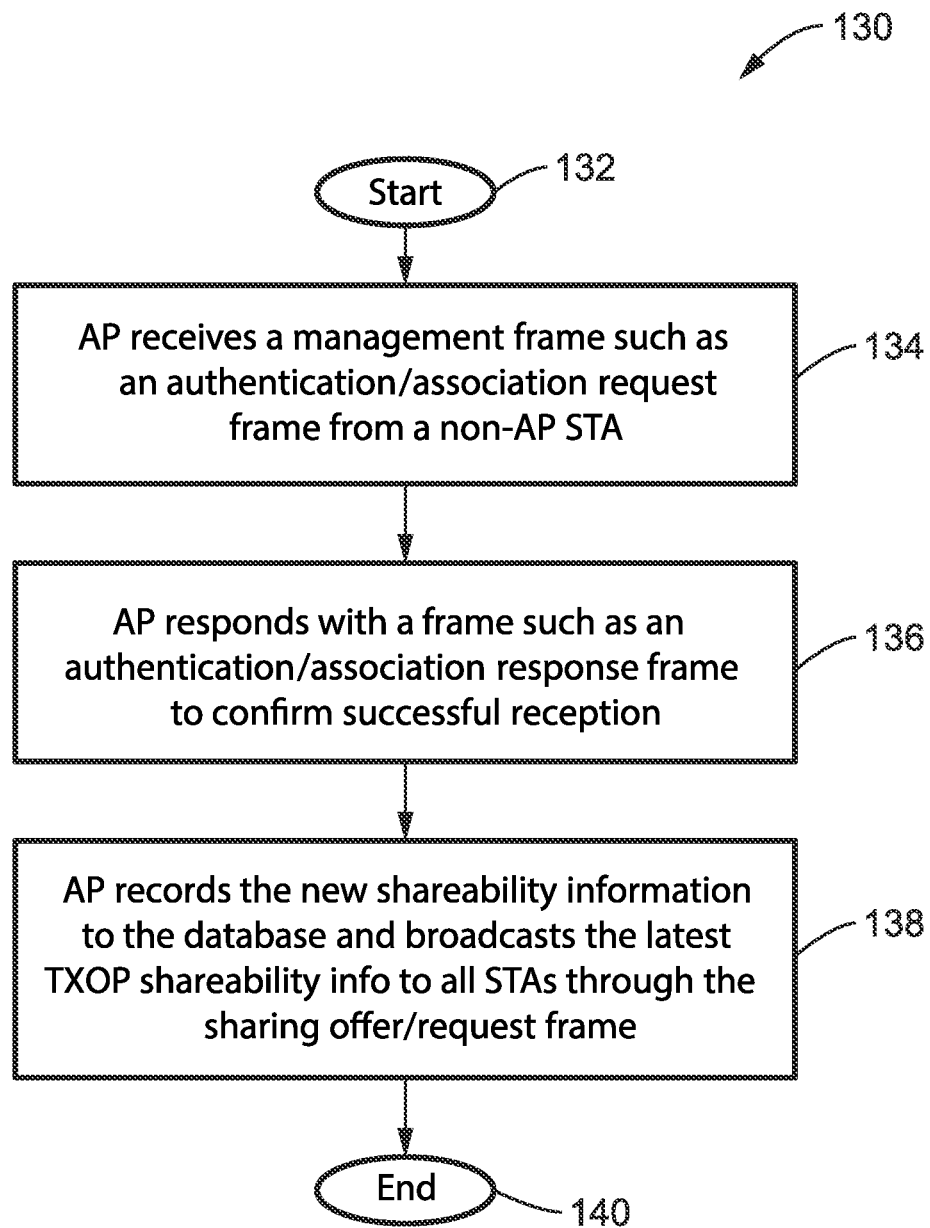
FIG. 15 is a flow diagram of a shared TXOP setup stage that is handled by AP according to at least one embodiment of the present disclosure.

FIG. 15 illustrates an example embodiment 130 of a shared TXOP setup stage that is handled by AP. After the shared TXOP Setup stage starts 132, the AP receives 134 a management frame, such as the authentication request frame or the association request frame from a non-AP STA, indicating if it is willing to offer/request a shared TXOP with other non-AP STAs. The AP retains this shareability info from the non-AP STA and sends back an authentication/association response frame 136 to confirm successful reception. Then the AP records 138 the latest shareability information to its database and then rebroadcasts the latest shareability information to all the associated non-AP STAs with a sharing offer/request frame before the process ends 140.

Figure 16:
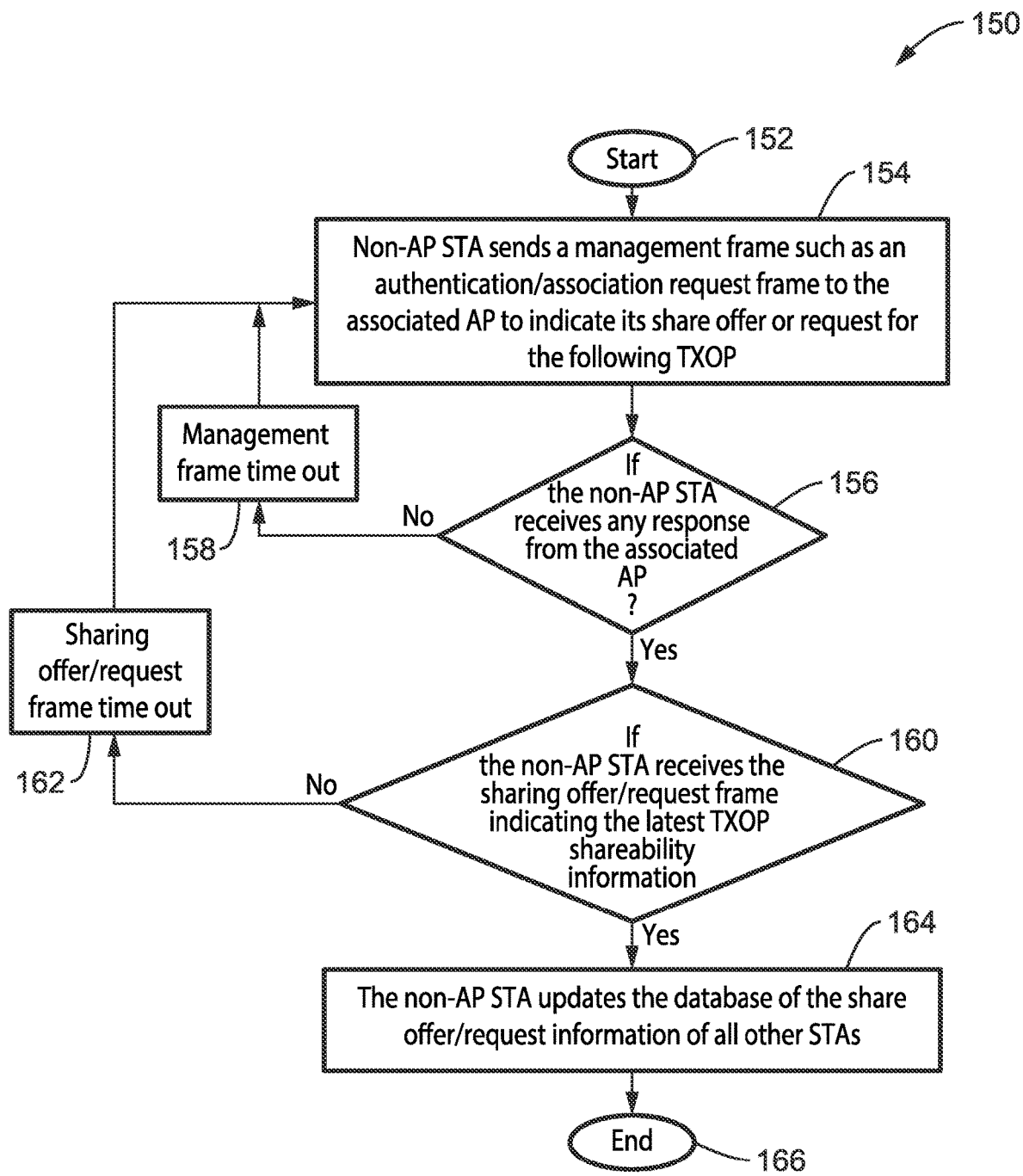
FIG. 16 is a flow diagram of a shared TXOP setup stage that is handled at the non-AP STA level according to at least one embodiment of the present disclosure.

FIG. 16 illustrates an example embodiment 150 of a shared TXOP setup stage that is handled at the non-AP STA level. After the shared TXOP Setup stage starts 152, the non-AP STA sends a management frame 154, such as an authentication/association request frame, to the associated AP to indicate its share offer/request information for the shared TXOP. A check 156 is made to determine if any response was received from the associated AP. If the non-AP STA doesn't receive any feedback from the associated AP before the management frame timeout after sending an authentication frame or the association frame that contains the share offer/request information, then execution moves to block 158 with a management frame timeout, and execution returns to block 154 with the non-AP STA retransmitting the management frame to the associated AP to indicate its shareability.

Otherwise, if at block 156 the non-AP STA received the response from the AP then block 160 is reached which determines if the non-AP STA has received the sharing offer/request frame from the associated AP indicating the latest TXOP shareability information. If it has received the sharing offer/request of all associated non-AP STAs, then block 164 is reached and the STA updates its database of the share offer/request information of all other STAs, and the process ends 166. If no sharing offer/request frame is received until time out, then block 162 is reached with a timeout and execution returns to block 154 and the non-AP STA should retransmit the authentication/association request frame with the TXOP share offer/request information embedded in it.

Figure 17:
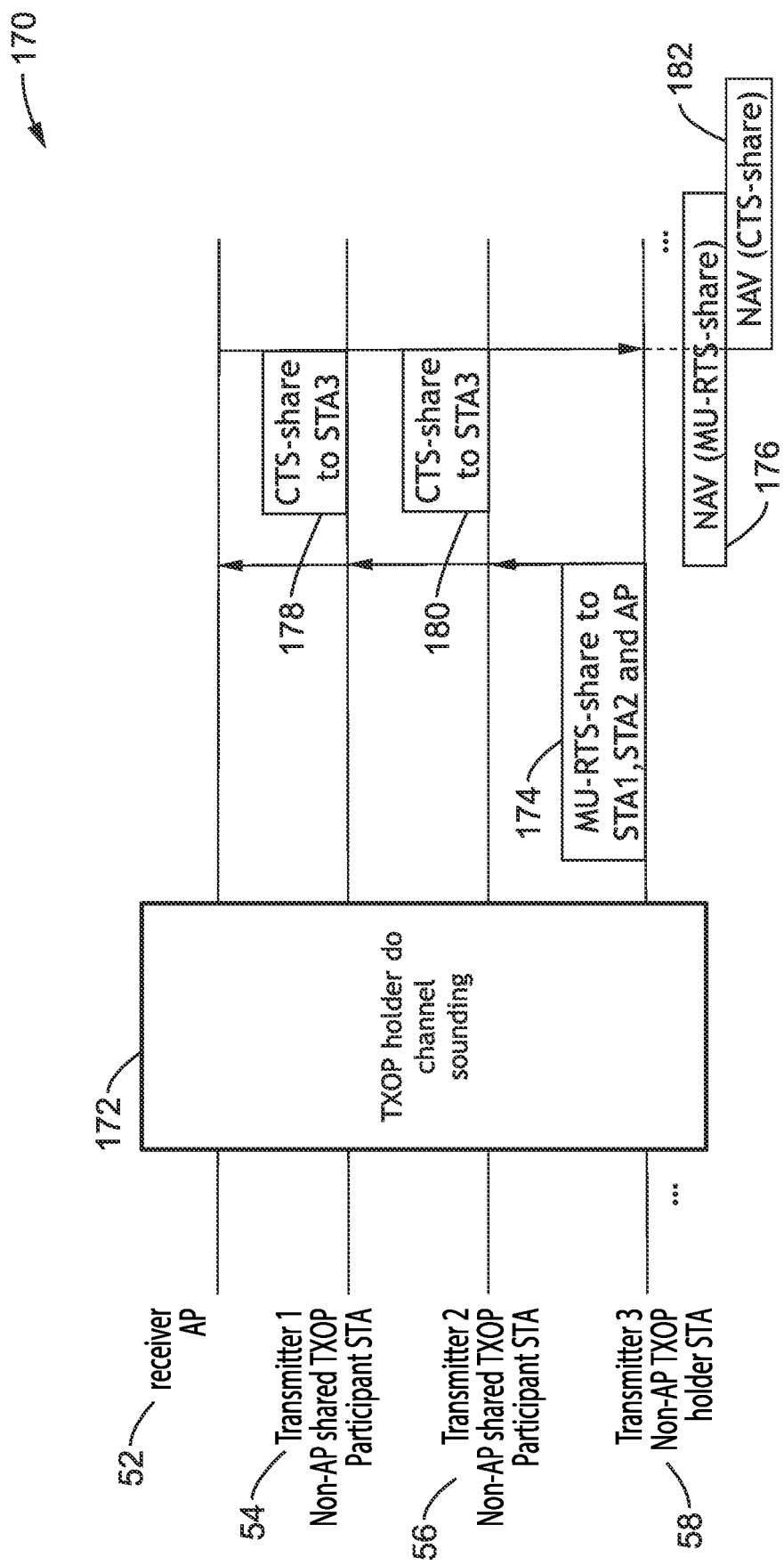
FIG. 17 is a communication sequence diagram of a shared TXOP initialization stage without AP coordinator according to at least one embodiment of the present disclosure.

FIG. 17 illustrates an example embodiment 170 of a procedure of the shared TXOP initialization stage in the case in which there is no AP acting as a coordinator. Again, by way of example and not limitation, this figure is shown with the same AP and STA participants as in previous figures.

In this example it is assumed that the non-AP TXOP holder STA performs channel sounding (beamform testing) 172 to obtain beamform information towards other non-AP STAs. This can be performed any time before the STA initializes the sharing procedure. The frequency of performing this process depends on channel characteristics.

In this stage, the non-AP TXOP holder STA obtains (grabs) the channel, and is willing to share the TXOP with other non-AP STAs. It needs to confirm which other non-AP STAs are willing to join the following shared TXOP. The non-AP TXOP holder STA sends 174 a MU-RTS-share frame to the potential non-AP shared TXOP participant STAs, with indicated bandwidth (BW) for each specified non-AP STA. A Network Allocation Vector (NAV) (MU-RTS) period 176 commences. Once the non-AP STAs receives this MU-RTS-share frame and are willing to join to following shared TXOP, they respond with a CTS-share frame 178, 180 to the non-AP TXOP holder STA using the BW as indicated in the received MU-RTS-share frame. A NAV (CTS-share) commences 182. If the AP receives the MU-RTS-share frame, it is made aware that the shared TXOP has been initiated.

Figure 18:
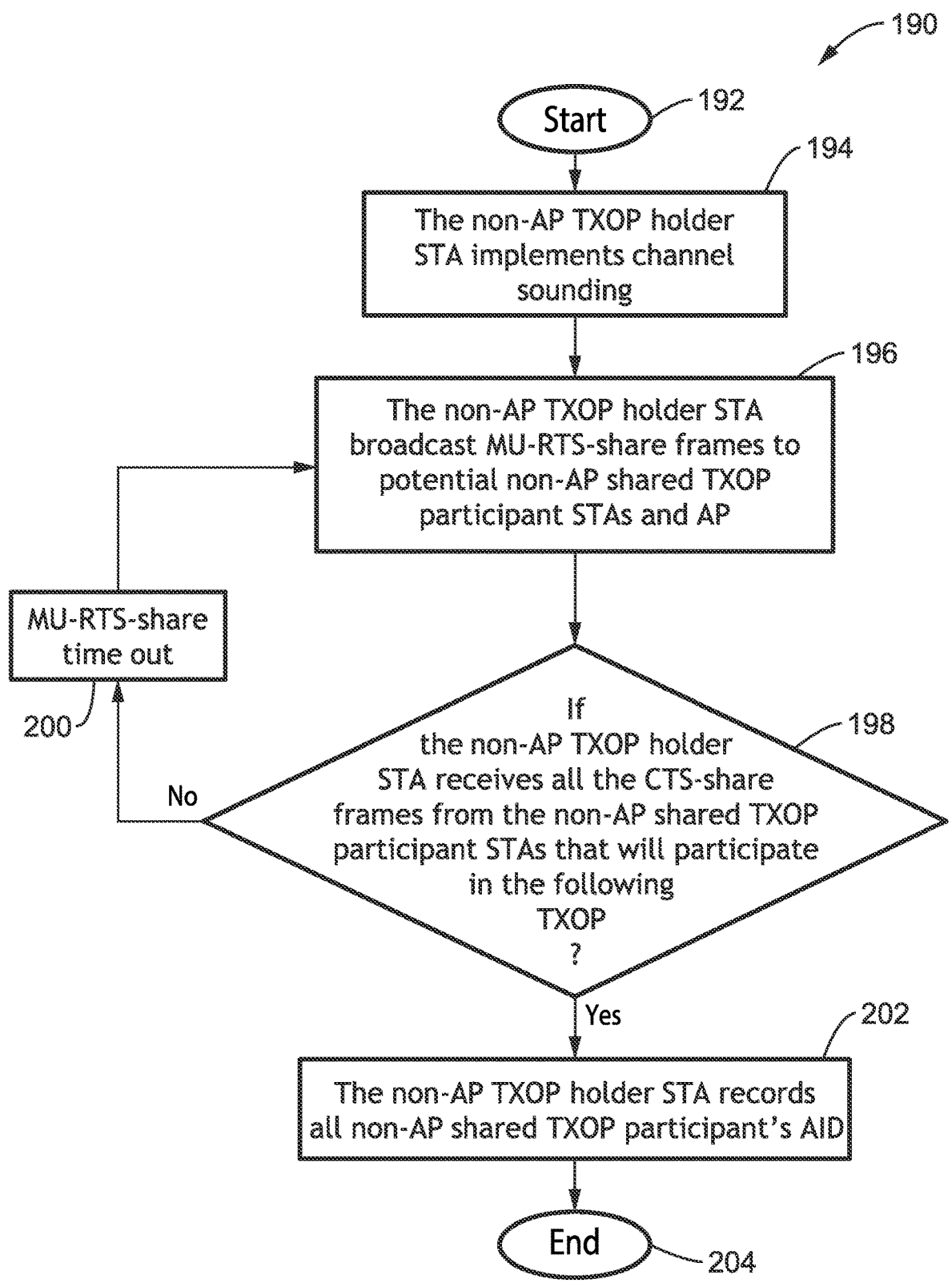
FIG. 18 is a flow diagram of a shared TXOP initialization stage that is handled by the non-AP TXOP holder STA according to at least one embodiment of the present disclosure.

FIG. 18 illustrates an example embodiment 190 of a shared TXOP initialization stage that is handled by the non-AP TXOP holder STA. After the shared TXOP initialization stage starts 192 and channel sounding is performed 194, then the non-AP TXOP holder STA sends 196 a MU-RTS-share frame to the potential non-AP shared TXOP participant STAs and AP, and allocates specific BW for them to respond. A check 198 is then made to determine if the non-AP TXOP holder receives all the CTS-share frames.

If it is found at block 198 that the non-AP TXOP holder doesn't receive any CTS-share frames within the MU-RTS-share frame timeout, then execution reaches MU-RTS timeout 200 and then block 196 in which the MU-RTS-share frame should be retransmitted to some other non-AP STAs.

Otherwise, if at block 198 the non-AP TXOP holder STA receives all the CTS-share frames from the non-AP shared TXOP participant STAs, then it is aware that these non-AP STAs will participate in the following shared TXOP, and block 202 is reached in which the non-AP TXOP holder STA records all non-AP shared TXOP participant's AIDs which are contained in the received CTS-share frames, before execution ends 204.

Figure 19:
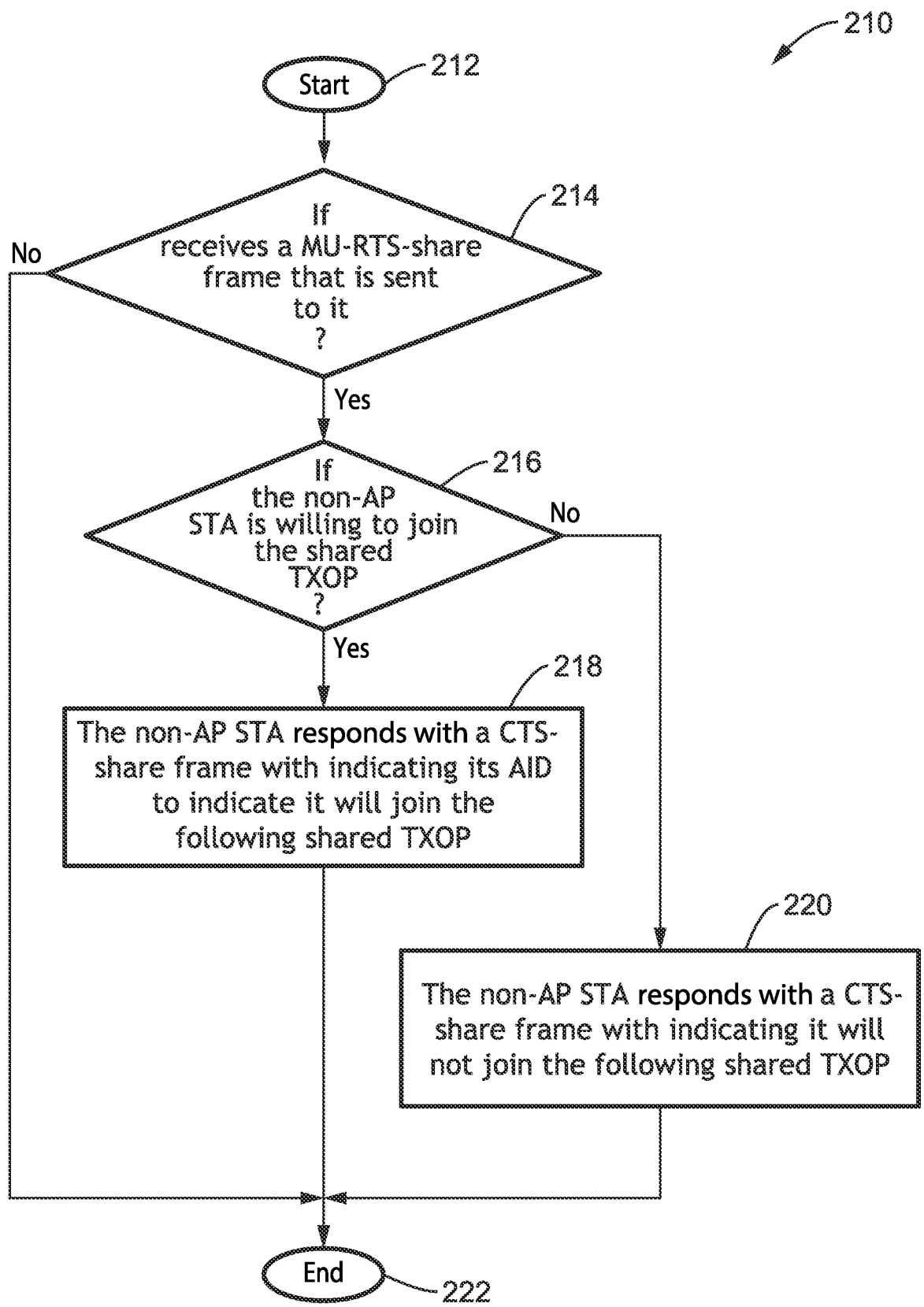
FIG. 19 is a flow diagram of a shared TXOP initialization stage that is handled by the non-AP shared TXOP participant STAs according to at least one embodiment of the present disclosure.

FIG. 19 illustrates an example embodiment 210 of a shared TXOP initialization stage that is handled by the non-AP shared TXOP participant STAs. After the shared TXOP initialization stage starts 212, a check is made 214 to determine if the non-AP STA has received a MU-RTS-share frame. If the MU-RTS share frame is not received, then the process ends 222.

Otherwise, if the non-AP STA receives a MU-RTS-share frame with the AID12 subfield in one of the User Info list Field being the same as the AID of the receiver, then the non-AP STA checks 216 to determine if the non-AP STA is willing to join the shared TXOP. If at block 216 it is determined that the non-AP STA is willing to join the following shared TXOP, then at block 218 the STA responds with a CTS-share frame setting the TXOP Share Participant AID field to its AID, to indicate it will join the following shared TXOP and processing ends 222. Otherwise, if the non-AP STA is not willing to join, then block 220 is reached and the non-AP STA responds with a CTS-share frame setting the TXOP Share Participant AID field to 0 indicating it will not join the following shared TXOP.

7.2.3. TXOP Schedule and Access Stage

In the present disclosure there are multiple solutions for the TXOP schedule and access stage, three of which are exemplified herein with (1) a method with unicasting a TXOP access request trigger as introduced in Section 7.2.3.1, (2) a method with broadcasting a TXOP access request trigger as introduced in section 7.2.3.2, and (3) a method with random access as introduced in section 7.2.3.3.

Figure 20:
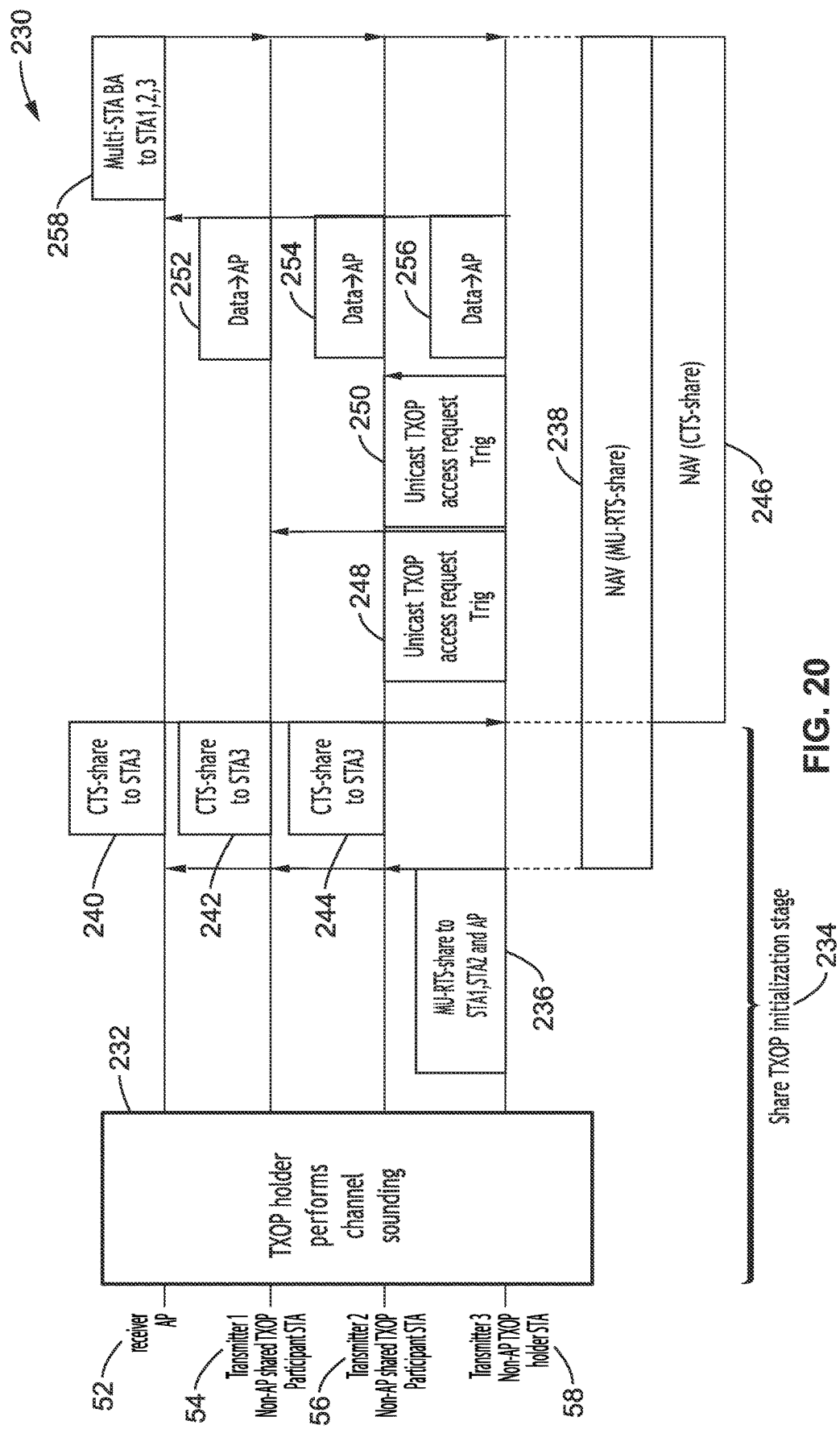
FIG. 20 is a communication sequence diagram of a TXOP schedule and access stage by scheduling with unicast TXOP access request trigger frame for each non-AP shared TXOP participant STAs according to at least one embodiment of the present disclosure.

7.2.3.1. TXOP Schedule and Access Stage with Unicast TXOP Access Request Trigger FIG. 20 illustrates an example embodiment 230 of a TXOP schedule and access stage by scheduling with unicast TXOP access request trigger frame for each non-AP shared TXOP participant STAs. This process is based on the information received from the shared TXOP initialization stage. Again, by way of example and not limitation, this figure is shown with the same AP and STA participants as in previous figures.

The non-AP TXOP holder STA performs channel sounding (beamform testing) 232 to obtain beamform information towards other non-AP STAs. As in the prior example of FIG. 17, a share TXOP initialization stage 234 is performed in which the non-AP TXOP holder STA obtains (grabs) the channel, and is willing to share the TXOP with other non-AP STAs, and sends 236 a MU-RTS-share frame to the potential non-AP shared TXOP participant STAs, with indicated bandwidth (BW) for each specified non-AP STA. A Network Allocation Vector (NAV) (MU-RTS) period 238 commences. Once the non-AP STAs receives this MU-RTS-share frame and is willing to join to following shared TXOP, they respond with a CTS-share frame 240, 242 and 244 to the non-AP TXOP holder STA using the BW as indicated in the received MU-RTS-share frame. A NAV (CTS-share) commences 246.

The non-AP TXOP holder STA unicasts a series of unicast TXOP access request trigger frames 248, 250, which indicate the assigned Resource Unit (RU) for a specific non-AP shared TXOP participant STA for the UL transmission. After the non-AP shared TXOP holder STA sending out the last unicast TXOP access request trigger frame or after the non-AP shared TXOP participant STAs receives the last unicast TXOP access request trigger frame sent by the shared TXOP holder, the non-AP STAs send their Upload (UL) DATA 252, 254 and 256 to the AP; with the TXOP holder using the reserved RU, and the TXOP participant STAs using the assigned RUs. The synchronization of all non-AP STAs that transmit in the shared TXOP is obtained by detecting the last unicast TXOP access request trigger frame with the TXOP Access Start Flag filed set to 1. The receiver AP 52 sends out 258 a multiple station (multi-station) Block Acknowledge (BA) to confirm the successful reception of UL DATA.

Figure 21:
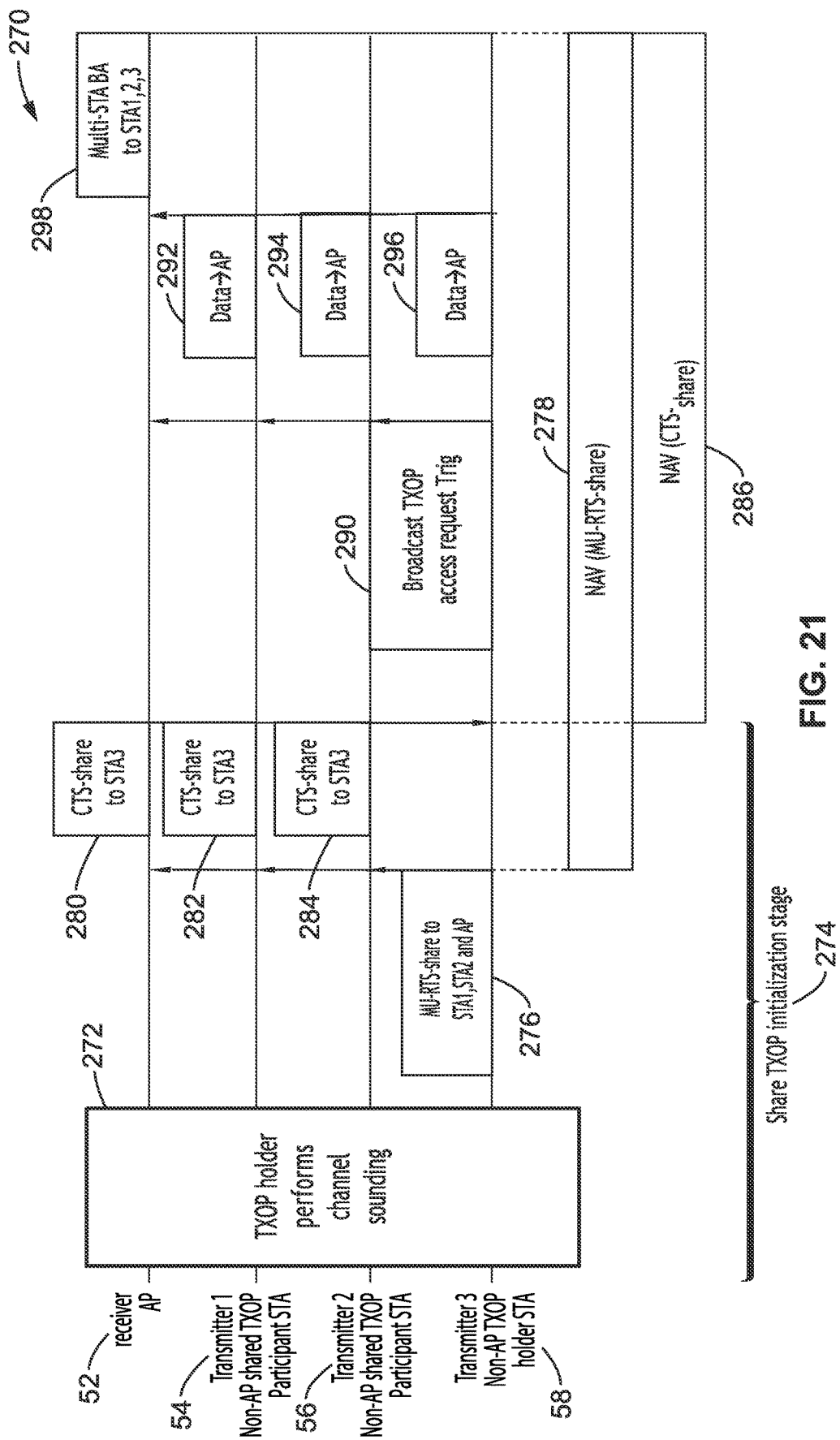
FIG. 21 is a communication sequence diagram of a TXOP schedule and access stage scheduling with broadcast TXOP access request trigger frame for all the non-AP shared TXOP participant STAs according to at least one embodiment of the present disclosure.

7.2.3.2. TXOP Schedule and Access Stage with Broadcast TXOP Access Request Trigger FIG. 21 illustrates an example embodiment 270 of a TXOP schedule and access stage by scheduling with broadcast TXOP access request trigger frame for all the non-AP shared TXOP participant STAs. This process is based on the information get from the shared TXOP initialization stage. Again, by way of example and not limitation, this figure is shown with the same AP and STA participants as in previous figures.

The non-AP TXOP holder STA performs channel sounding (beamform testing) 272 to obtain beamform information towards other non-AP STAs. As in the prior example of FIG. 20, a share TXOP initialization stage 274 is performed in which the non-AP TXOP holder STA obtains (grabs) the channel, and is willing to share the TXOP with other non-AP STAs, and sends 276 a MU-RTS-share frame to the potential non-AP shared TXOP participant STAs, with indicated bandwidth (BW) for each specified non-AP STA. A Network Allocation Vector (NAV) (MU-RTS) period 278 commences. Once the non-AP STAs receives this MU-RTS-share frame and is willing to join the following shared TXOP, they respond with a CTS-share frame 280, 282 and 284 to the non-AP TXOP holder STA using the BW as indicated in the received MU-RTS-share frame. A NAV (CTS-share) commences 286.

After the share TXOP initialization stage 274, the non-AP TXOP holder STA sends a broadcast TXOP access request trigger frame 290, which indicates the assigned RU for each specific non-AP shared TXOP participant STA for the UL transmission.

After sending out the broadcast TXOP access request trigger frames, the non-AP TXOP holder STA sends its UL DATA 296 to the AP using its reserved RU; while each non-AP shared TXOP participant STA sends its UL DATA 292 and 294 using its assigned RU after receiving the broadcast TXOP access request trigger frame. After these uploads the receiver AP 52 sends out 298 a multiple station (multi-station) Block Acknowledge (BA).

7.2.3.3. TXOP Schedule and Access Stage with Random Access

Figure 22:
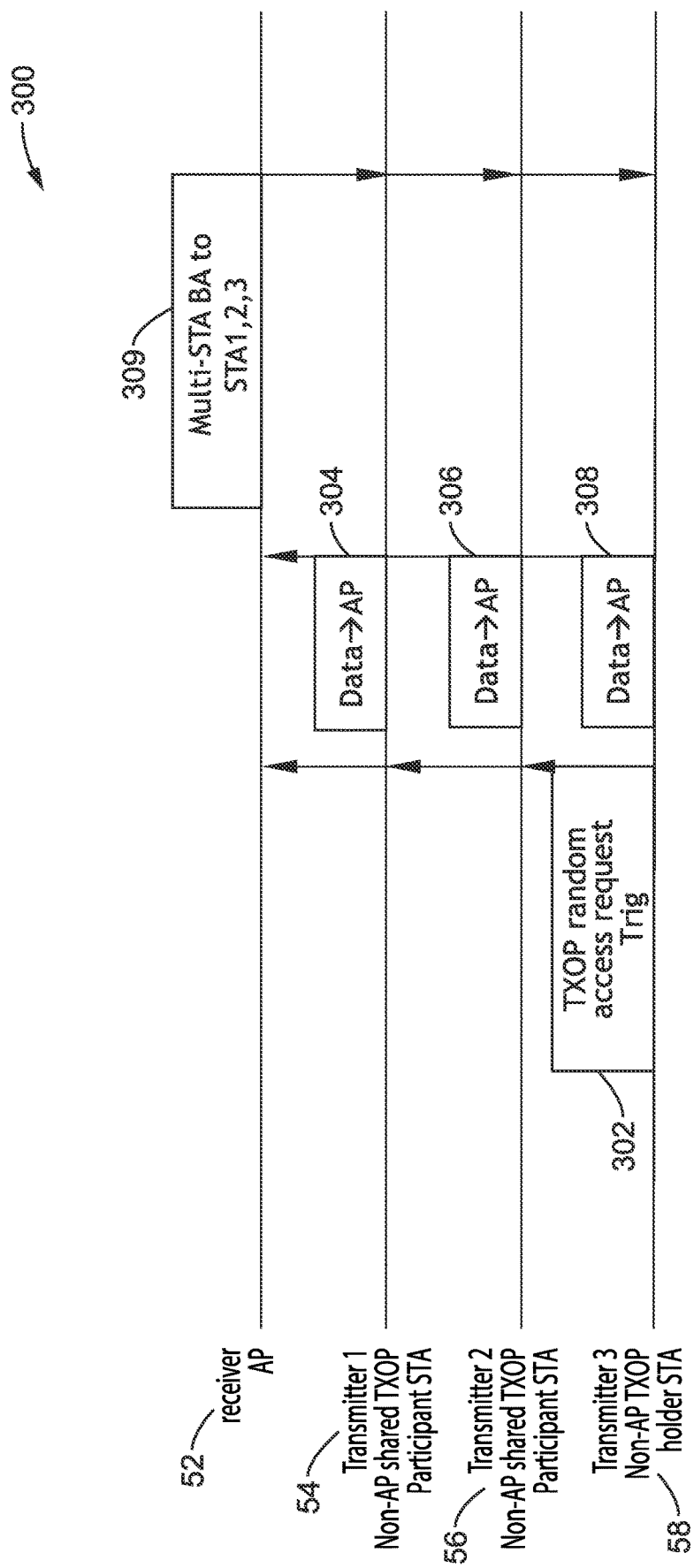
FIG. 22 is a communication sequence diagram of a TXOP schedule and access stage by enabling random access for the non-AP shared TXOP participant STAs according to at least one embodiment of the present disclosure.

FIG. 22 illustrates an example embodiment 300 of a TXOP schedule and access stage by enabling random access for the non-AP shared TXOP participant STAs. Again, by way of example and not limitation, this figure is shown with the same AP and STA participants as in previous figures.

Since random access is applied, the non-AP TXOP holder STA can skip (forego) the shared TXOP initialization stage. The non-AP TXOP holder STA broadcasts a TXOP random access request trigger frame 302, which announces it has reserved an RU for UL transmission.

After sending out the TXOP random access request trigger frame, then the non-AP TXOP holder STA sends its UL DATA 308 to the AP using the reserved RU. After receiving the TXOP random access request trigger frame, the non-AP shared TXOP participant STAs perform random access of the shared TXOP for UL DATA transmission 304 and 306 and contend for the remaining RUs. The synchronization of all non-AP STAs in the shared TXOP is achievable by assuming the propagation delay of the TXOP random access request trigger frame is sufficiently small so that it may be ignored. After these uploads the receiver AP 52 sends out 309 a multiple station (multi-station) Block Acknowledge (BA).

Figure 23A:
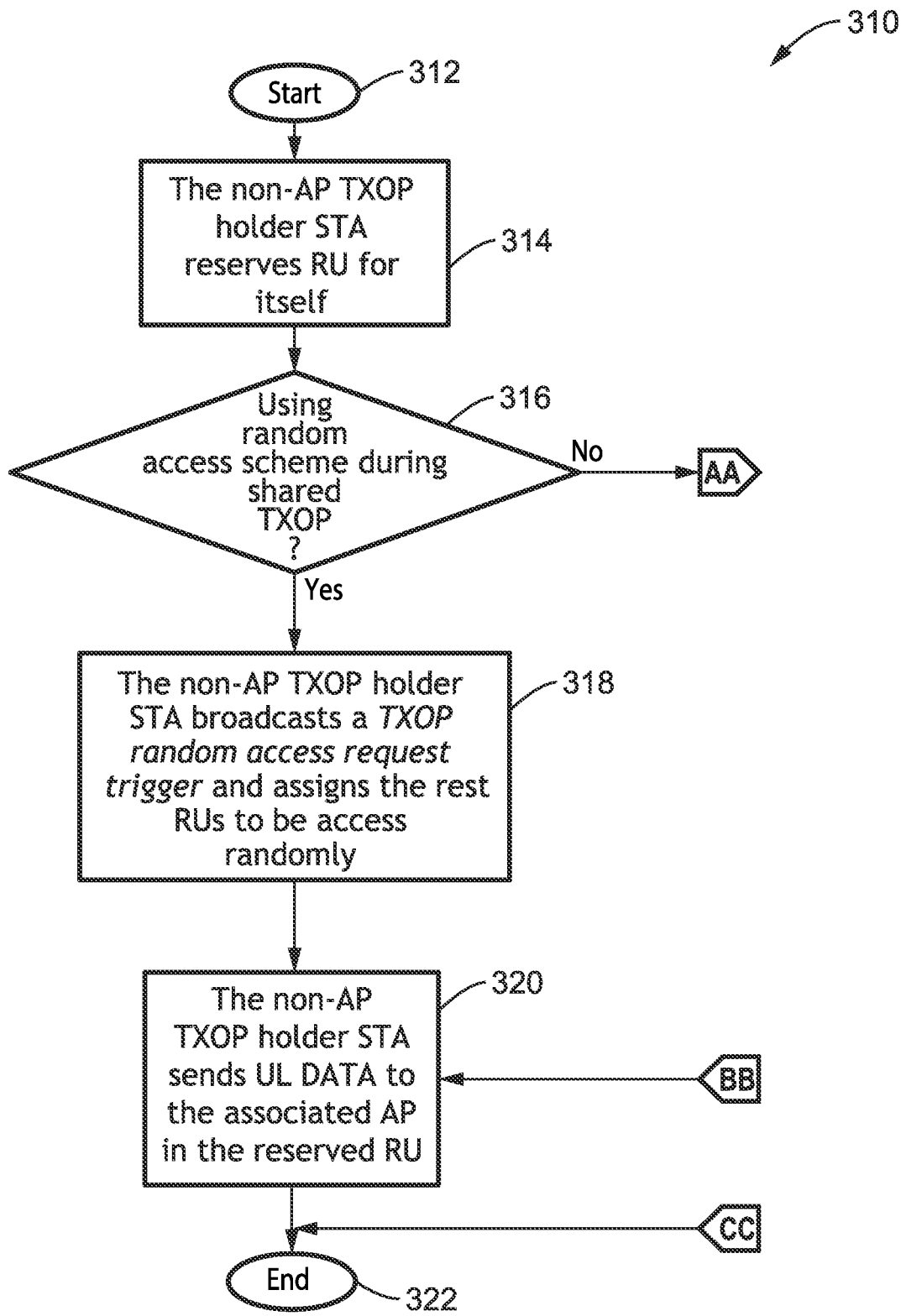
FIG. 23A and FIG. 23B is a flow diagram of a TXOP schedule and access stage handled by non-AP TXOP holder STA according to at least one embodiment of the present disclosure.
Figure 23B:
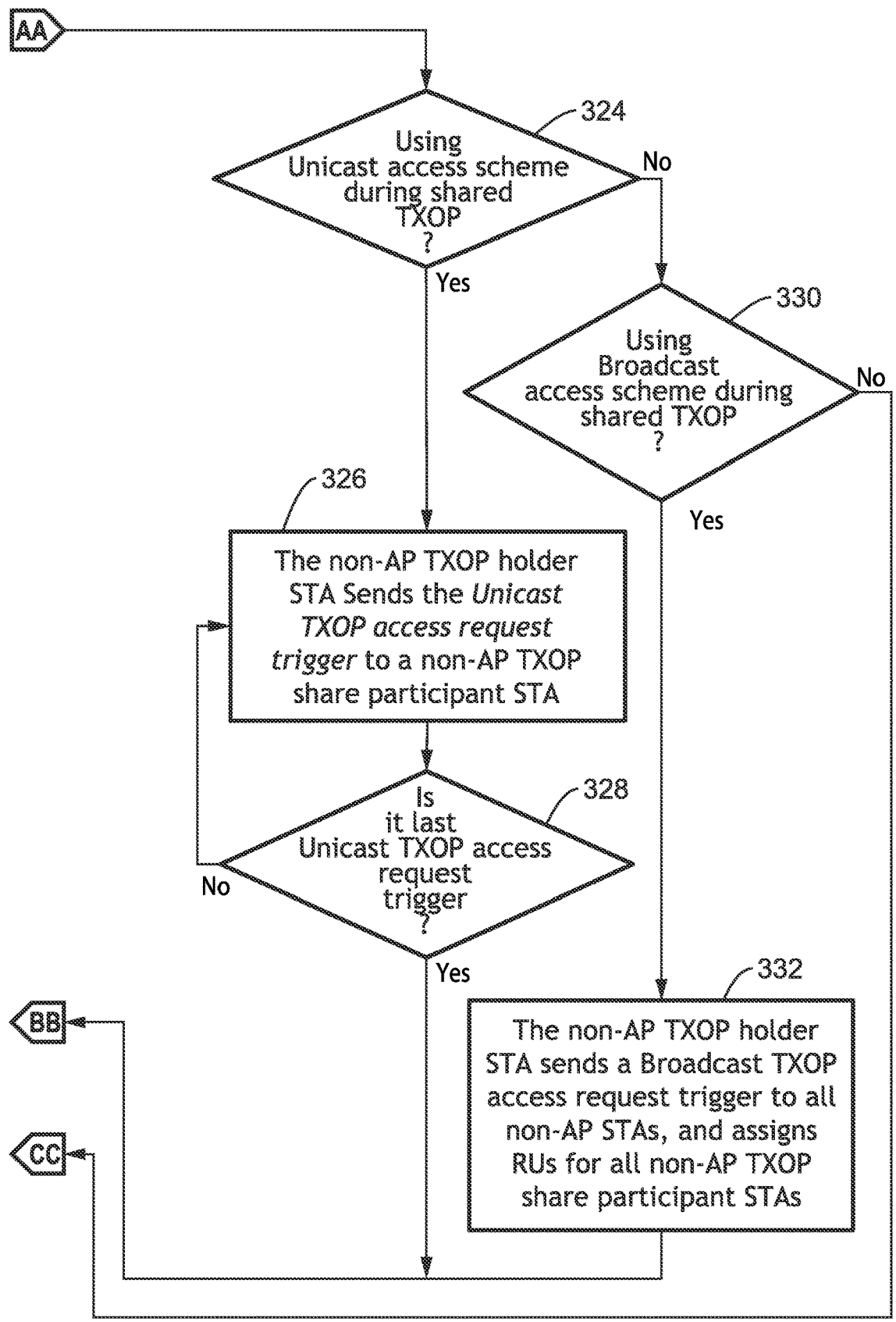

FIG. 23A and FIG. 23B illustrate an example embodiment 310 of a TXOP schedule and access stage handled by the non-AP TXOP holder STA. After the TXOP schedule and access stage commences 312, the non-AP TXOP holder STA reserves 314 an RU for itself and is willing to share the remaining RUs with other non-AP STAs. By way of example and not limitation, three different forms of TXOP access scheduling have been described which can be processed by the non-AP TXOP holder STA, which includes the scheduler based on random access, a unicast TXOP access trigger and a broadcast TXOP access trigger.

At block 316 it is determined if random access is to be used during the shared TXOP. If this is to be random access then block 318 is reached and the non-AP TXOP holder STA broadcasts a TXOP random access request Trigger by broadcasting the TXOP random access request trigger frame to announce the reserved RU for itself and indicate UORA (UL OFDMA-based random access) for other non-AP STAs. Then at block 320 the non-AP TXOP holder STA starts sending UL DATA transmission in the reserved RU before the process ends 322.

Otherwise, if it is determined at block 316 that this is not to be a random access TXOP, then execution moves to block 324 in FIG. 23B which checks if the shared TXOP is to be by unicast access. If this is to be unicast sharing, then block 326 is reached and the non-AP TXOP holder STA sends a Unicast TXOP access request trigger frame to a non-AP TXOP share participant STA with assigned RU. A check is then made 328 for the last unicast TXOP access request trigger. If this is not the last request trigger then execution returns to block 326. Otherwise, if it is the last trigger then execution reaches block 320 in FIG. 23A and the non-AP TXOP holder STA can start its UL DATA transmission before the process ends 322.

Otherwise if it is determined at block 324 that this is not a unicast access, then block 330 determines if this is a broadcast access scheme. If this is not to be broadcast sharing, then since these three examples have all been checked then the process ends 322. It should be noted that the present disclosure is not limited to the exemplified forms of sharing.

However, if it is determined at block 330 to be broadcast sharing, then at block 332 the non-AP TXOP holder STA sends a Broadcast TXOP access request trigger to all non-AP STAs, and it assigns RUs for all non-AP TXOP share participant STAs, and execution moves to block 320 of FIG. 23A with the non-AP TXOP holder STA starting UL DATA transmission in the reserved RU.

Figure 24A:
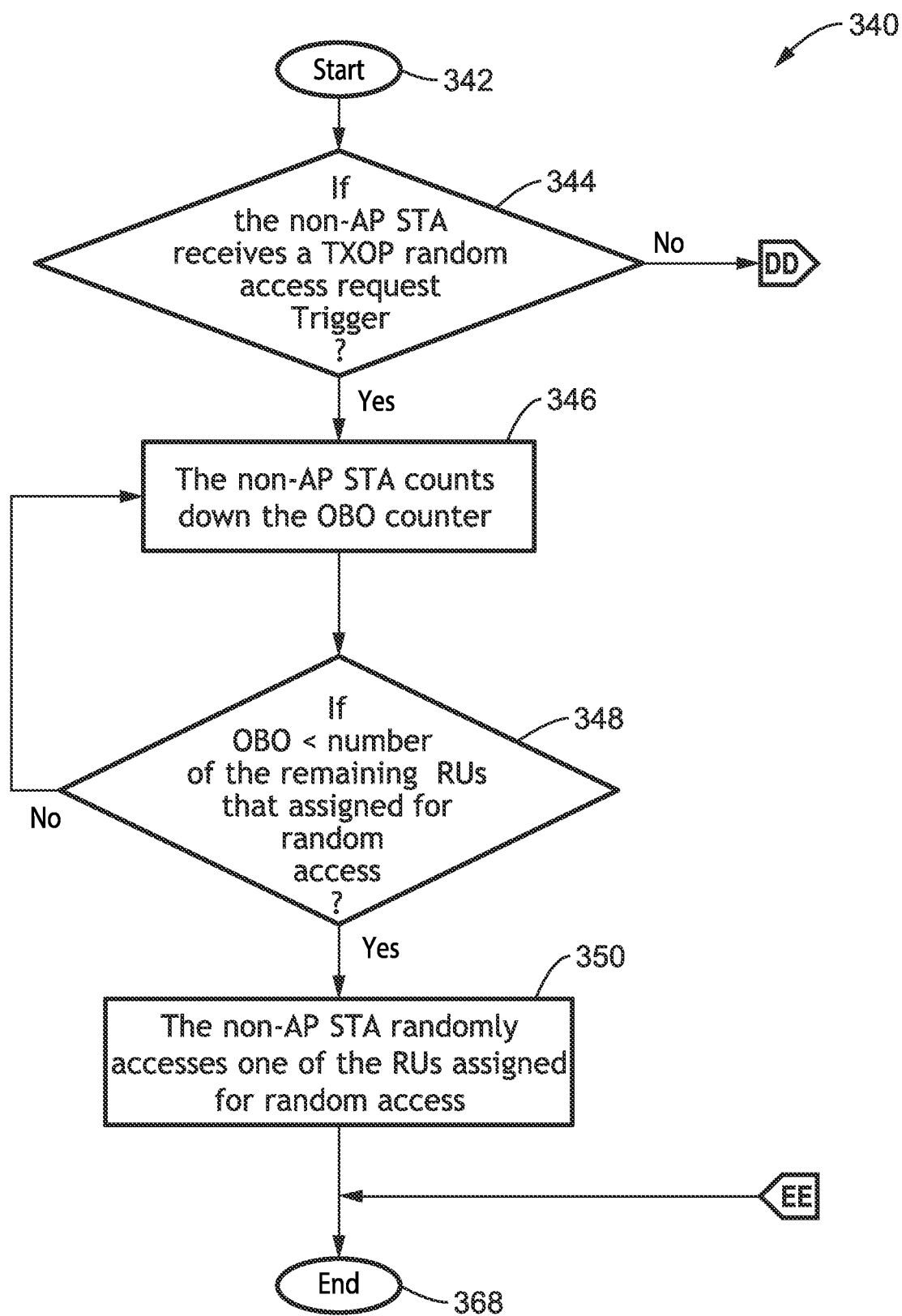
FIG. 24A and FIG. 24B is a flow diagram of a TXOP schedule and access stage handled by non-AP shared TXOP participant STAs according to at least one embodiment of the present disclosure.
Figure 24B:
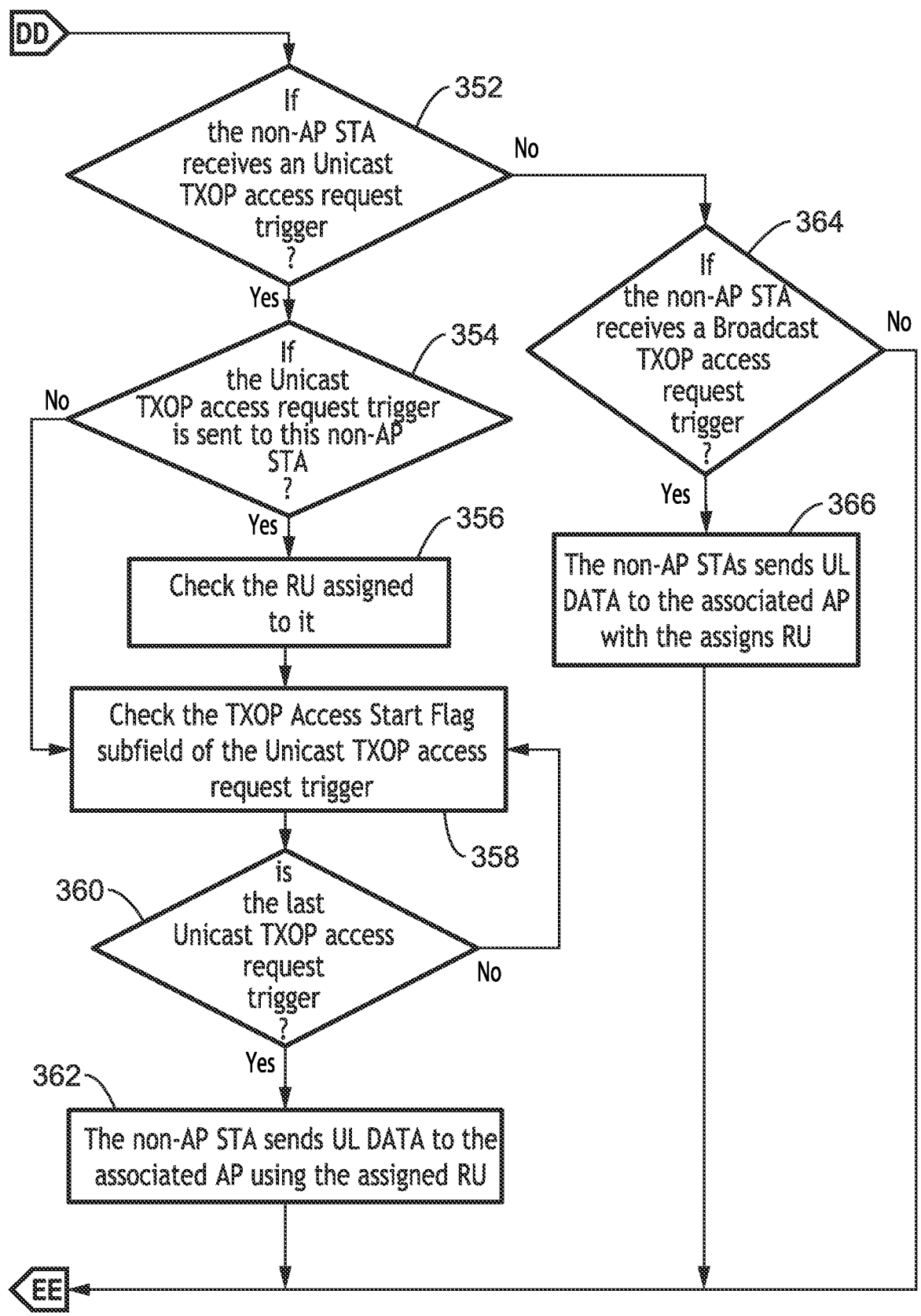

FIG. 24A and FIG. 24B illustrate an example embodiment 340 of a TXOP schedule and access stage handled by non-AP shared TXOP participant STAs.

After the TXOP schedule and access stage starts 342 a check is made 344 to determine if the non-AP shared TXOP participant STA received a TXOP random access request trigger frame.

If the non-AP shared TXOP participant STA received a TXOP random access request trigger frame, then at block 346 it counts down the OBO (OFDMA random access Back Off) counter which is randomly selected within the range between zero (0) to OCW (OFDMA Contention Window). A check is made 348 to determine if the OBO counter of this non-AP STA is less than the number of RUs assigned for random access. If this condition is not met, then execution returns to block 346 and the OBO continues counting down. Otherwise, with the condition being met the non-AP STA randomly accesses 350 one of the RUs assigned for random access which is indicated by the selected subset of User Info fields of the TXOP random access request Trigger frame and the process ends 368.

Returning to block 344, if the non-AP STA does not receive a TXOP random access request trigger, then execution moves to block 352 in FIG. 24B with a check to determine if the non-AP shared TXOP participant STA receives a unicast TXOP access request trigger. If the condition is met, then at block 354 a check is made to determine if the Unicast TXOP access request trigger frame is sent to this non-AP shared TXOP participant STA. If this condition is met, the execution moves to block 356, the non-AP shared TXOP participant STA checks the RU assigned to it, and then execution reaches block 358. Otherwise if the condition of block 354 is not met, then execution moves directly to block 358.

At block 358 TXOP Access Start Flag subfield of the Unicast TXOP access request trigger is analyzed. Then at block 360 a check is made to determine if this is the last Unicast TXOP access request trigger. If this is the last Unicast TXOP access request trigger (as indicated in the TXOP Access Start Flag subfield of the most recently received Unicast TXOP access request trigger frame), then the non-AP STA sends 362 the UL DATA to the associated AP with the assigned RU size for it, which is indicated in the Unicast TXOP access request trigger and the process ends 368. Otherwise, if the condition at block 360 is not met then the non-AP STA continues checking the TXOP Access Start Flag subfield of the next received unicast TXOP access request trigger by returning to block 358.

Returning to block 352, in the case that a Unicast TXOP access request trigger was not received, then block 364 is reached which checks if the non-AP STA received a Broadcast TXOP access request trigger. If the condition is met then the STA sends 366 UL DATA to the associated AP with the assigned RUs indicated in the Broadcast TXOP access request trigger frame. And in either case the process ends 368.

7.3. Dynamic Scenario with AP as Coordinator

In this scenario (case), after the non-AP TXOP holder STA obtains (grabs) the channel instead of waiting for the AP to send trigger frames. The non-AP TXOP holder STA is able to initiate the MU UL transmission with other non-AP STAs. The non-AP TXOP holder STA cannot directly communicate with other non-AP STAs that are willing to participate in the following shared TXOP. In this case, the AP needs to be involved to coordinate between the non-AP TXOP holder STA and the other non-AP shared TXOP participant STAs.

7.3.1. Shared TXOP Initialization Stage

Figure 25:
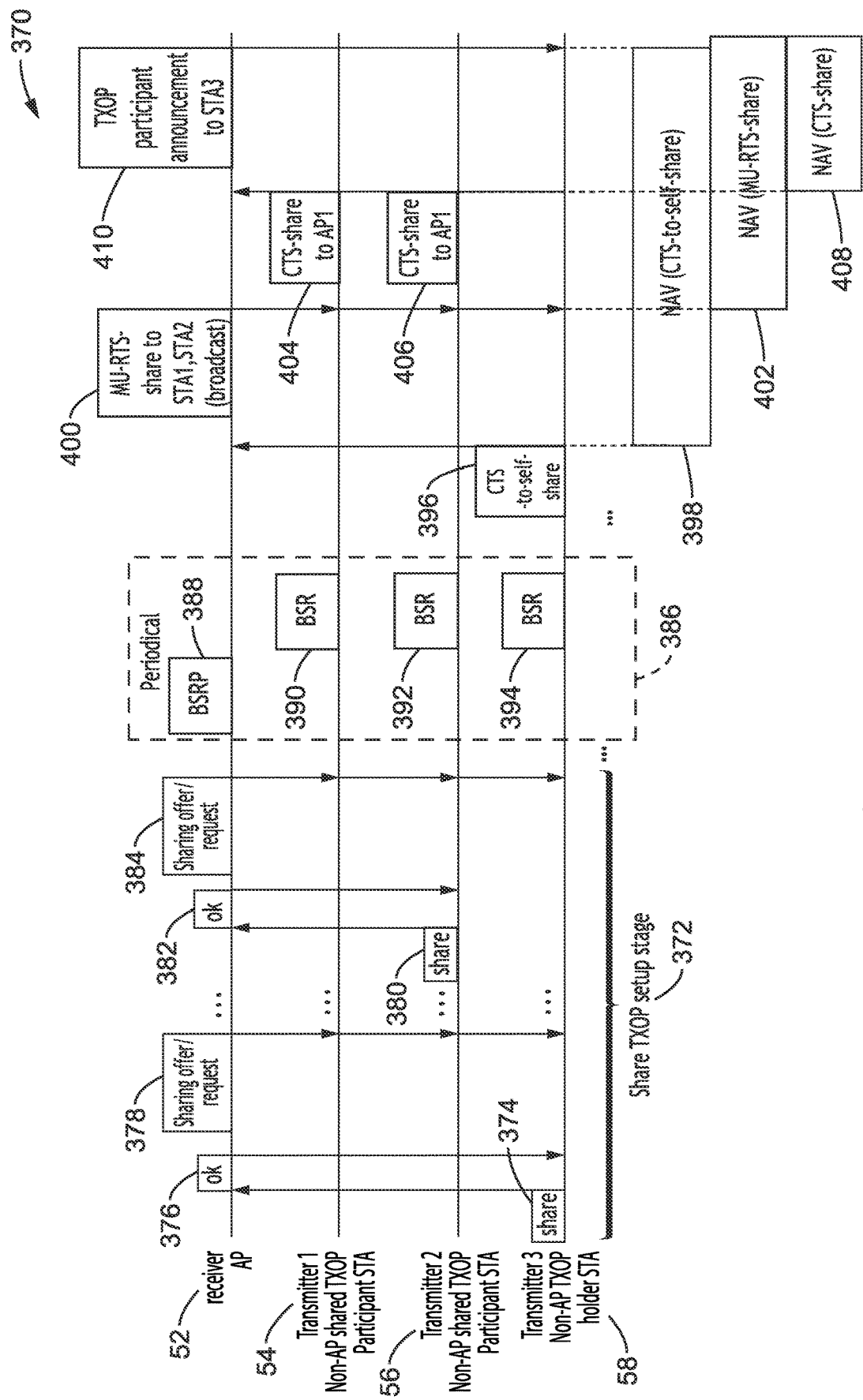
FIG. 25 is a communication sequence diagram a shared TXOP initialization stage in the scenario with AP as the coordinator according to at least one embodiment of the present disclosure.

FIG. 25 illustrates an example embodiment 370 of a shared TXOP initialization stage 372 in the scenario with AP as the coordinator. Again, by way of example and not limitation, this figure is shown with the same AP and STA participants as in previous figures.

A setup stage 372 is performed as in FIG. 14. Non-AP STA3 58 communicates shareability information 374 with the AP, which responds 376, and then the AP broadcasts shareability information to all associated non-AP STAs with a sharing offer/request frame 378. Also STA2 56 is shown sending a share 380 to the AP which responds 382 and then broadcasts the sharing offer/request. 384.

The figure depicts a periodic buffer status operation 386, in which a Buffer Status Report Poll (BSRP) frame 388 is periodically sent by the AP to poll the non-AP STAs to request their Buffer Status Report (BSR). Once the non-AP STAs receives the BSRP, they each responds with a BSR frame 390, 392 and 394 to report their buffer status and traffic priority.

Since the non-AP TXOP holder STA might not be able to directly communicate with other non-AP STAs in the BSS, it starts the TXOP initialization stage by unicasting 396 a modified CTS-to-self-share frame indicating that the following TXOP is a shared TXOP to the associated AP, which also starts the NAV (CTS-to-self-share) 398.

The AP 52 receives the modified CTS-to-self-share frame from the non-AP TXOP holder STA, then broadcasts 400 a MU-RTS-share frame to all non-AP STAs, starting NAV (MU-RTS share) 402. After receiving the MU-RTS-share frame, each non-AP STA checks to see if it is willing to participate in the following shared TXOP. If the non-AP STA is willing to participate then it responds with a CTS-share frame with its AID indicated in the TXOP Share Participant AID field and sends this CTS-share frame back to the associated AP. If it is not willing to participate then the non-AP STA responds with a CTS-share frame having the TXOP Share Participant AID field set as 0. The figure depicts STA1 54 and STA2 56 responding with the CTS-share 404 and 406 to AP1, at which time NAV (CTS-share) 408 starts. After receiving the CTS share information the AP then sends a TXOP participant announcement 410 to STA3 58.

Figure 26:
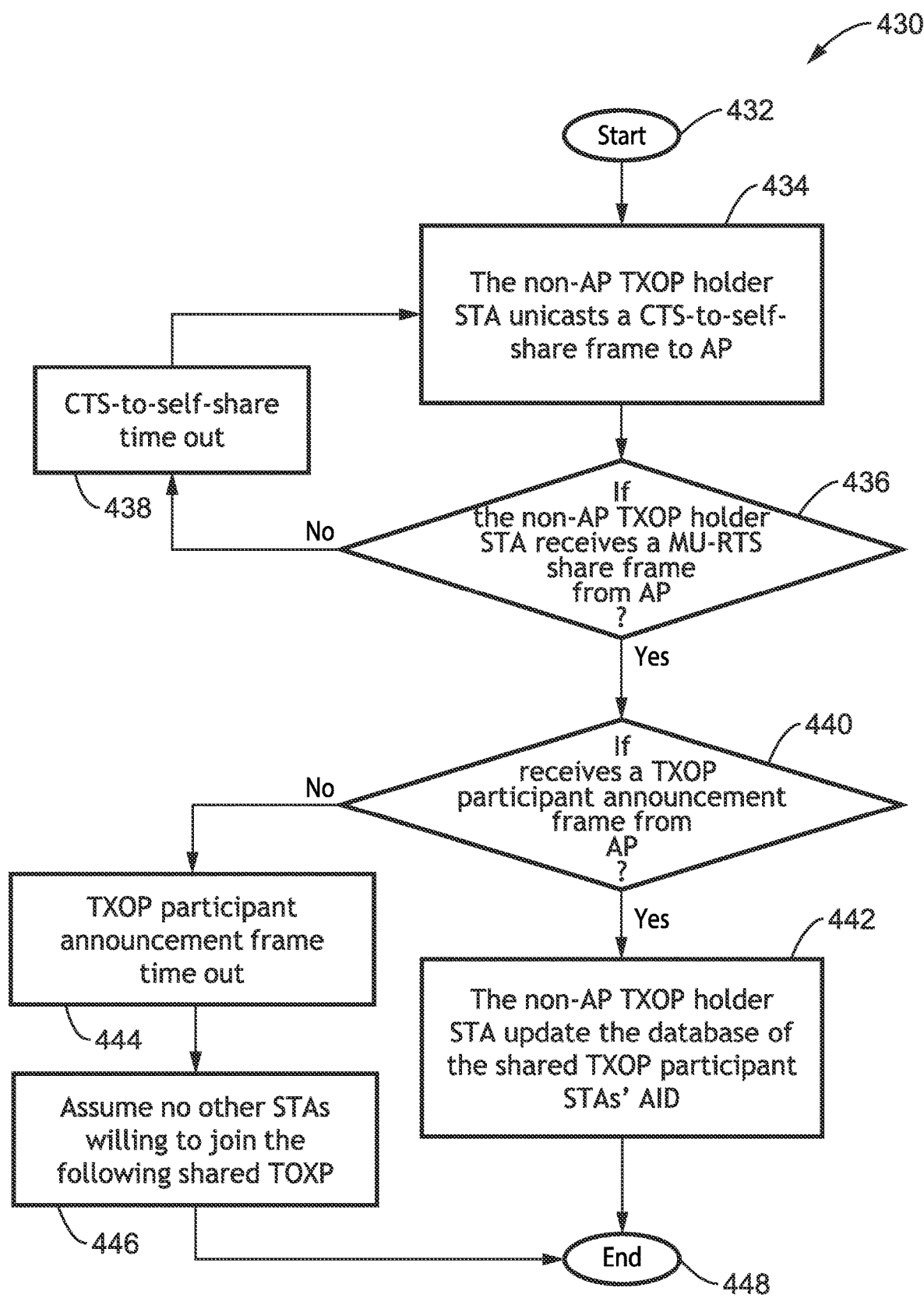
FIG. 26 is a flow diagram of a shared TXOP initialization stage handled by the non-AP TXOP holder STA according to at least one embodiment of the present disclosure.

FIG. 26 illustrates an example embodiment 430 of a shared TXOP initialization stage handled by the non-AP TXOP holder STA. After the shared TXOP initialization stage starts 432, the non-AP TXOP holder STA unicasts 434 a CTS-to-self-share frame to the AP to indicate the start of the shared TXOP initialization stage. A check is made 436 to determine if a MU-RTS-share frame has been received. If there is no MU-RTS-share frame received within the CTS-to-self-share frame time out, then a CTS-to-self share timeout occurs 438 and the non-AP TXOP holder STA retransmits the CTS-to-self frame at block 434.

Otherwise, if the MU-RTS share frame was received, then a check 440 is performed to determine if a TXOP participant announcement was received from the AP. If the condition is met, then the STA updates 442 the data base of the shared TXOP participant STAs' AID and the process ends 448.

Otherwise, if at block 440 a participant announcement was not received from the AP, then the non-AP TXOP holder STA is no longer waiting for the TXOP participant announcement frame as it has timed out 444, and it is assumed 446 that no other STAs are willing to join the following shared TXOP, and the process ends 448.

Figure 27:
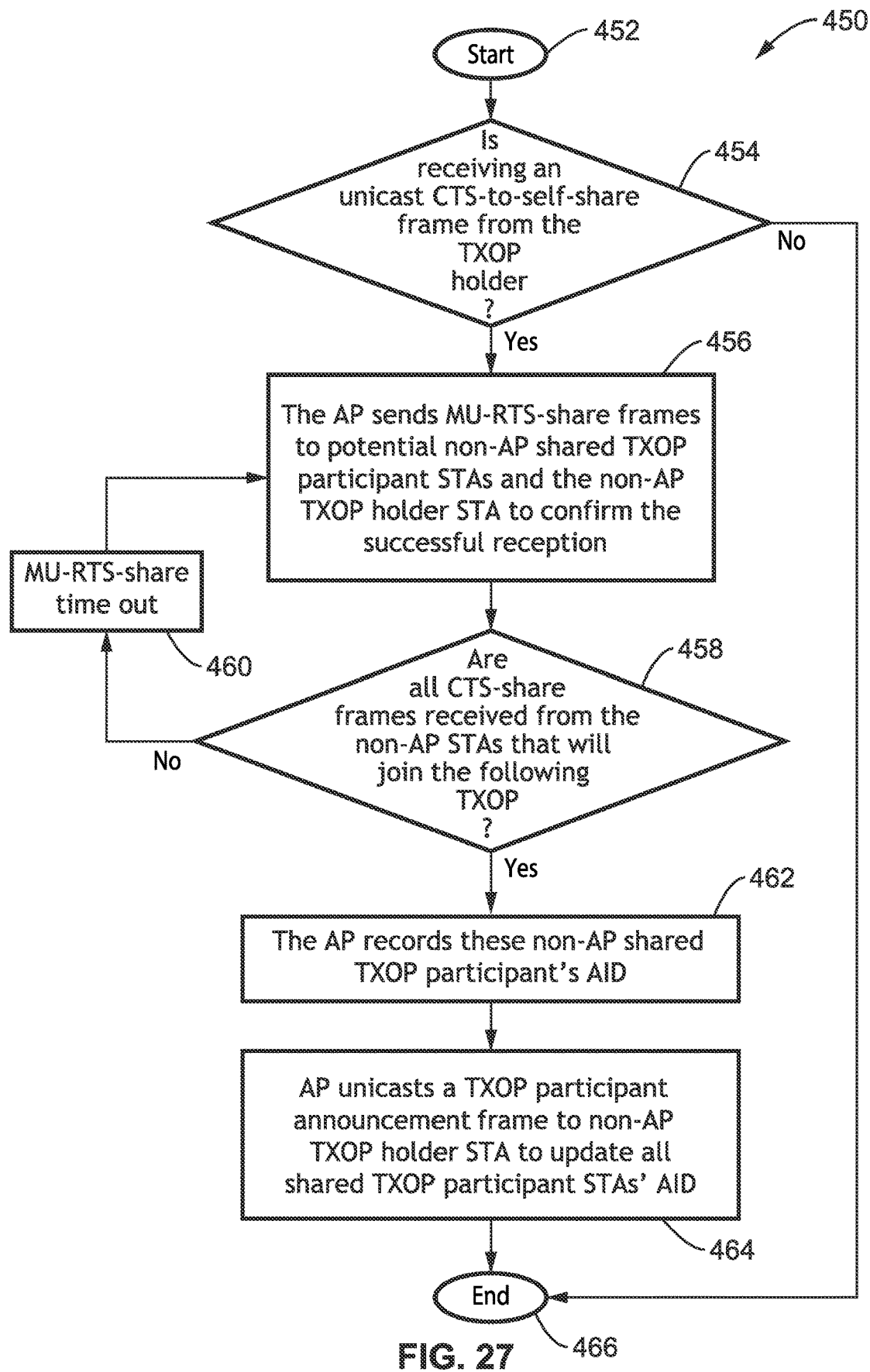
FIG. 27 is a flow diagram of a shared TXOP initialization stage that handled by AP according to at least one embodiment of the present disclosure.

FIG. 27 illustrates an example embodiment 450 of a shared TXOP initialization stage as handled by the AP. After the shared TXOP initialization stage starts 452 a check is made 454 to determine if the AP received the CTS-to-self-share frame from the non-AP TXOP holder STA. If it did not receive it, then processing ends 466. Otherwise, after the CTS-to-self share frame was received then the AP sends 456 a MU-RTS-share frame to at least some potential non-AP shared TXOP participant STAs, and allocates specific BW for each non-AP shared TXOP participant STA to respond to a CTS-share frame.

A check 458 is made for receiving CTS share frames. If the AP doesn't receive any CTS-share frame within the MU-RTS-share frame timeout period, then an MU-RTS timeout 460 occurs and execution returns to block 456 to retransmit the MU-RTS-share frame.

Otherwise if it is determined that the AP has received CTS-share frames from the non-AP shared TXOP participant STAs, then at block 462 the AID of those STAs that are willing to participate in the following shared TXOP is recorded. It should be noted that this AID information is contained in the received CTS-share frame. Then, the AP unicasts 464 a TXOP participant announcement frame to the non-AP TXOP holder to inform it about following shared TXOP participant information, and the process ends 466. It will be noted that the non-AP TXOP holder STA's MAC address can be found in the RA field of the CTS-to-self frame.

The flow chart of the shared TXOP initialization stage handled by non-AP shared TXOP participant STAs is the same as that seen in FIG. 19.

7.3.2. TXOP Schedule and Access Stage (w/AP Coordinator)

In this section, examples are given for methods of performing the TXOP schedule and access stage using the AP as coordinator.

Figure 28:
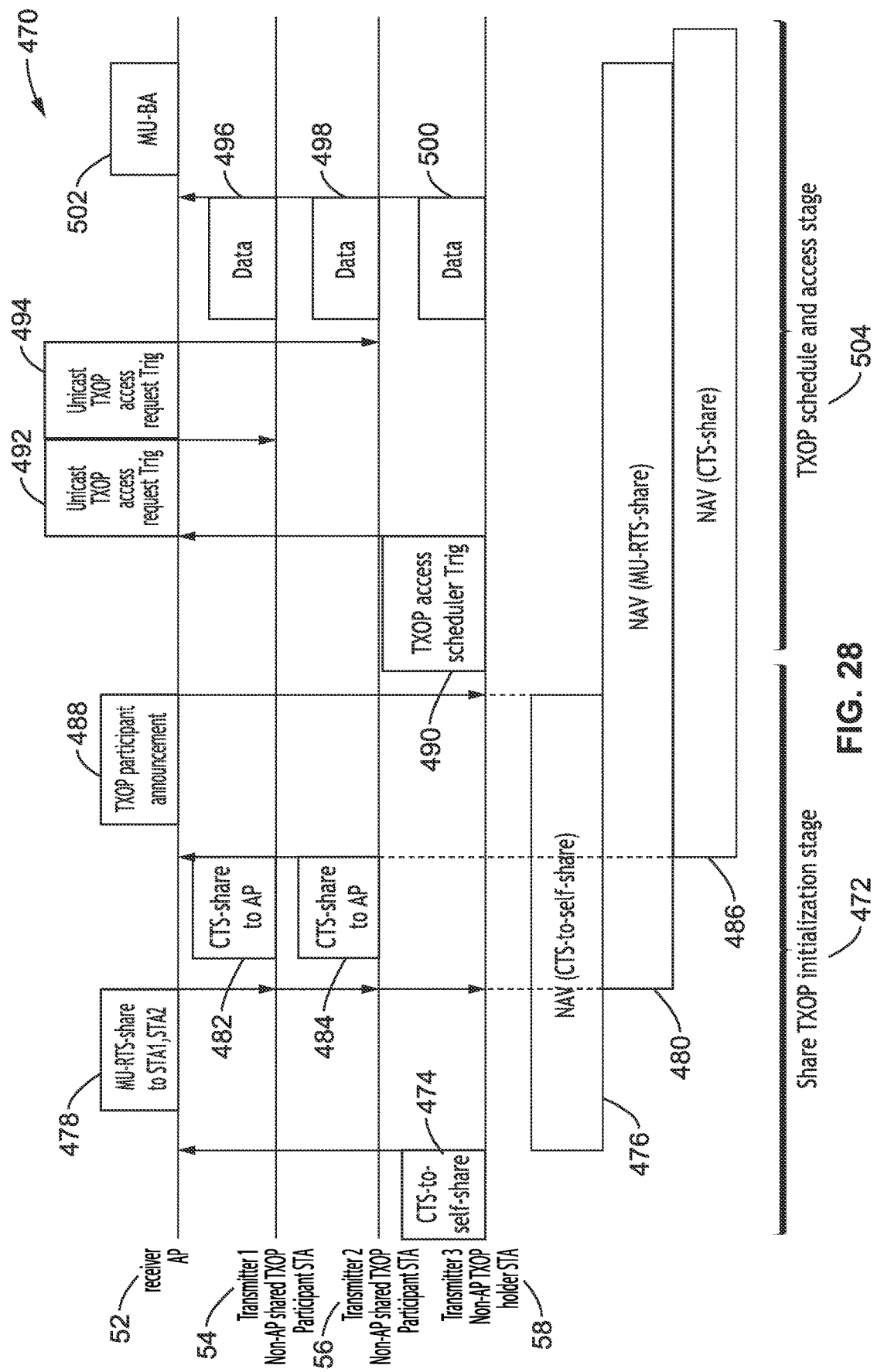
FIG. 28 is a communication sequence diagram a TXOP schedule and access stage for the scenario that with AP as coordinator according to at least one embodiment of the present disclosure.

FIG. 28 illustrates an example embodiment 470 of a TXOP schedule and access stage for unicasting a TXOP access request trigger in a scenario that has the AP as coordinator. The scheduling is achieved with sending a request trigger, and more specifically unicasting a TXOP access request trigger. Again, by way of example and not limitation, this figure is shown with the same AP and STA participants as in previous figures.

The share initialization stage 472 is like that seen on in FIG. 25. TXOP holder STA3 58 unicasts 474 a CTS-to-self-share frame to the receiver AP 52, which also starts the NAV (CTS-to-self-share) 476. AP 52 receives the modified CTS-to-self-share frame from the non-AP TXOP holder STA, then broadcasts 478 a MU-RTS-share frame to all non-AP STAs, and NAV (MU-RTS share) 480 starts. After receiving the MU-RTS-share frame, each non-AP STA checks to see if it is willing to participate in the following shared TXOP, and sends a CTS-share frame 482 and 484, back to the associated AP, commencing a NAV (CTS-share) 486 period. After receiving the CTS-share information, the AP sends a TXOP participant announcement 488 to STA3.

The TXOP schedule and access stage 504 is based on the shared TXOP participant information collected from the shared TXOP initialization stage. Since the non-AP TXOP holder STA cannot directly communicate with other non-AP STAs in the BSS, it starts the TXOP schedule and access stage by sending 490 a TXOP access scheduler trigger frame to the AP. The TXOP access scheduler trigger frame contains information on an RU distribution to all the non-AP shared TXOP participant STAs.

After receiving the TXOP access scheduler trigger frame, the AP sends, preferably unicasting, a TXOP access request trigger frame 492 and 494 to each non-AP shared TXOP participant STA, and indicates the assigned RU for the specific non-AP shared TXOP participant STA for the UL transmission.

After receiving the unicast TXOP access request trigger frame, each non-AP shared TXOP participant STA checks the assigned RU for the UL transmission. For both non-AP TXOP holder STA and all the non-AP shared TXOP participant STAs, they start their UL DATA transmission 500, 498 and 496 once they transmit/receive the last unicast TXOP access request trigger, such as with the TXOP Access Start Flag field set to active (e.g., "1"). The AP responds with an MU Block Acknowledgement (BA) frame 502 once it finishes receiving the UL DATA.

Figure 29:
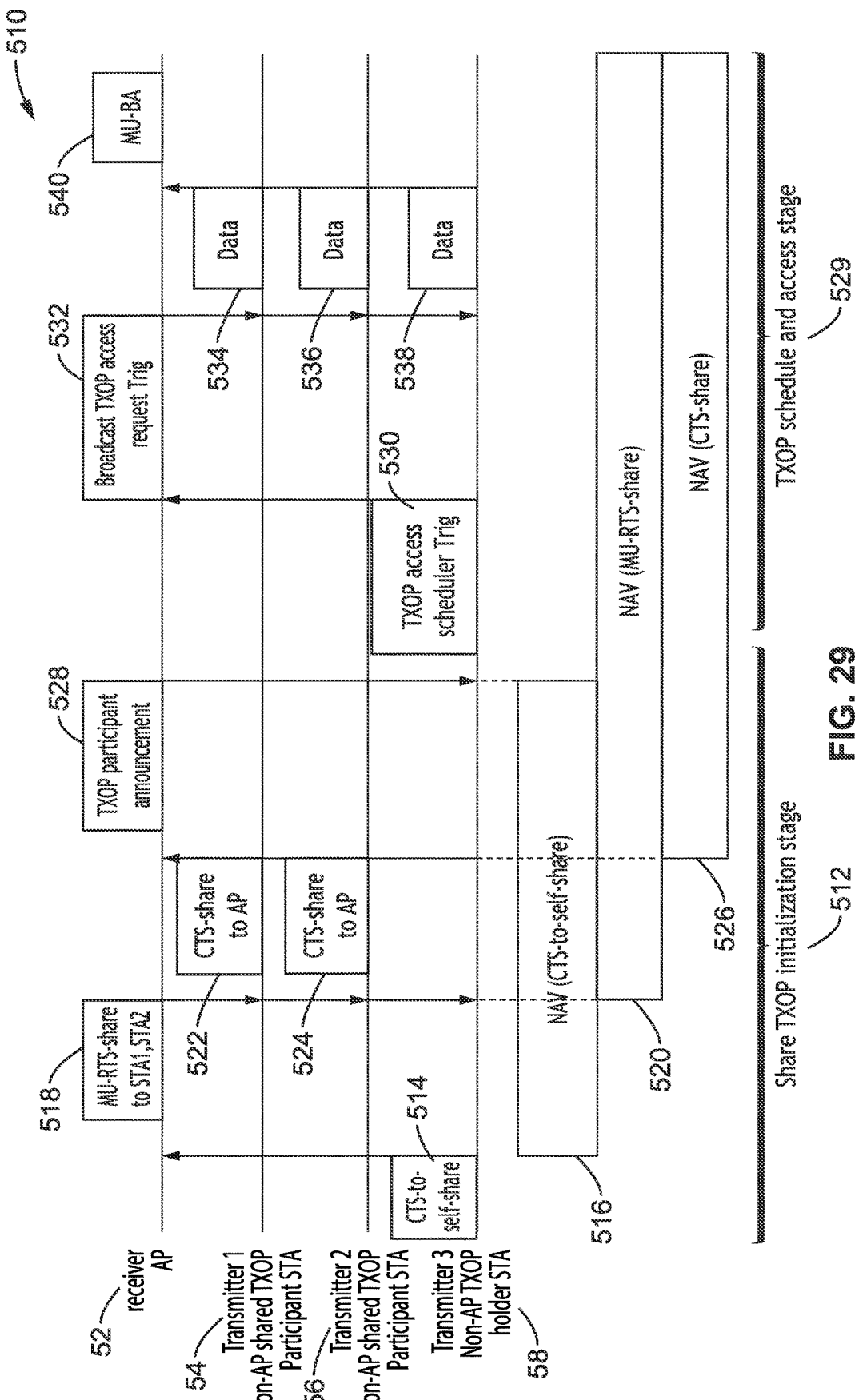
FIG. 29 is a communication sequence diagram a TXOP schedule and access stage for the scenario that with AP as coordinator according to at least one embodiment of the present disclosure.

FIG. 29 illustrates an example embodiment 510 of a TXOP schedule and access stage for broadcasting a TXOP access request trigger in a scenario in which the AP acts as coordinator. The scheduling is achieved with sending broadcast TXOP access request trigger. Again, by way of example and not limitation, this figure is shown with the same AP and STA participants as in previous figures.

The share initialization stage 512 is like that seen on in FIG. 28. TXOP holder STA3 58 unicasts 514 a CTS-to-self-share frame to the receiver AP 52, which also starts the NAV (CTS-to-self-share) 516. AP 52 receives the modified CTS-to-self-share frame from the non-AP TXOP holder STA, then broadcasts 518 a MU-RTS-share frame to all non-AP STAs, and NAV (MU-RTS share) 520 starts. After receiving the MU-RTS-share frame, each non-AP STA checks to see if it is willing to participate in the following shared TXOP, and sends a CTS-share frame 522 and 524, back to the associated AP, commencing a NAV (CTS-share) 526 period. After receiving the CTS-share information, the AP sends a TXOP participant announcement 528 to the TXOP holder (STA3).

The TXOP schedule and access stage 529 is based on the shared TXOP participant information collected from the shared TXOP initialization stage 512. Since the non-AP TXOP holder STA cannot directly communicate with other non-AP STAs in the BSS, it starts the TXOP schedule and access stage by sending a TXOP access scheduler trigger frame 530 to the AP. The TXOP access scheduler trigger frame contains the RU distribution to all the non-AP shared TXOP participant STAs.

After receiving the TXOP access scheduler trigger frame, the AP sends a broadcast TXOP access request trigger frame 532 to all non-AP shared TXOP participant STAs, and indicates the assigned RU, or RUs, for each specific non-AP shared TXOP participant STA for the UL transmission. Once the broadcast TXOP access request trigger frame has been received, each non-AP shared TXOP participant STA checks the assigned RU and starts its UL transmission 538, 536 and 534.

In at least one embodiment, the non-AP TXOP holder STA starts sending its UL DATA transmission using the reserved RU once it sends out the broadcast TXOP access request trigger. The other non-AP shared TXOP STAs transmit their UL DATA in its assigned RU (or RUs). The AP responds with a MU-BA frame 540 once it has received the UL DATA.

Figure 30:
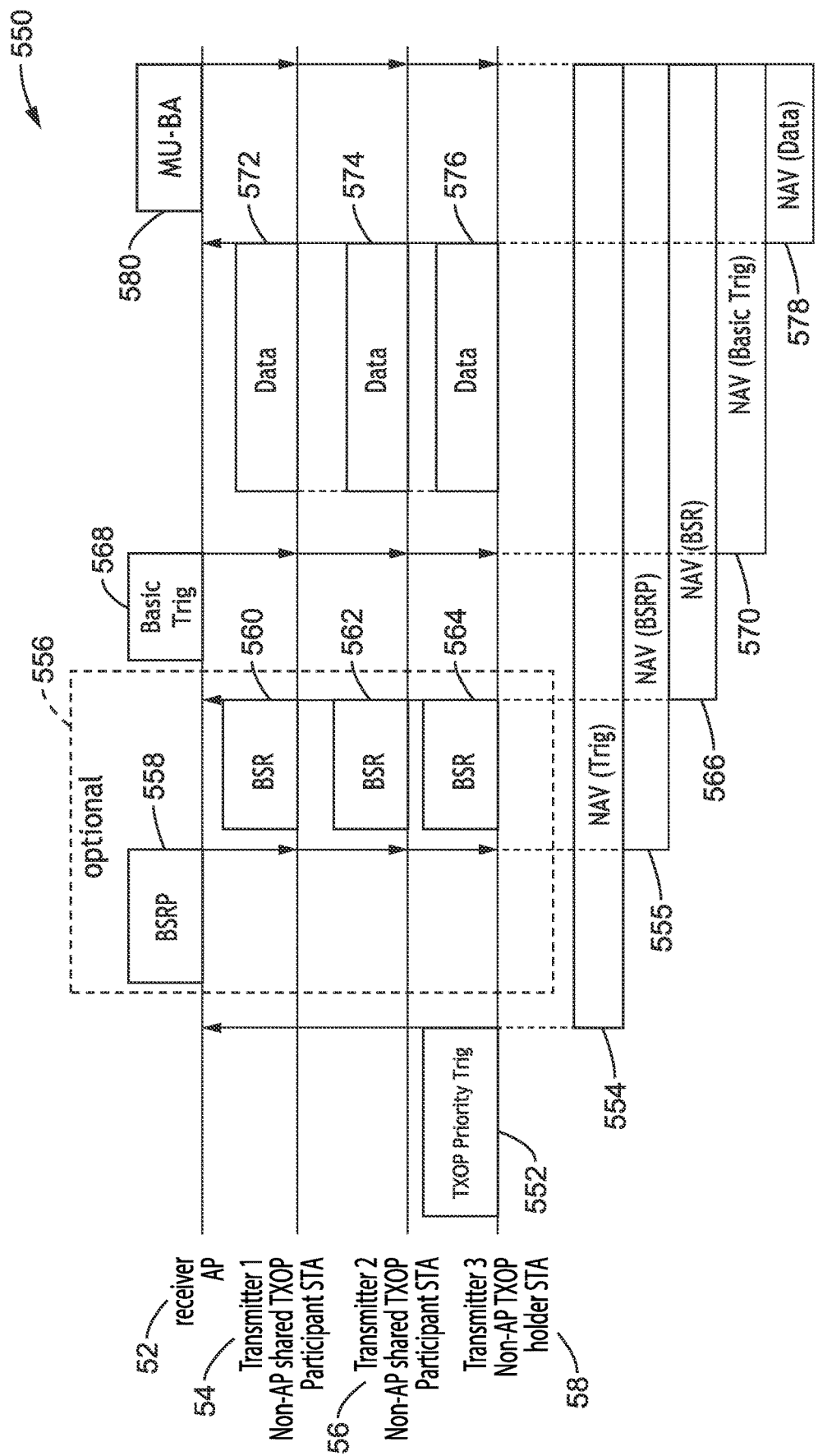
FIG. 30 is a communication sequence diagram a TXOP schedule and access stage for the scenario that with AP as coordinator according to at least one embodiment of the present disclosure.

FIG. 30 illustrates an example embodiment 550 of a TXOP schedule and access stage using a basic trigger in a scenario that has the AP as coordinator. Again, by way of example and not limitation, this figure is shown with the same AP and STA participants as in previous figures.

The scheduler is designed in this case for a basic trigger frame. The non-AP TXOP holder of STA3 is seen transmitting a TXOP priority trigger frame 552 to the AP 52, and the NAV (Trig) 554 starts. An optional collection of buffer status reports is performed 556. In this example the AP periodically broadcasts a BSRP frame 558 to inquire on buffer status of the non-AP STAs, with NAV (BSRP) 555 commencing. The non-AP STAs respond with a BSR frame 560, 562 and 564 to indicate their buffer status and packet information, with NAV (BSR) 566 commencing. The BSRP and BSR exchange may be performed inside or outside of this TXOP schedule and access stage. Since the shared TXOP participant information can be collected from the exchange of BSRP and BSR frames, the shared TXOP initialization stage can be skipped.

The non-AP TXOP holder STA cannot directly communicate with other non-AP STAs in the BSS, as this example depicts scheduling being performed by the AP, thus the non-AP TXOP holder starts the TXOP schedule and access stage by sending the TXOP priority trigger frame 552 to the AP. The TXOP priority trigger frame indicates the reserved RU for the non-AP TXOP holder STA.

After receiving the TXOP priority trigger frame, the AP broadcasts a basic trigger frame 568 to each non-AP shared TXOP participant STA and the non-AP TXOP holder STA with NAV (Basic Trig) 570 commencing. The basic trigger frame indicates the assigned RU (or RUs) for each non-AP STA to transmit UL DATA sequences. After receiving the basic trigger frame, each non-AP shared TXOP participant STA starts its UL DATA transmission 572 and 574 using the assigned RU, the non-AP TXOP holder STA starts its UL DATA 576 transmission using the reserved RU, with NAV (Data) 578 commencing. The AP responds with a MU-BA 580 frame once it has finished receiving UL DATA.

Figure 31:
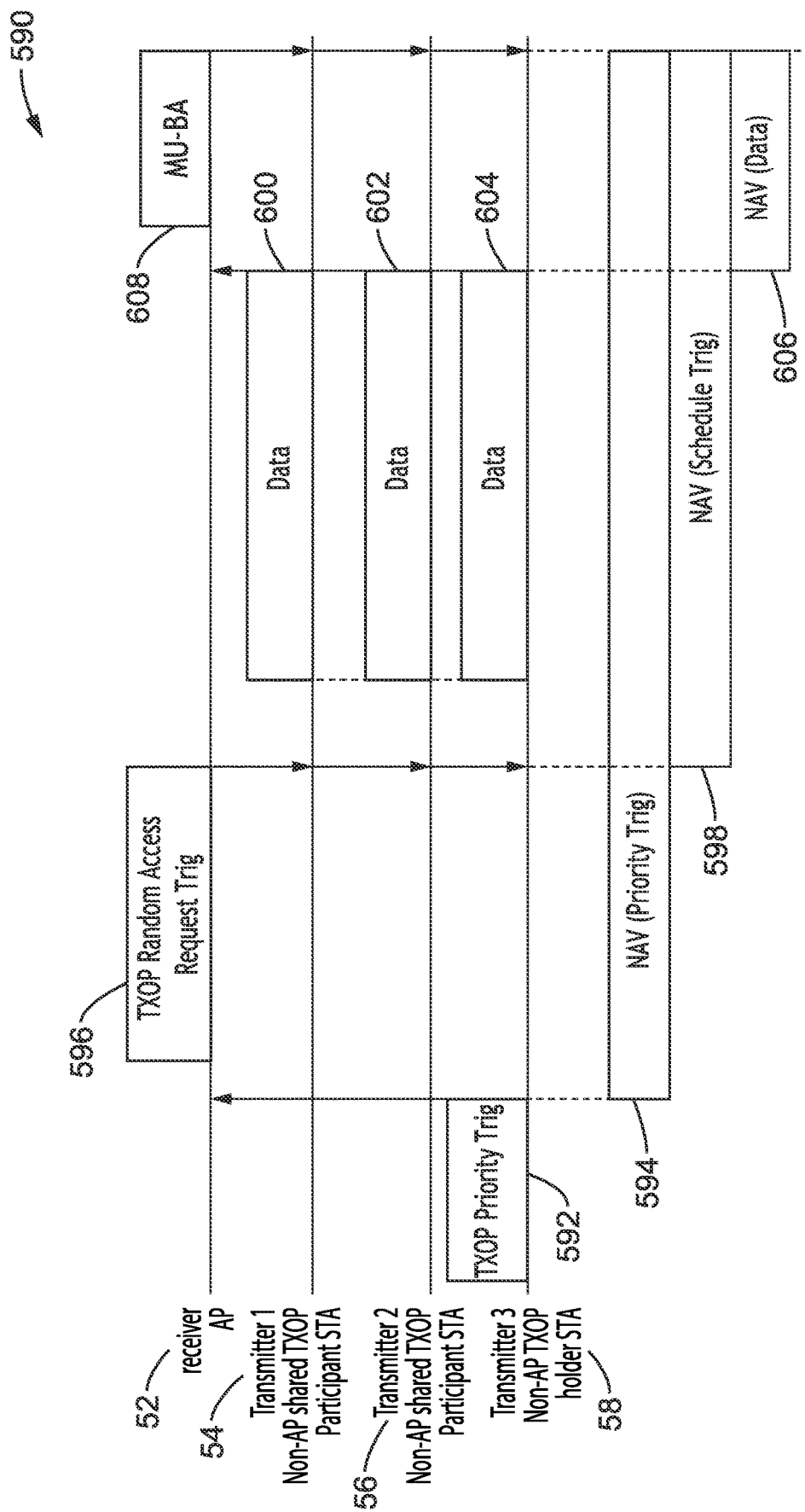
FIG. 31 is a communication sequence diagram a TXOP schedule and access stage for the scenario that with AP as coordinator according to at least one embodiment of the present disclosure.

FIG. 31 illustrates an example embodiment 590 of a TXOP schedule and access stage using random access in a scenario that has the AP as coordinator. The scheduler in this scenario is based on random access. Again, by way of example and not limitation, this figure is shown with the same AP and STA participants as in previous figures.

Since accurate information on the shared TXOP participant is not necessary in this case, the shared TXOP initialization stage can be skipped, as well as the BSRP and BSR exchange.

As the non-AP TXOP holder STA cannot directly communicate with other non-AP STAs in the BSS, it leaves the scheduling to be performed by the AP; therefore the non-AP TXOP holder STA starts the TXOP schedule and access stage by sending a TXOP priority trigger frame 592 to the AP, and NAV (Priority Trig) 594 commences. The TXOP priority trigger frame indicates the reserved RU for the non-AP TXOP holder STA.

After receiving the TXOP priority trigger frame, the AP broadcasts a TXOP random access request trigger frame 596 to each non-AP shared TXOP participant STA and the non-AP TXOP holder STA, which starts NAV (Schedule Trig) 598. After receiving the TXOP random access request trigger frame, each non-AP shared TXOP participant STA starts UL DATA transmission 600 and 602 with randomly accessing the remaining RUs, while the non-AP TXOP holder STA starts its UL DATA transmission 604 using the reserved RU, and the NAV (Data) 606 commences. The AP responds with a MU-BA frame 608 once it has finished receiving UL DATA.

Figure 32A:
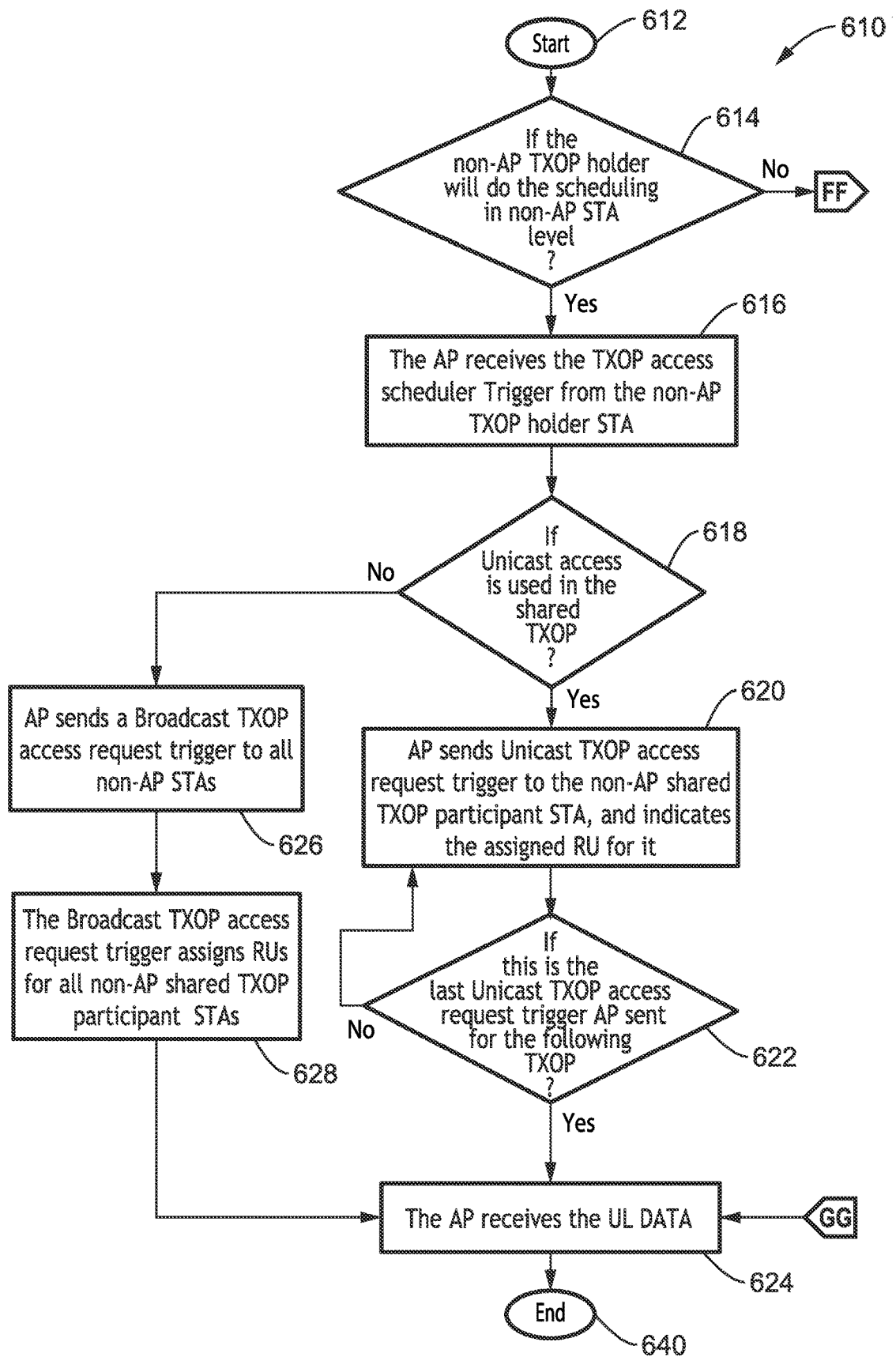
FIG. 32A and FIG. 32B is a flow diagram of a TXOP schedule and access stage with random access handled by AP (with AP as coordinator) according to at least one embodiment of the present disclosure.
Figure 32B:
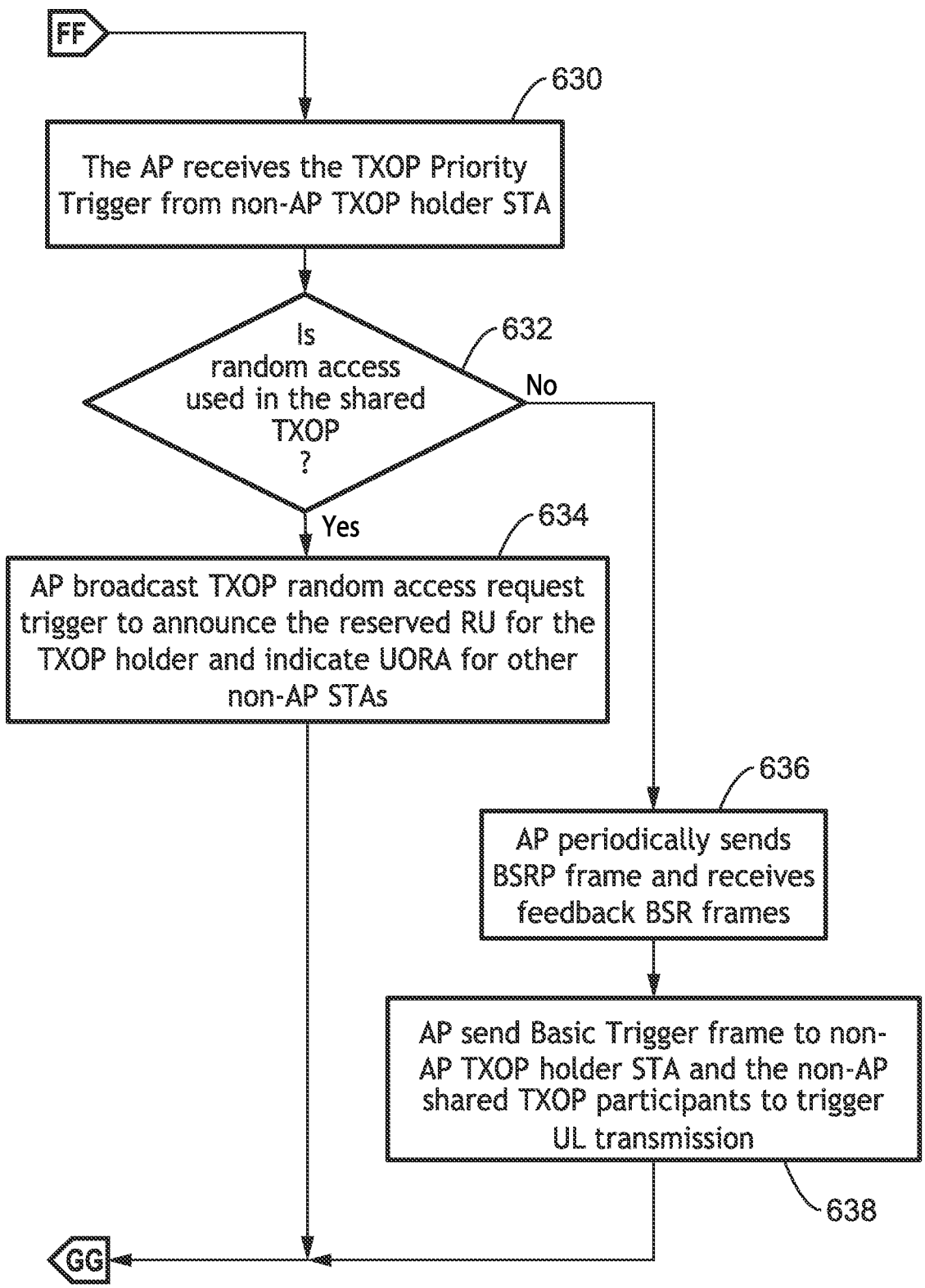

FIG. 32A and FIG. 32B illustrate an example embodiment 610 of a TXOP schedule and access stage with random access handled by the AP as coordinator. After the TXOP schedule and access stage commences 612, the AP first checks 614 if the non-AP TXOP holder will perform the scheduling in a non-AP STA level.

If the non-AP STA is doing the scheduling then block 616 is reached, and the AP will receives the TXOP access scheduler Trigger from the non-AP TXOP holder STA which indicates to distribute the RUs to each non-AP shared TXOP participant STAs. Then, a check 618 is made to determine if unicast access is used in the shared TXOP. If it is unicast access then the AP sends 620 unicast TXOP access request trigger frames to each non-AP shared TXOP participant STA and the AP indicates the assigned RU for this non-AP STA. The AP will be able to receive UL DATA after sending out all the unicast TXOP access request trigger frames, so block 622 checks for the last unicast access, and returns to block 620 until all unicast accesses are complete, at which time block 624 is reached where the AP waits for receiving the UL DATA after which processing ends 640.

Returning to block 618, if it is determined that the unicast access is not being used, then at block 626 the AP sends broadcast TXOP access request trigger frame to all the non-AP shared TXOP participant STAs to trigger the UL DATA transmission. Then at block 628 the broadcast TXOP access request trigger frame indicates the assigned RUs for all non-AP shared TXOP participant STAs. Execution moves to block 624 where the AP waits for receiving the UL DATA.

Returning to block 614 in the case of the scheduling being performed by the AP, execution moves to block 630 of FIG. 32B and the AP receives the TXOP Priority Trigger from non-AP TXOP holder STA which indicates the reserved RU and priority of the non-AP TXOP holder STA. A check 632 is made to determine if random access is used in the TXOP. If this is random access, then at block 634 the AP broadcasts a TXOP random access request trigger by announcing the reserved RU for the TXOP holder and indicating UORA (UL OFDMA-based random access) for other non-AP shared TXOP participant STAs and the process ends 640. Otherwise, execution reaches block 636 with scheduling performed based on buffer status information from the periodically exchange of BSRP and the BSR frames, and the AP sends 638 a basic trigger with assigned RU distribution for each non-AP shared TXOP participant STA before the process ends 640.

Figure 33A:
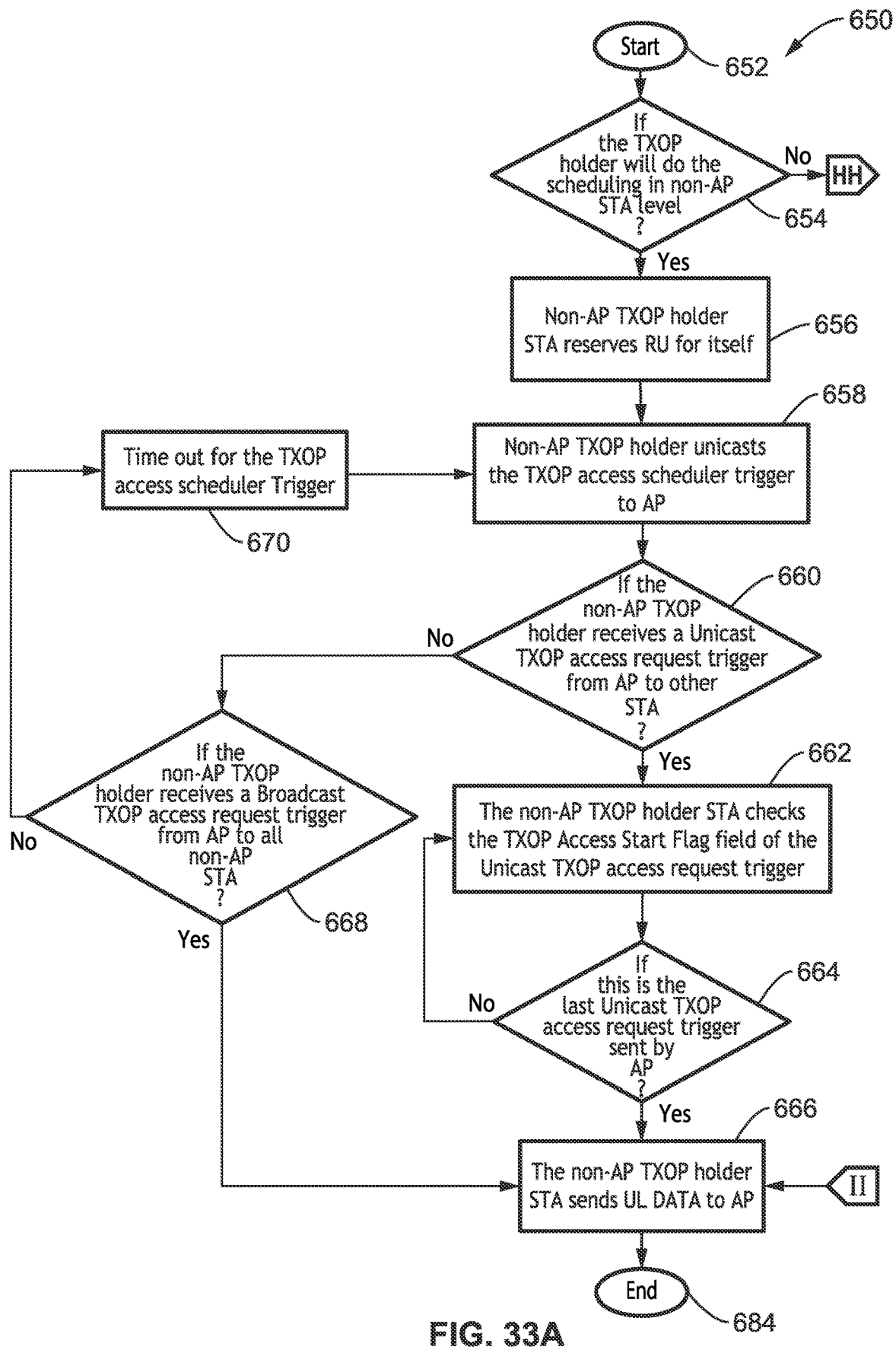
FIG. 33A and FIG. 33B is a flow diagram of a TXOP schedule and access stage with random access handled by non-AP TXOP holder STA (with AP as coordinator) according to at least one embodiment of the present disclosure.
Figure 33B:
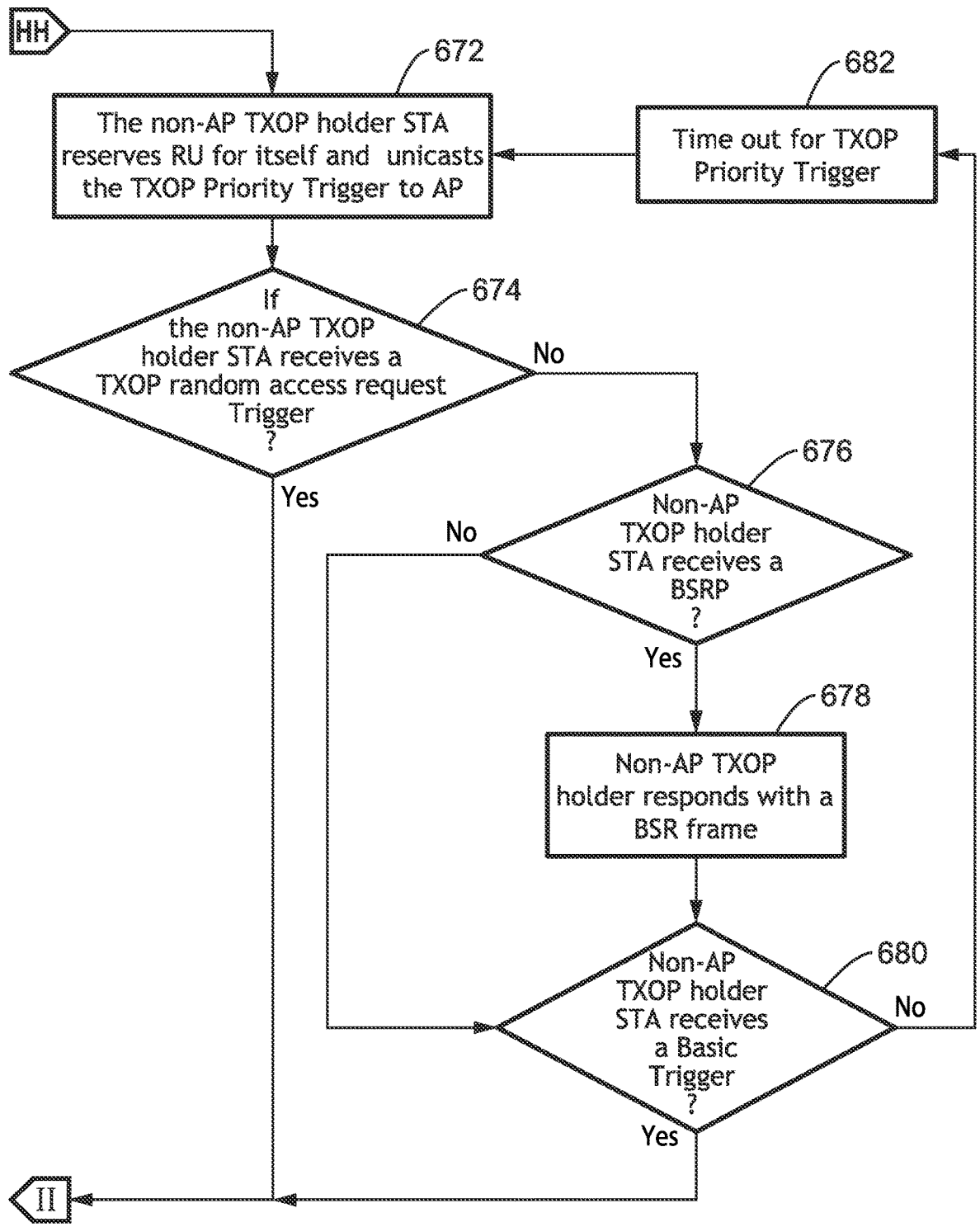

FIG. 33A and FIG. 33B illustrate an example embodiment 650 of a TXOP schedule and access stage with random access handled by non-AP TXOP holder STA, using the AP as the coordinator. After the TXOP schedule and access stage starts 652, the non-AP TXOP holder STA first determines 654 if it is willing to perform the scheduling at it own level or at the AP level.

If the non-AP TXOP holder STA is doing the scheduling, then at block 656 the non-AP TXOP holder STA that is willing to share the following shared TXOP with other STAs reserves RU/RUs for itself. Then the non-AP TXOP holder unicasts 658 the TXOP access scheduler trigger frame to the AP which indicates the distribution of the RUs to each non-AP shared TXOP participant STAs. It is then determined whether broadcasting or unicasting is performed. A check 660 determines if the non-AP TXOP holder STA receives a unicast TXOP access request trigger from AP before the TXOP access scheduler trigger frame times out.

If it is not unicasting, then at block 668 a check is made to determine if a Broadcast TXOP access request trigger is received. If the trigger is not received then a timeout 670 of the trigger occurs and execution returns to block 658 and it retransmits the TXOP access scheduler trigger frame. Otherwise, if the broadcast TXOP access request trigger is received, then block 666 is reached and the non-AP TXOP holder STA sends UL data to the AP and the process ends 684.

Returning to block 660, if the non-AP TXOP holder receives a unicast TXOP access request trigger then at block 662 the STA checks the TXOP Access Start Flag field of the Unicast TXOP access request trigger frame. At block 664 looping is performed back to block 662, until the last Unicast TXOP access request trigger is sent by the AP, at which time execution reaches block 666 with the non-AP TXOP holder STA sending UL DATA to the AP on its reserved RU, to end 684 the process.

Returning to block 654, if it is determined that the scheduling will be performed by the AP, then execution moves to block 672 and the non-AP TXOP holder STA reserves the RU for itself and unicasts the TXOP Priority Trigger to the AP and indicates the TXOP holder has the highest priority. A check 674 is made to determine if the non-AP TXOP holder STA receives a TXOP random access request trigger frame from the AP within the TXOP Priority trigger frame time out interval. If it receives the trigger frame then block 666 is reached with the non-AP TXOP holder STA sending its UL DATA to the AP and the process ends 684.

Otherwise, if at block 674 the random access trigger request was not received, then execution moves to block 676 with a check being made if the non-AP TXOP holder STA has received a BSRP. If it received the BSRP then at block 678 the non-AP TXOP holder responds with a BSR frame to indicate its buffer status and traffic priority and execution reaches block 680. If the check at block 676 determines that no BSRP has been received, then execution moves directly to block 680.

At block 680 it is determined if the non-AP TXOP holder STA has received a basic trigger. If the basic trigger was received, then execution moves to block 666 to send UL data to the AP and end 684 the process. Otherwise, if a basic trigger was not received then a timeout occurs 682 for the priority trigger, and execution returns to block 672. If the non-AP TXOP holder STA receives a TXOP random access request trigger frame, it can start the UL transmission using the reserved RU.

Figure 34A:
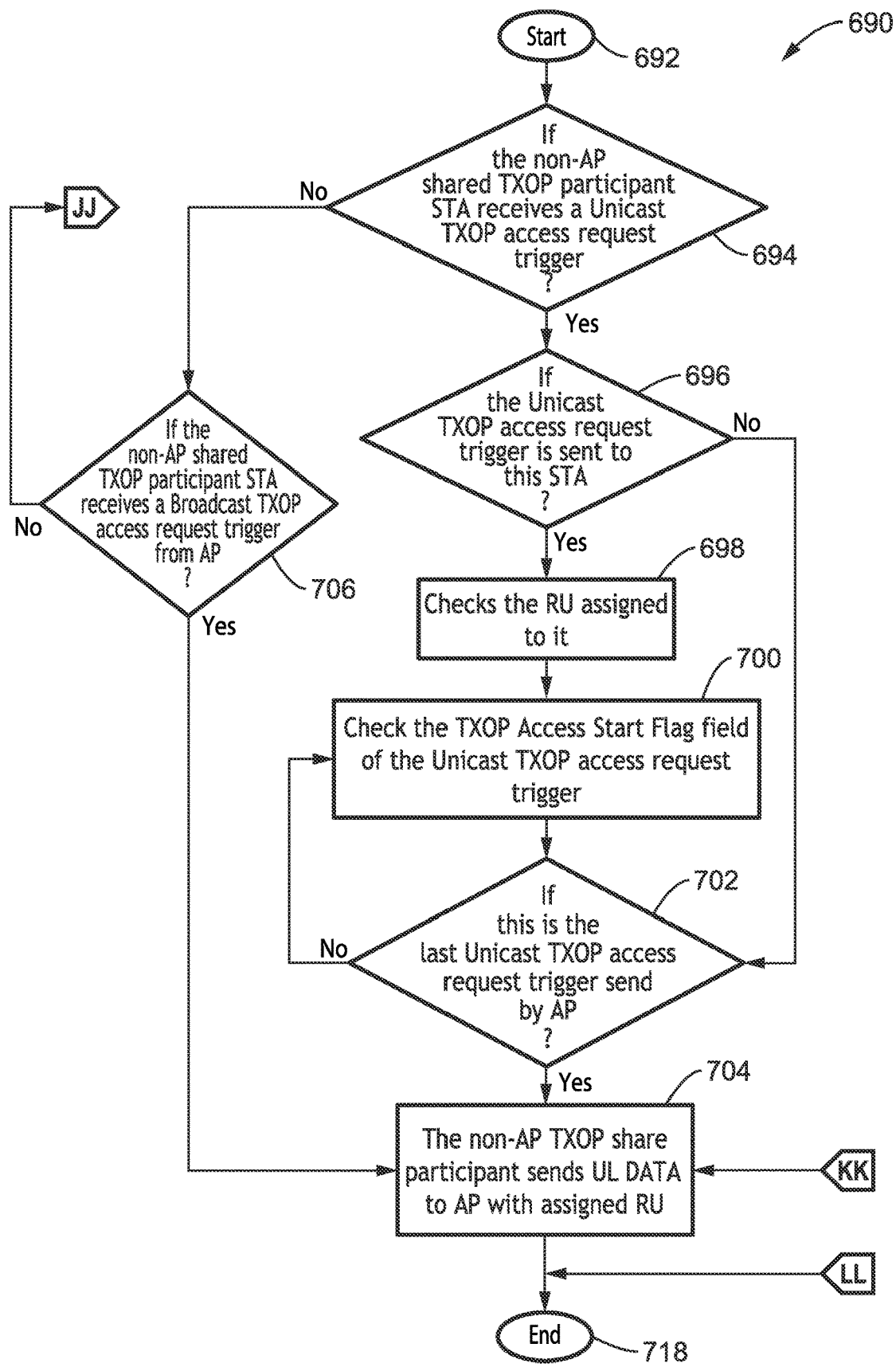
FIG. 34A and FIG. 34B is a flow diagram of a TXOP schedule and access stage with random access handled by non-AP shared TXOP participant STA (with AP as coordinator) according to at least one embodiment of the present disclosure.
Figure 34B:
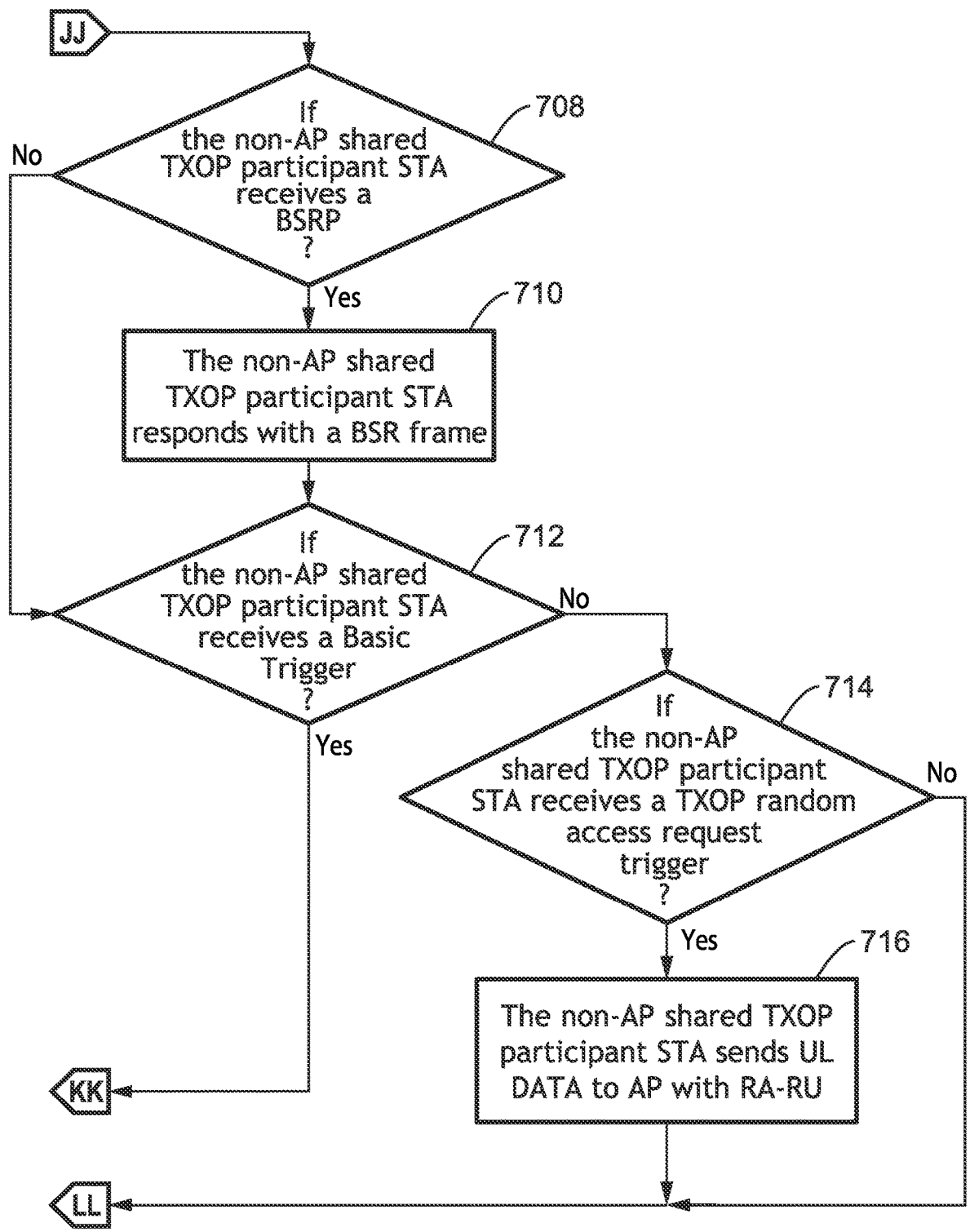

FIG. 34A and FIG. 34B illustrate an example embodiment 690 of a TXOP schedule and access stage with random access handled by the non-AP shared TXOP participant STA using the AP as coordinator.

After the TXOP schedule and access stage starts 692 a check is made 694 to determine if the non-AP shared TXOP participant STA received a Unicast TXOP access request trigger. If it received the unicast TXOP access trigger then execution reaches block 696 to determine if the unicast TXOP access request trigger was sent to this station. If it was sent to this station, then the non-AP shared TXOP participant STA checks 698 the RU assigned to it. Then at block 700 the non-AP shared TXOP participant STA checks the TXOP Access Start Flag field of the Unicast TXOP access request trigger. At block 702 a loop is performed back to block 700 until the last Unicast TXOP access request trigger is sent by the AP, at which time execution reaches block 704 with the non-AP TXOP share participant sending UL DATA to the AP with assigned RUs and the process ends 718.

Returning to block 694, if a unicast TXOP access request trigger is not received, then at block 706 it is determined if the non-AP TXOP participant STA received a broadcast TXOP access request trigger from the AP. If it received the broadcast TXOP access request trigger execution moves to block 704 and it starts sending UL DATA to AP with assigned RU.

Otherwise, if it is not a broadcast request trigger, then execution moves to block 708 in FIG. 34B where it is determined if the non-AP shared TXOP participant STA received a BSRP. If it received the BSRP then the non-AP TXOP participant STA responds 710 with a BSR frame to indicate its buffer status and the traffic priority, and execution moves to block 712. Otherwise, if a BSRP was not received, then execution moves directly to block 712.

At block 712 it is determined if the non-AP shared TXOP participant STA received a Basic Trigger. If a basic trigger was received then execution moves to block 704 in FIG. 34A and it starts sending UL DATA to AP with assigned RU before ending 718.

Otherwise, if it was not a basic trigger, then at block 714 a check is made to determine if it is a TXOP random access request trigger. If it is a TXOP random access request trigger, then at block 716 the non-AP shared TXOP participant STA randomly access the shared RU for the UL transmission and the process ends 718. Otherwise if it is not a random access trigger, then it is none of these categories and the process ends 718.

7.4. Overview of Semi-Static Scenario

In this scenario, the design for two stages is described for the shared TXOP setup stage and the TXOP schedule and access stage.

In the shared TXOP setup stage, each non-AP STA exchanges the share offer/request information for the shared TXOP with the AP. In addition to this, each non-AP TXOP holder STA also announces the RU allocation for the other non-AP shared TXOP participant STAs and exchanges this allocation configuration information with other non-AP STAs through the coordination of the AP.

The semi-static configuration is performed at the beginning stage. In this case, the complex scheduling process in the TXOP schedule and access stage can be skipped. The non-AP STAs directly access the TXOP channel with assigned RUs as configured in the shared TXOP setup stage.

Both semi-static scenarios, with or without AP coordination, are exemplified in the present disclosure.

Figure 35:
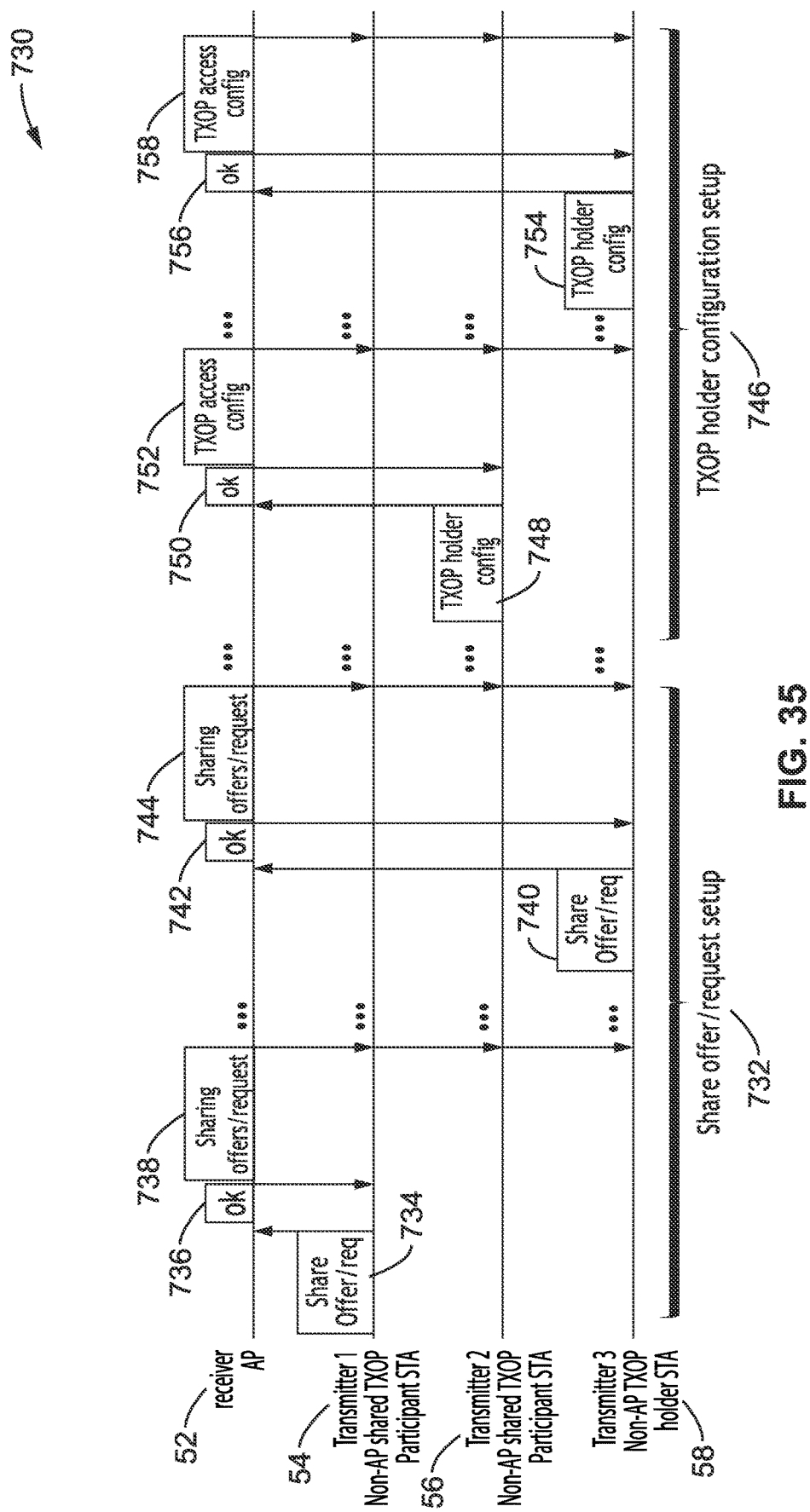
FIG. 35 is a communication sequence diagram of a shared TXOP setup stage, which includes the share offer/request setup substage and the TXOP holder configuration setup substage according to at least one embodiment of the present disclosure.

FIG. 35 illustrates an example embodiment 730 of a shared TXOP setup stage, which includes the share offer/request setup substage 732 and the TXOP holder configuration setup substage 746. Again, by way of example and not limitation, this figure is shown with the same AP and STA participants as in previous figures.

In the share offer/request setup substage, the non-AP STAs send the share offer/request frame 734, 740 to the associated AP to indicate its shareability. Once the AP receives the share offer/request frame it sends back a response frame 736, 742 to the non-AP STA to confirm successful reception. Then, the AP broadcasts a Sharing offer/request frame 738, 744 with shareability of all the associated non-AP STAs. In this case, once a non-AP STA receives this Sharing offer/request frame, it is aware of the shareability of all other non-AP STAs. It will be noted that in the share offer/request that non-AP TXOP participant STA1 54 (may be a potential shared TXOP holder in the future) communicates a share offer/request, while non-AP TXOP holder STA3 58 (may be a potential shared TXOP participant in the future) communicates a share offer/request.

In the TXOP holder configuration setup substage 746, each potential non-AP shared TXOP holder STA announces the RU allocation for other non-AP shared TXOP participant STAs and sends this allocation information to the AP with a TXOP holder configuration (config) frame 748, 754. Once the AP receives the TXOP holder config frame, it acknowledges receipt 750, 756 and then broadcasts the overall TXOP holder configuration information with a TXOP access config frame 752, 758 which indicates the distribution of the RUs for each non-AP shared TXOP participant STA that is assigned by each potential non-AP TXOP holder STA.

Figure 36:
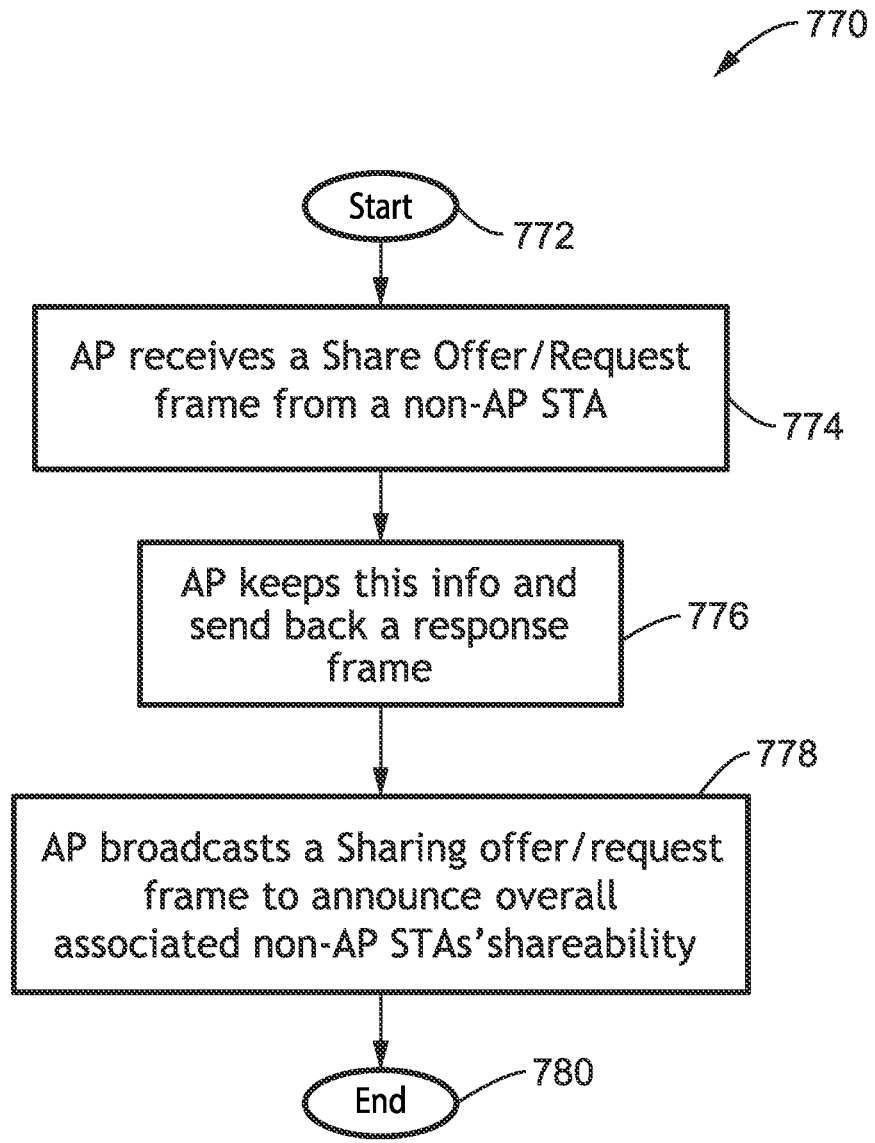
FIG. 36 is a flow diagram of a shared offer/request setup substage handled by AP. After the shared offer/request setup substage starts according to at least one embodiment of the present disclosure.

FIG. 36 illustrates an example embodiment 770 of a shared offer/request setup substage handled by AP. After the shared offer/request setup substage starts 772 the AP receives 774 a Share Offer/Request frame from a non-AP STA, indicating if the non-AP STA is willing to offer/request a shared TXOP. The AP keeps this information 776 and sends back a response frame that confirms awareness of shareability. Then, the AP broadcasts 778 the latest shareability information of all the associated non-AP STAs with sharing offer/request frames, and the process ends 780.

Figure 37:
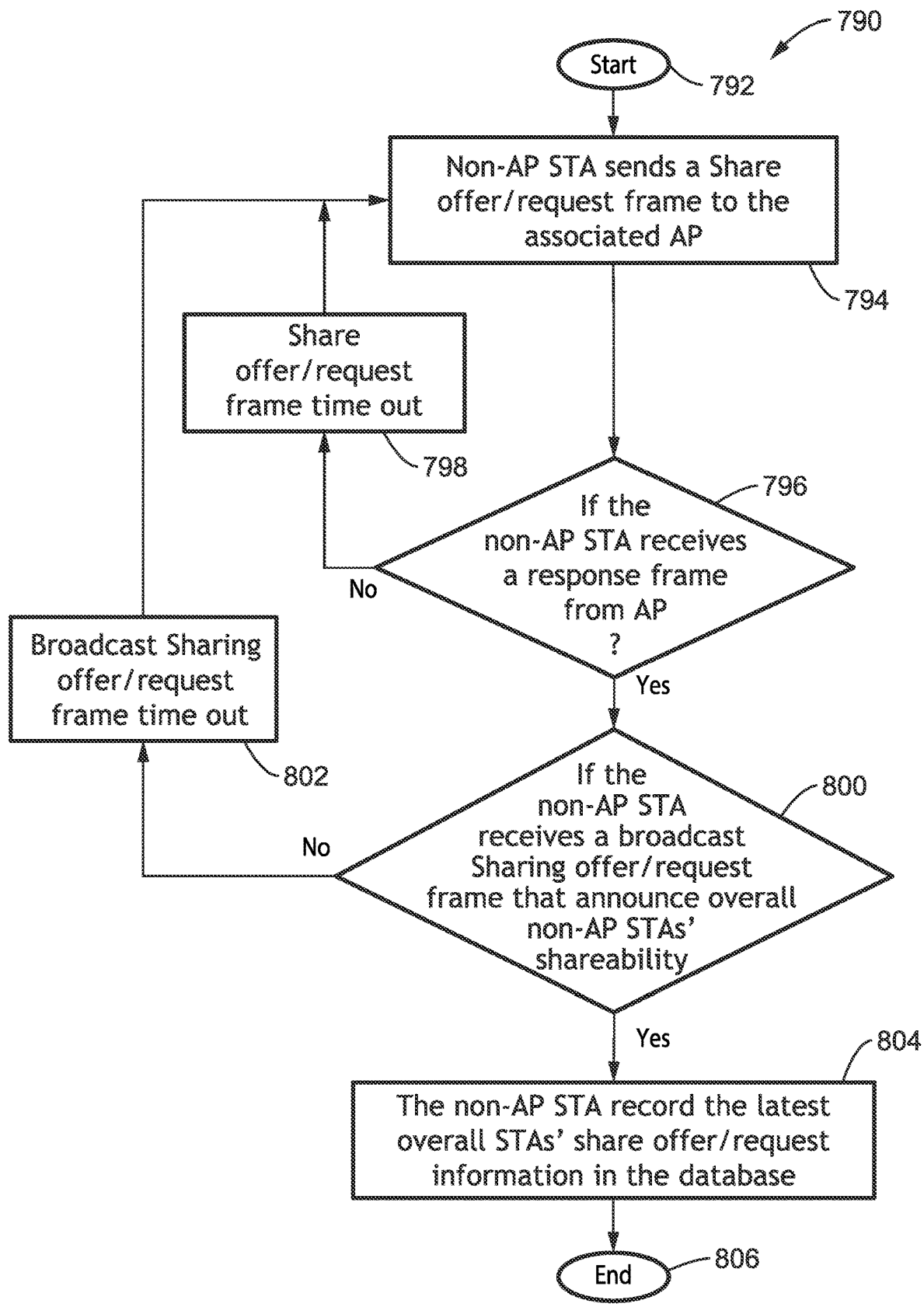
FIG. 37 is a flow diagram of a shared offer/request setup substage handled by non-AP STA according to at least one embodiment of the present disclosure.

FIG. 37 illustrates an example embodiment 790 of a shared offer/request setup substage handled by a non-AP STA. After the shared offer/request setup substage starts 792, then non-AP STA sends 794 a share offer/request frame to the associated AP, and thus it is offering to share, or requesting to share, a shared TXOP and includes information on the TXOP access resource it offers, or requests, respectively.

At block 796 it is determined if the non-AP STA has received a response frame. If the non-AP STA doesn't receive any feedback from the associated AP within the Share offer/request timeout period, then a frame time out 798 occurs and execution returns to block 794 with the non-AP STA retransmitting the share offer/request frame. Otherwise, if it received a response frame, then a check is made at block 800 to determine if it is a broadcast sharing offer/request. If it does not timely receive a broadcast sharing offer/request then the broadcast sharing offer/request times out 802 and execution also returns to block 794 for the non-AP STA to retransmit its offer/request.

Otherwise, if the non-AP STA received a broadcast sharing offer/request frame from the AP, then it has been made aware of the overall shareability of the non-AP STAs and updates 804 the latest overall STA share offer/request information in its database before the process ends 806.

Figure 38:
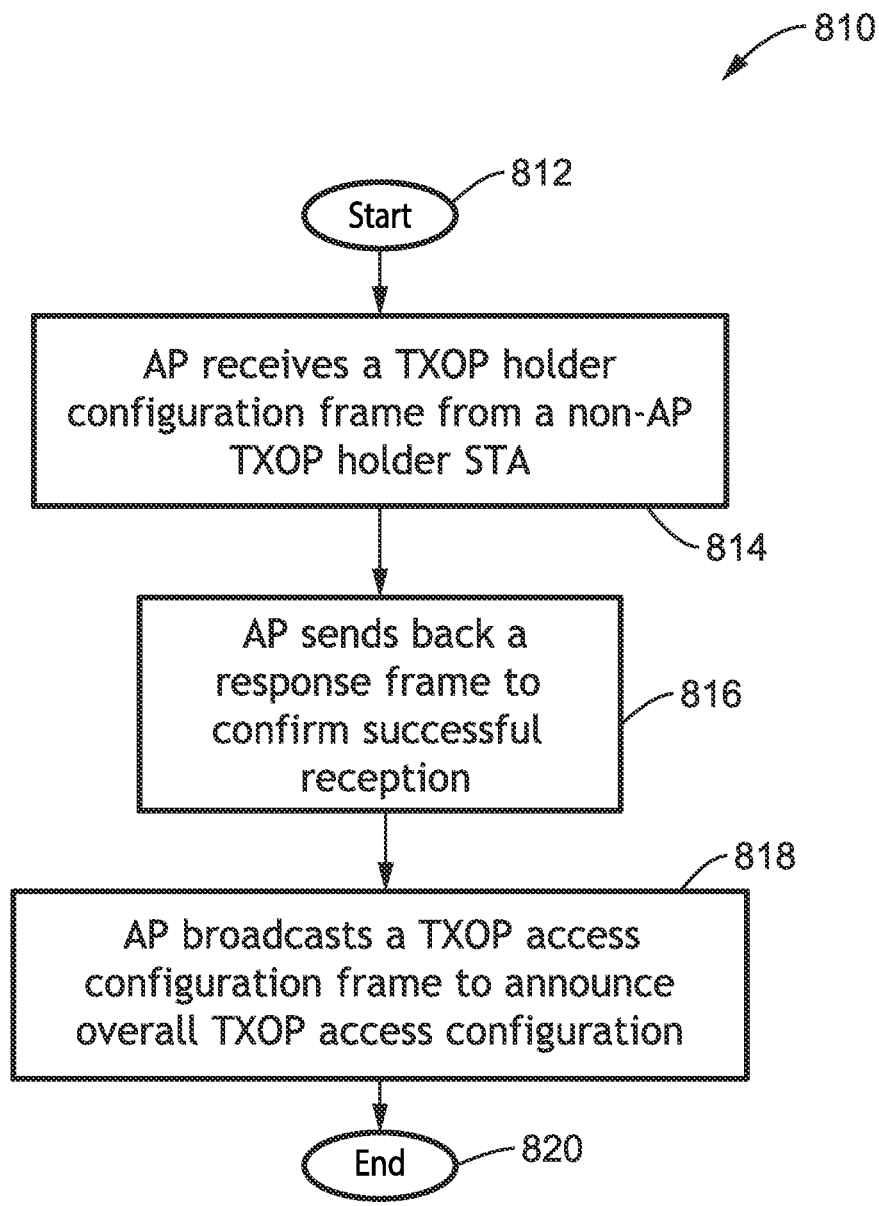
FIG. 38 is a flow diagram of a TXOP holder configuration setup substage handled by an AP according to at least one embodiment of the present disclosure.

FIG. 38 illustrates an example embodiment 810 of a TXOP holder configuration setup substage handled by the AP. After the TXOP holder configuration setup substage starts 812, the AP receives 814 a TXOP holder configuration frame from a non-AP TXOP holder STA, which indicates the distribution of RUs assigned to other non-AP shared TXOP participants STAs. The AP stores the TXOP holder configuration information and sends back 816 a response frame that confirms successful reception. Then, the AP broadcasts 818 a TXOP access configuration frame to announce overall TXOP access configuration of all the associated non-AP STAs before the process ends 820.

Figure 39:
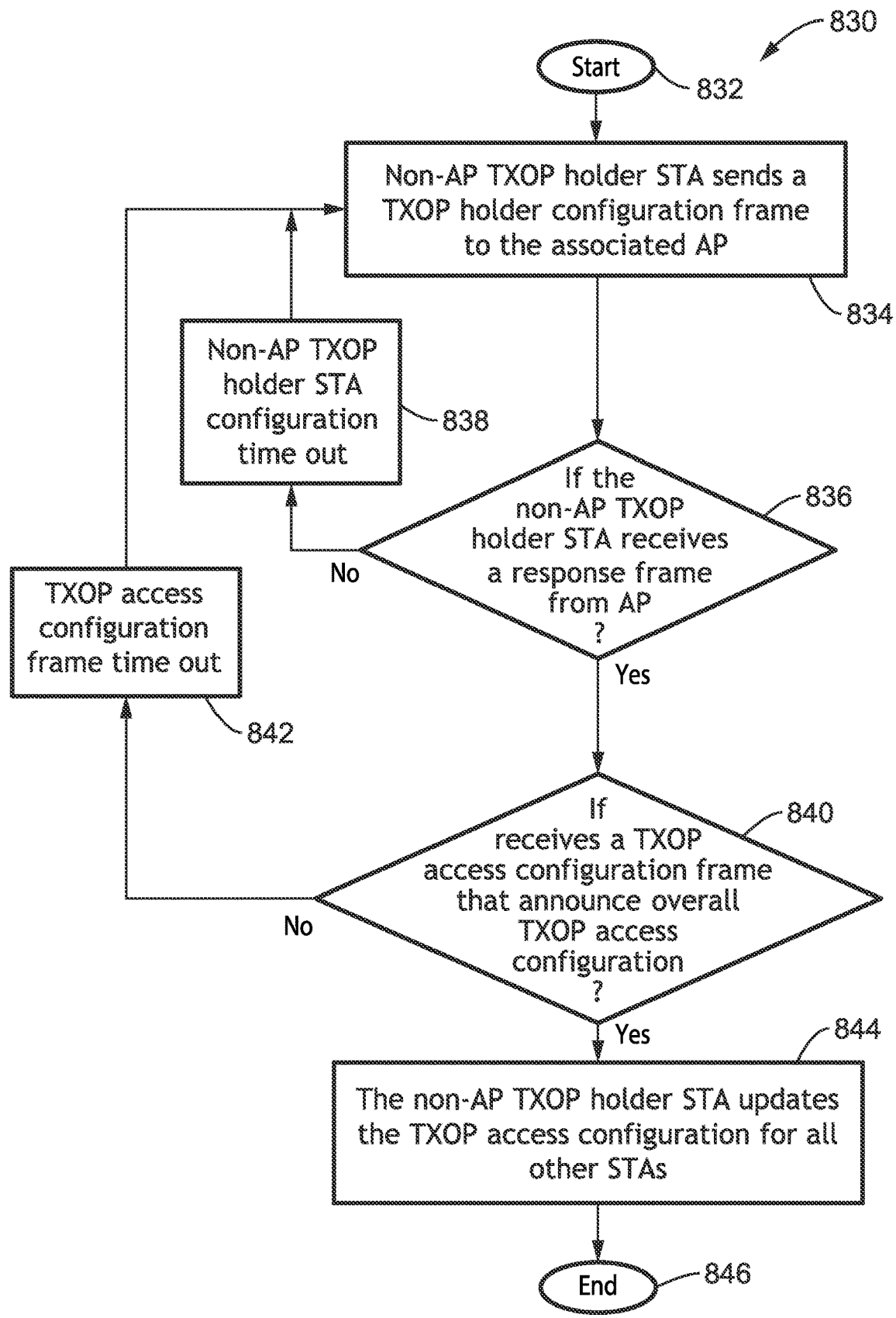
FIG. 39 is a flow diagram of a TXOP holder configuration setup substage handled by non-AP TXOP holder STA according to at least one embodiment of the present disclosure.

FIG. 39 illustrates an example embodiment 830 of a TXOP holder configuration setup substage handled by non-AP TXOP holder STA. After the TXOP holder configuration setup substage starts 832, the non-AP TXOP holder STA sends 834 a TXOP holder configuration frame to the associated AP, and indicates the schedule of distribution of RUs to other non-AP shared TXOP participant STAs.

A check 836 is made for a response frame. If the non-AP STA doesn't receive any feedback from the associated AP within the TXOP holder STA configuration frame time out, then a timeout occurs 838 and the non-AP TXOP holder STA should retransmit the TXOP holder configuration frame as seen by execution returning to block 834.

Otherwise, having received a response frame, a check 840 is made to determine if the non-AP STA received a broadcast TXOP holder configuration frame from the AP. If it did not receive the TXOP access configuration frame within a time out interval, then a timeout occurs 842, and execution returns to block 834 with the non-AP TXOP holder STA retransmitting the TXOP holder configuration frame to the associated AP. Otherwise, if the configuration frame was received, then the STA is aware of the overall TXOP access configuration and updates 844 its database of TXOP access configurations for all other STAs, and the process ends 846.

Figure 40:
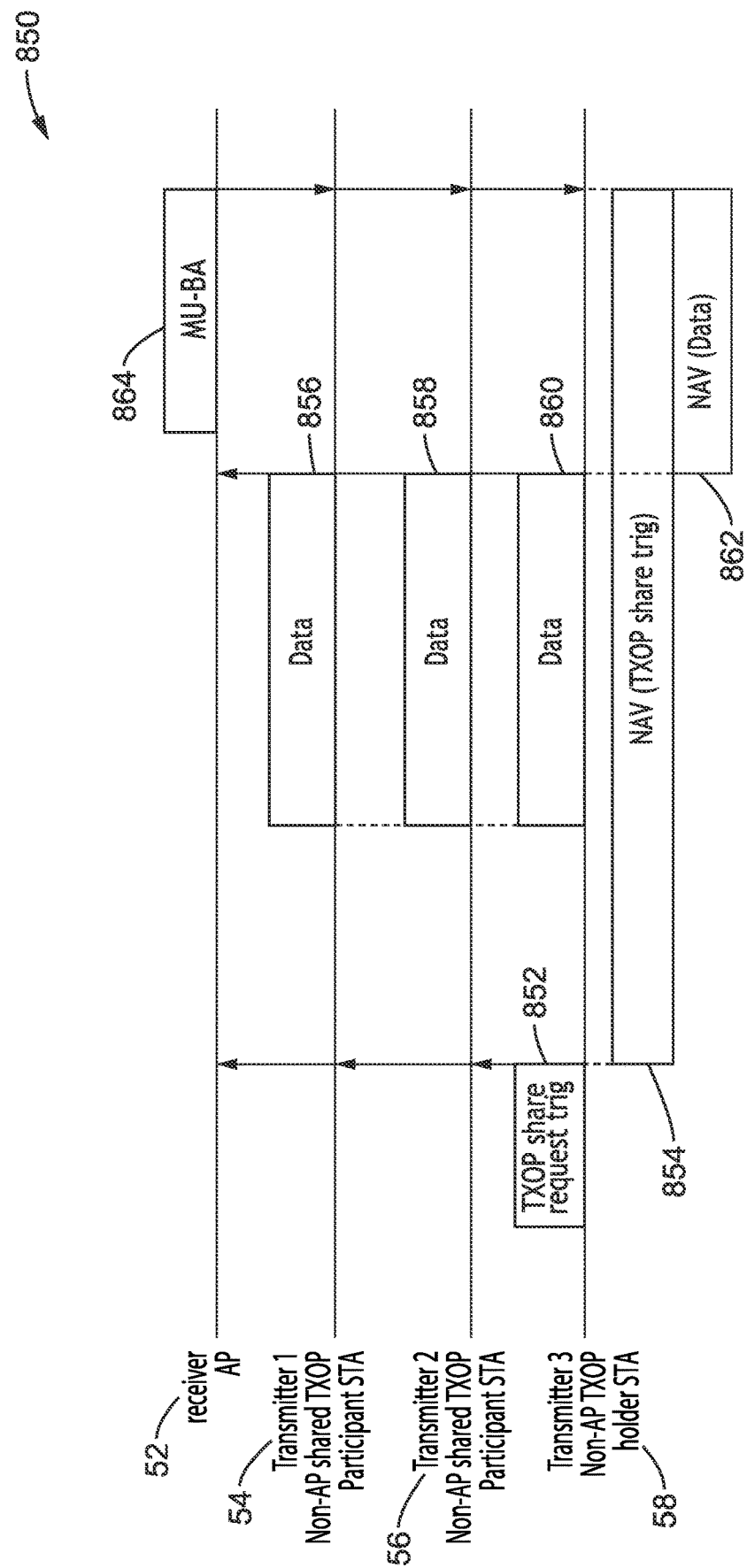
FIG. 40 is a communication sequence diagram a TXOP schedule and access stage without AP as the coordinator for Semi-statistic scenario according to at least one embodiment of the present disclosure.

FIG. 40 illustrates an example embodiment 850 of a TXOP schedule and access stage without using AP coordination in a semi-static scenario. Again, by way of example and not limitation, this figure is shown with the same AP and STA participants as in previous figures.

The non-AP TXOP holder STA starts the UL DATA transmission after sending out the TXOP share request trigger frame 852, and NAV (TXOP share trig) 854 commences. The non-AP shared TXOP participant STAs start their UL DATA transmissions 856, 858 in the assigned slots (RUs) once receiving the TXOP share request trigger frame, and the non-AP TXOP holder station transmits its UL DATA 860 in a reserved slot (RU), and a NAV (Data) interval 862 commences. When the UL DATA transmissions are complete the AP sends a MU-BA 864.

Figure 41:
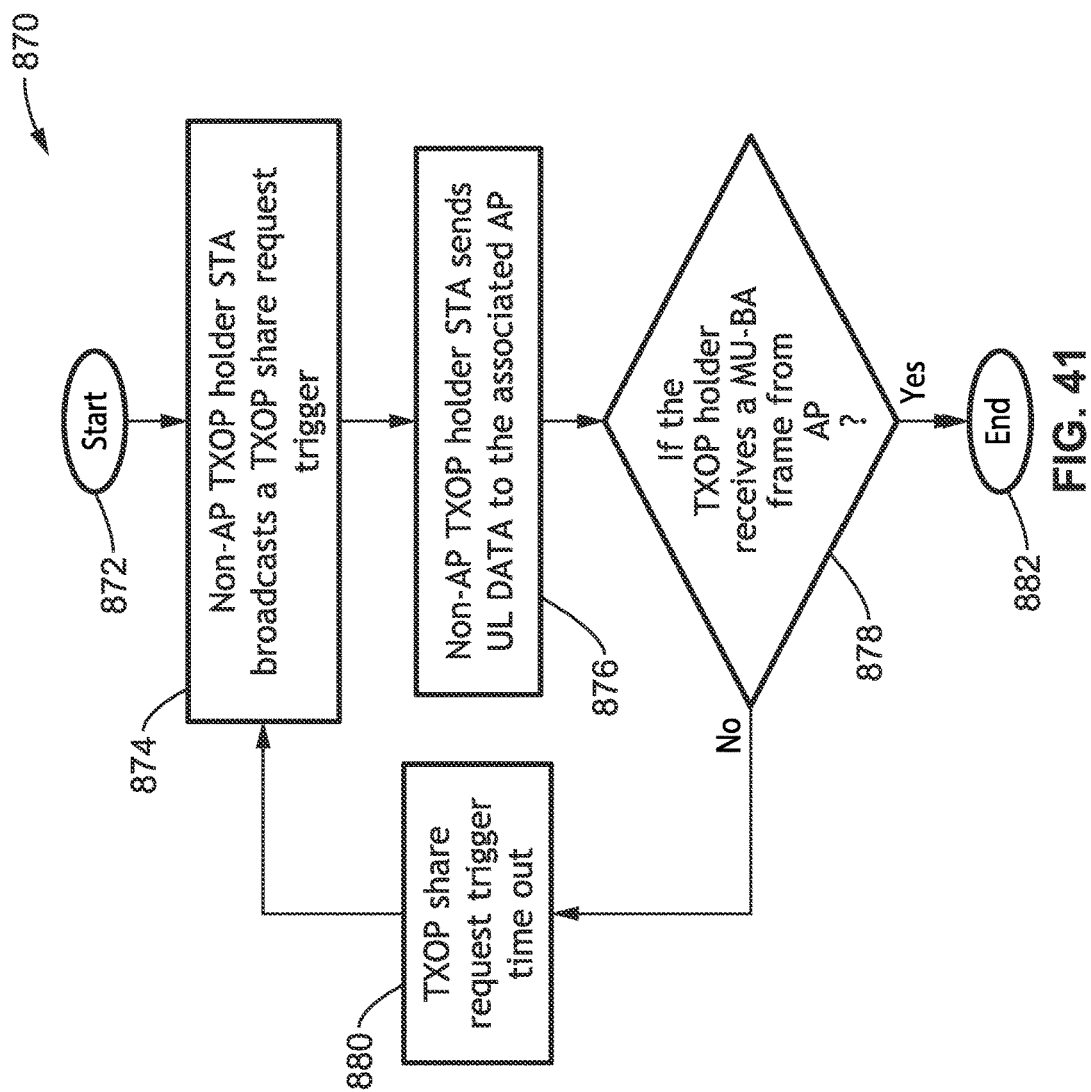
FIG. 41 is a flow diagram of a TXOP schedule and access stage without AP as the coordinator handled by non-AP TXOP holder STA for the Semi-statistic scenario according to at least one embodiment of the present disclosure.

FIG. 41 illustrates an example embodiment 870 of a TXOP schedule and access stage handled by non-AP TXOP holder STA for the semi-static scenario without AP coordination. After the TXOP schedule and access stage starts 872, the non-AP TXOP holder STA broadcasts 874 a TXOP share request trigger frame. Then, Non-AP TXOP holder STA sends 876 UL DATA to the associated AP using the RU which was configured in the TXOP holder configuration setup substage. A check is made 878 if the non-AP TXOP holder STA received the MU-BA frame from the AP within the TXOP share request trigger frame time out interval. If it did not receive the MU-BA within the timeout interval then a timeout 880 occurs and the STA retransmits the TXOP share request trigger frame, such as by execution returning to block 874. Otherwise, if the MU-BA was received within the timeout interval, then the process ends 882.

Figure 42:
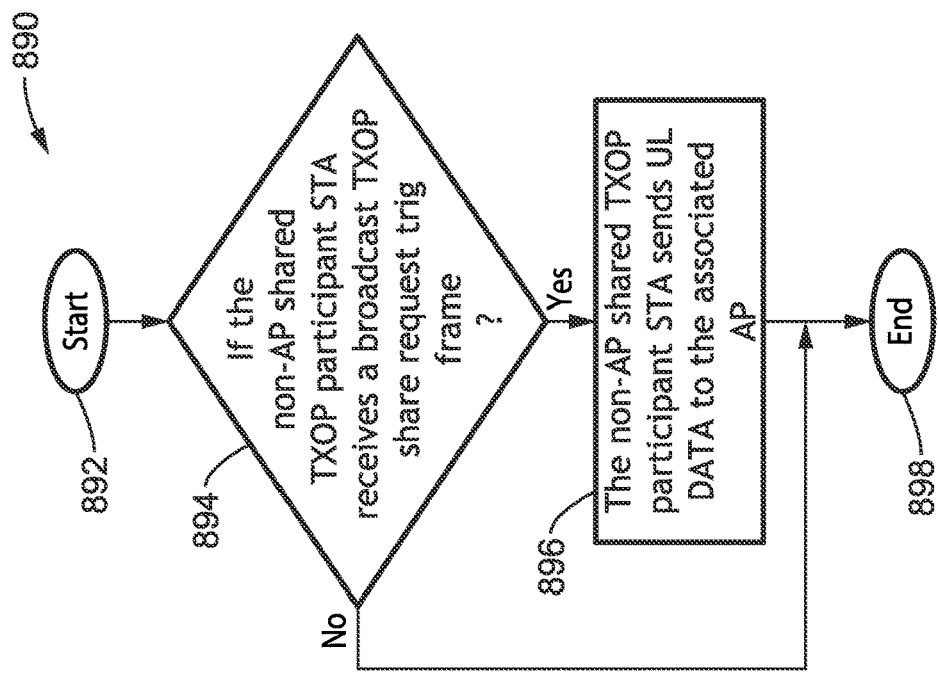
FIG. 42 is a flow diagram of a TXOP schedule and access stage without AP as the coordinator handled by non-AP shared TXOP participant STA for the Semi-statistic scenario according to at least one embodiment of the present disclosure.

FIG. 42 illustrates an example embodiment 890 of a TXOP schedule and access stage handled by the non-AP shared TXOP participant STA for the semi-static scenario without AP coordination. After the TXOP schedule and access stage starts 892, a check is made 894 on whether the non-AP shared TXOP participant STA received a broadcast TXOP share request trigger frame. If it did not receive that frame then the process ends 898. Otherwise if the trigger frame was received, then the STA starts 896 its UL DATA transmission using the RU that has been configured in the TXOP holder configuration setup substage.

Figure 43:
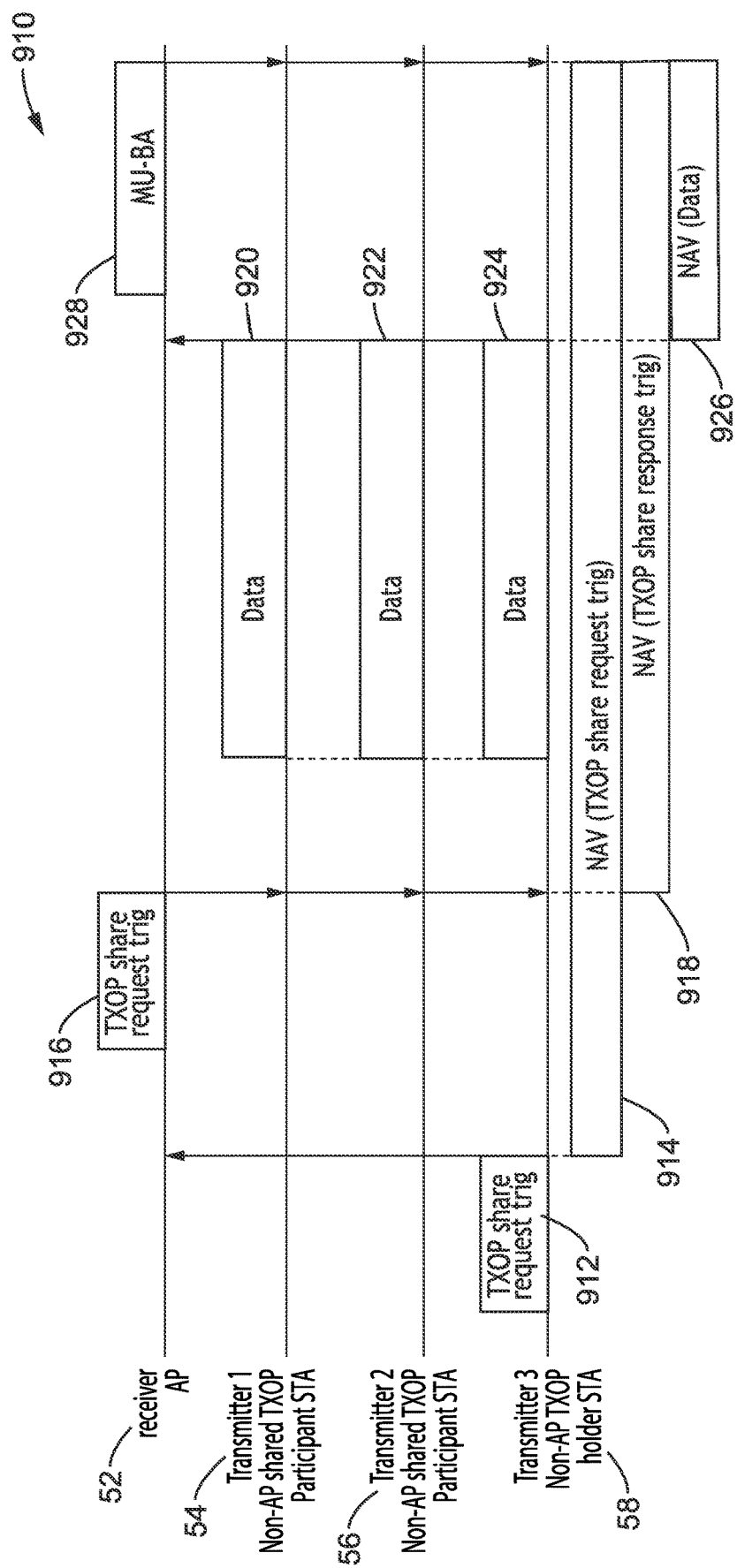
FIG. 43 is a communication sequence diagram of a TXOP schedule and access stage with AP as the coordinator for a semi-statistic scenario according to at least one embodiment of the present disclosure.

FIG. 43 illustrates an example embodiment 910 of a TXOP schedule and access stage with AP as the coordinator in a semi-static scenario. Again, by way of example and not limitation, this figure is shown with the same AP and STA participants as in previous figures.

Since the non-AP TXOP holder STA cannot directly communicate with other non-AP STAs, it should first send a TXOP share request trigger frame 912 to the AP, and a NAV (TXOP share request trig) 914 commences. Once the AP receives the TXOP share request trigger frame, it broadcasts a TXOP share response trigger frame 916, and a NAV (TXOP share response trig) 918 commences. Both the non-AP TXOP holder STA and all the non-AP shared TXOP participant STAs start their UL DATA transmissions 920, 922 and 924 once transmitting/receiving the TXOP share response trigger frame, with NAV (Data) 926 commencing. Upon receiving UL DATA the AP responds with an MU-BA 928.

Figures 44, 45:
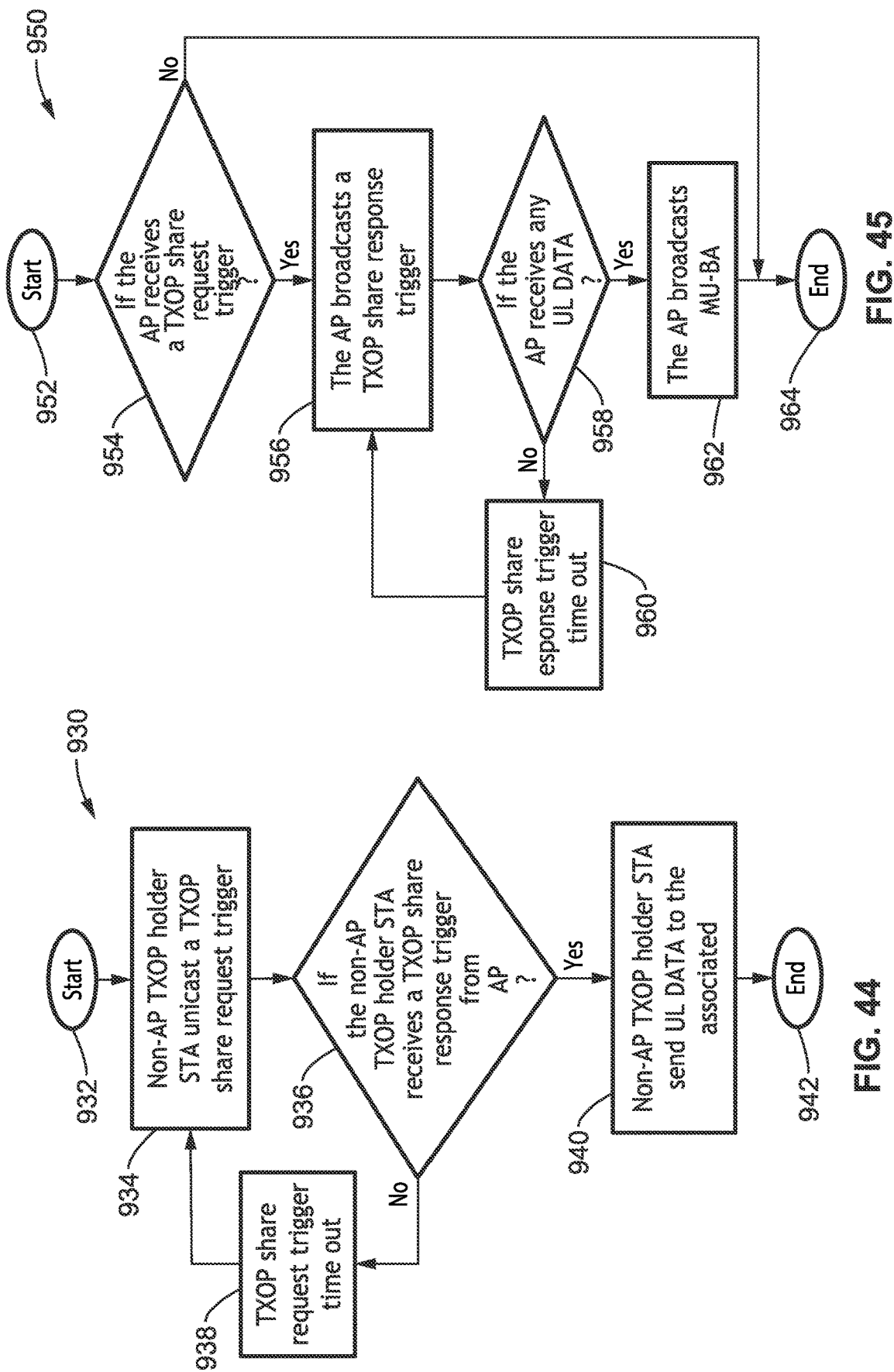
FIG. 44 is a flow diagram of a TXOP schedule and access stage with AP as the coordinator handled by non-AP TXOP holder STA for a semi-statistic scenario according to at least one embodiment of the present disclosure.
FIG. 45 is a flow diagram of a TXOP schedule and access stage with AP as the coordinator handled by AP for a semi-statistic scenario according to at least one embodiment of the present disclosure.

FIG. 44 illustrates an example embodiment 930 of a TXOP schedule and access stage handled by a non-AP TXOP holder STA for the semi-static scenario with AP coordination. The TXOP schedule and access stage starts 932. Since the non-AP TXOP holder STA cannot directly communicate with other non-AP STAs, it first unicasts 934 a TXOP share request trigger to the associated AP. A check is made 936 if the non-AP TXOP holder STA receives a TXOP share response trigger frame from AP within the TXOP share request trigger frame time out interval.

If the response is not received in that interval, then a timeout occurs 938 and the STA retransmits the TXOP share request trigger frame, such as execution moving back to block 934. Otherwise, the response was received and the non-AP TXOP holder STA starts sending 940 UL DATA transmission using the RU configured in the TXOP holder configuration setup substage, and the process ends 942.

FIG. 45 illustrates an example embodiment 950 of a TXOP schedule and access stage as handled by the AP for the semi-static scenario with AP the coordination. After the TXOP schedule and access stage starts 952, a check 954 is made if the AP received a TXOP share request trigger.

If the trigger was not received then the process ends 964. Otherwise, having received a trigger frame the AP broadcasts a TXOP share response trigger frame 956 as a response to receiving the TXOP share request trigger frame from the non-AP TXOP holder STA.

A check 958 is then made to determine if the AP received any UL DATA. If the AP did not receive any UL DATA within the TXOP share response trigger frame time out interval, then a timeout occurs 960 and execution returns to block 956 with the AP retransmitting the TXOP share response trigger frame. Otherwise, once the AP finishes receiving the UL DATA sequences, it responds by sending out 962 a MU-BA frame before the process ends 964.

8. Frame Formats 8.1. STA TXOP Shareability Element

FIG. 46 illustrates an example embodiment 970 of a STA TXOP shareability element, the STA TXOP shareability element is contained in the management frames, for example but not limited to authentication or association request frames, and is used by each non-AP STA to inform the associated AP about its TXOP shareability. At least one embodiment of the shareability element has the following fields. An Element ID field identifies the specific element, and in a specific example case here it was set to 8 to indicate this is a STA TXOP shareability element. If the AP receives an authentication or association request frame with that Element ID field set to 8, the AP should record all the share offer/request information of each STA (as indicated in the STA Info field) and sends back an authentication or association response frame to indicate successful reception. A Length field indicates the number of octets in the element excluding the Element ID and Length fields. One or more STA information fields are included, the subfields of which are described in FIG. 47.

FIG. 47 illustrates an example embodiment 990 of a STA Information (Info) field, at least one embodiment of which has the following subfields. An AID subfield contains the AID of the STA for which TXOP shareability is indicated. A TXOP share holder subfield indicates the shareability of this STA as the TXOP holder. The TXOP share holder subfield is set to a first state (e.g., 1) to indicate this STA which is operating as a TXOP holder is willing to share its TXOP with other STAs; otherwise the subfield is set to a second state (e.g., 0) to indicate that the TXOP holder is not willing to share its TXOP with other STAs. A TXOP share participant subfield indicates the shareability of this STA as the TXOP participant. The TXOP share participant subfield is set to a first state (e.g., 1) to indicate this STA, operating as the shared TXOP participant STA, is willing to join the following TXOP that will be shared by the TXOP holder STA; otherwise the subfield is set to a second state (e.g., 0) to indicate that the STA is not willing to join the following TXOP that is being shared by the TXOP holder STA.

8.2. Sharing Offer/Request Frame

FIG. 48 illustrates an example embodiment 1010 of a sharing offer/request frame format, at least one embodiment of which has the following fields. A Frame control field indicates the type of frame. A Duration field contains NAV information used for CSMA/CA channel access. An RA field contains a MAC address for the recipient of the frame. A TA field contains the MAC address of the STA that transmitted the frame. A BSSID subfield is the MAC address of the AP that the non-AP STA is associated with. If the BSSID indicates the same MAC address as the TA, it indicates that the sharing offer/request frame is delivering shareability information for the non-AP STAs from the internal BSS; otherwise, it indicates the sharing offer/request frame is delivering shareability information for a non-AP STAs from an inter BSS whose ID is indicated by the BSSID. A Frame Check Sequence (FCS) is seen here, and in other data formats herein, which provides an error-detecting code added to a frame in a communications protocol.

FIG. 49 illustrates an example embodiment 1030 of a STA Share offer/request info field format, at least one embodiment of which has the following fields. The STA Share Offer/Request info field indicates the TXOP share offer/request information of the non-AP STA. A Priority field indicates the priority of the traffic that is being stored in the buffer of the STA, which can be used by the TXOP holder for TXOP access scheduler design. A STA AID field contains the AID of the non-AP STA. The TXOP Share Request subfield is set to a first state (e.g., 1) to indicate that this STA is requesting a shared TXOP; and is otherwise set to a second state (e.g., 0). When the AP receives a Share offer/request frame that has the TXOP Share Request field set in the first state, then the AP is made aware that the STA that sent this frame is willing to participate in the shared TXOP. A TXOP Resource Request subfield indicates the number of continuous RUs that the non-AP STA is requesting in the shared TXOP. In at least one embodiment basic RU tones are utilized having 26 tones, although other RU tone sequences can be utilized without departing from the teachings of the present disclosure. The valid values of the basic RUs ranges in this example from 1 to 37. The AP will broadcast this information in the sharing offer/request frame.

A TXOP Share Offered subfield is set to a first state (e.g., 1) to indicate that this STA is willing to be the non-AP TXOP holder STA and share its TXOP with other STAs; otherwise the subfield is set to a second state. When the AP receives a share offer/request frame that has the TXOP Share Offered field set in the first state, then the AP is made aware that the STA that sent this frame is willing to share its TXOP with other STAs. A TXOP Resource Offered subfield indicates the number of continuous RUs that the TXOP holder STA is willing to share with other STAs. Again by way of example this is described in basic RU (26 tone), although other tone can be utilized without limitation. In the present example valid values of basic RUs range from 1 to 37. the AP will broadcast this information in the sharing offer/request frame.

8.3. MU-RTS-Share Frame

Figure 50:
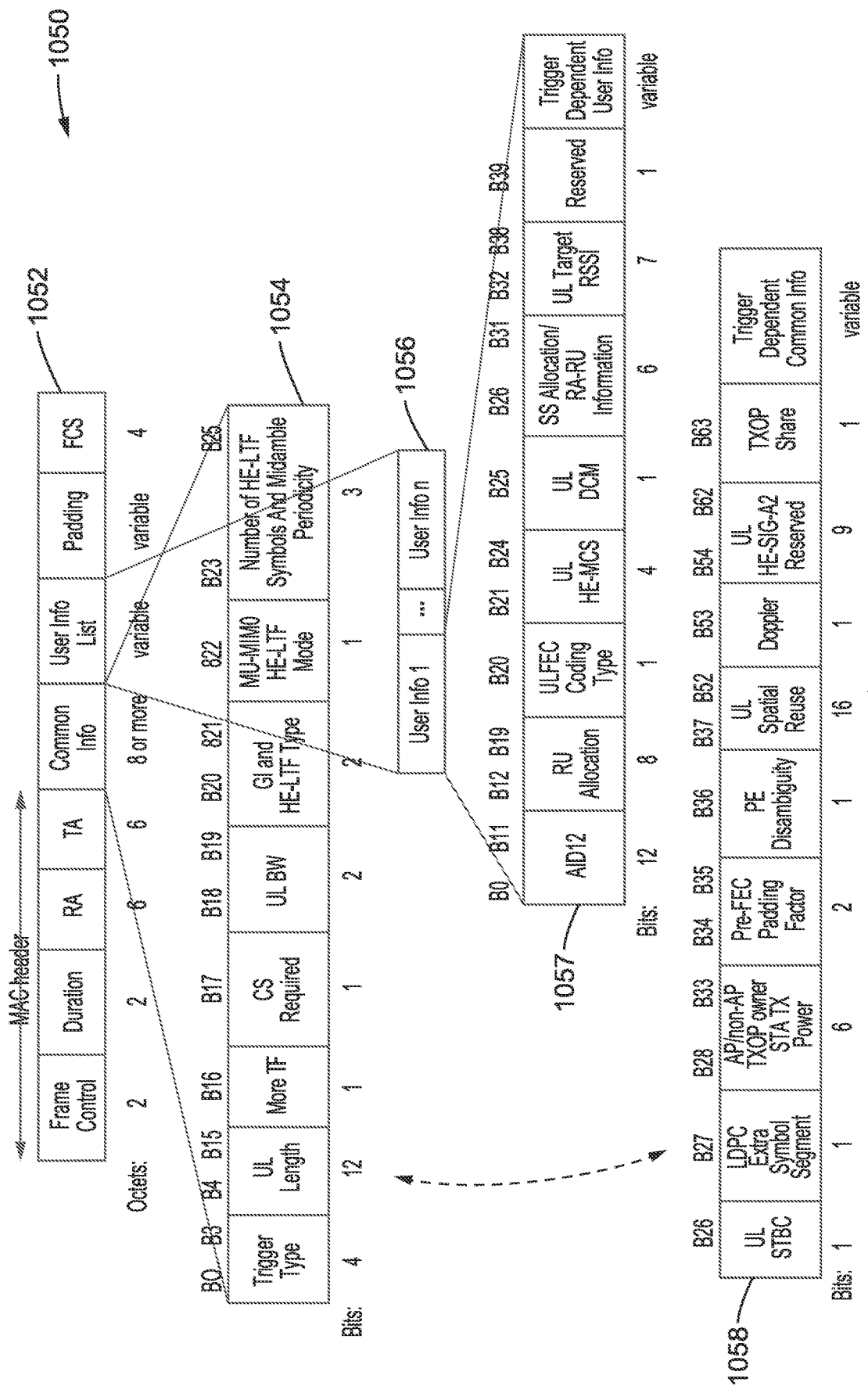
FIG. 50 is a data field diagram of a frame format of MU-RTS-share frame according to at least one embodiment of the present disclosure.

FIG. 50 illustrates an example embodiment 1050 of a frame format of MU-RTS-share frame 1052, at least one embodiment of which has the following fields. A Frame control field indicates the type of frame. A Duration field contains NAV information used for CSMA/CA channel access. An RA field contains a MAC address for the recipient of the frame. A TA field contains the MAC address of the STA that transmitted the frame. A common info field is described below 1054 and continued 1058. A User Info List subfield is described below 1056. The frame is exemplified here with padding and an FCS.

The common info field 1054 which continues 1058 has the following subfields. A Trigger Type subfield of the Common Info field identifies the Trigger frame variant. By way of example and not limitation, if this field is set to 3 and the TXOP share subfield (B63) is set to a first state (e.g., 1), this is an indication of it being a MU-RTS-share frame. If AP or non-AP STA receives a MU-RTS-share frame, it is aware that the shared TXOP is initialized, and it should respond to a CTS-share frame using the specified RU as indicated in the MU-RTS-share frame (indicated by the UL BW subfield of the Common Info and the RU Allocation subfield of the User Info field). A UL Length subfield indicates the value of the L-SIG LENGTH field of the solicited HE TB PPDU. A More TF subfield indicates whether or not a subsequent Trigger frame is scheduled for transmission. A CS Required subfield indicates whether or not the STAs identified in the User Info fields are required to consider the medium state or the NAV in determining whether or not to respond. A UL BW subfield indicates the bandwidth in the HE-SIG-A of the HE TB PPDU. A GI and HE-LTF Type subfield indicates the GI and HE-LTF type of the HE TB PPDU response. A MU-MIMO HE-LTF Mode subfield indicates the HE-LTF mode of the non-OFDMA MU-MIMO HE TB PPDU response when the GI and HE-LTF Type subfield indicates either 2×HE-LTF+ 1.6 μs GI or 4×HE-LTF+3.2 μs GI. Otherwise, this subfield is set to indicate HE single stream pilot HE-LTF mode. A Number Of HE-LTF Symbols And Midamble Periodicity subfield indicates the number of HE-LTF symbols present in the HE TB PPDU if the Doppler subfield is 0, and indicates the number of HE-LTF symbols and the periodicity of the midamble if the Doppler subfield is 1.

In the lower portion of the figure the common info field continues 1058 with the following subfields. A UL STBC subfield indicates the status of STBC encoding of the solicited HE TB PPDUs. An LDPC Extra Symbol Segment subfield indicates the status of the LDPC extra symbol segment. An AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth. A Pre-FEC Padding Factor subfield indicates the pre-FEC padding factor. A PE Disambiguity subfield indicates PE disambiguity. A UL Spatial Reuse subfield carries the values to be included in the Spatial Reuse fields in the HE-SIG-A field of the solicited HE TB PPDUs. A Doppler subfield is set to a first state (e.g., 1) to indicate that a midamble is present in the HE TB PPDU and is otherwise set to a second state (e.g., 0). A UL HE-SIG-A2 Reserved subfield carries the value to be included in the Reserved field in the HE-SIG-A2 subfield of the solicited HE TB PPDUs. A TXOP share subfield indicates by a first state (e.g., 1) that the sender is willing to share the TXOP with other non-AP STAs; otherwise it is set to a second state (e.g., 0). A Trigger Dependent Common Info subfield is optionally present based on the value of the Trigger Type field.

The User Information List field contains a list of User information. For each of the User information 1056 subfields there are the following subfields 1057 about the assigned RU information for a specific STA. An AID12 subfield is used to allocate the fixed RU to a specific STA, whose AID is equal to the value in the AID12 subfield. An RU Allocation subfield along with the UL BW subfield in the Common Info field identifies the size and the location of the RU. The UL FEC Coding Type subfield indicates the code type of the solicited HE TB PPDU. A UL HE-MCS subfield indicates the HE-MCS of the solicited HE TB PPDU. A UL DCM subfield indicates DCM of the solicited HE TB PPDU. A combined SS Allocation/RA-RU subfield is used as follows. The SS Allocation subfield indicates the spatial streams of the solicited HE TB PPDU, while the RA-RU Information subfield indicates the RA-RU information. A UL Target RSSI subfield indicates the expected receive signal power for the HE portion of the HE TB PPDU transmitted on the assigned RU. A Trigger Dependent User Info subfield is optionally present based on the value of the Trigger Type field.

8.4. CTS-Share

Figure 51:
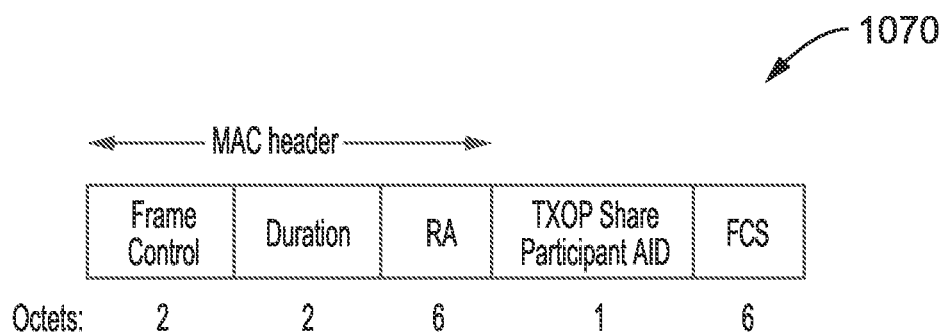
FIG. 51 is a data field diagram of a CTS-share frame according to at least one embodiment of the present disclosure.

FIG. 51 illustrates an example embodiment 1070 of a format of the CTS-share frame, at least one embodiment of which has the following fields. A Frame control field indicates the type of the frame. A Duration field contains NAV information used for CSMA/CA channel access. An RA field contains a MAC address for the recipient of the frame. A TXOP Share Participant AID field indicates the AID of the TXOP share participant that sent this CTS-share frame.

Once the TXOP holder receives the CTS-share frame, it will be aware which STA is willing to join the shared TXOP by checking the TXOP Share Participant AID info, and thus, allocate resources to this STA accordingly. If the non-AP STA receives an MU-RTS-share frame, but does not have anything to send to the AP it should set the TXOP Share Participant AID to a second state (e.g., 0) to indicate it will not join the following shared TXOP.

8.5. Random TXOP Access Request Trigger Frame

Figure 52:
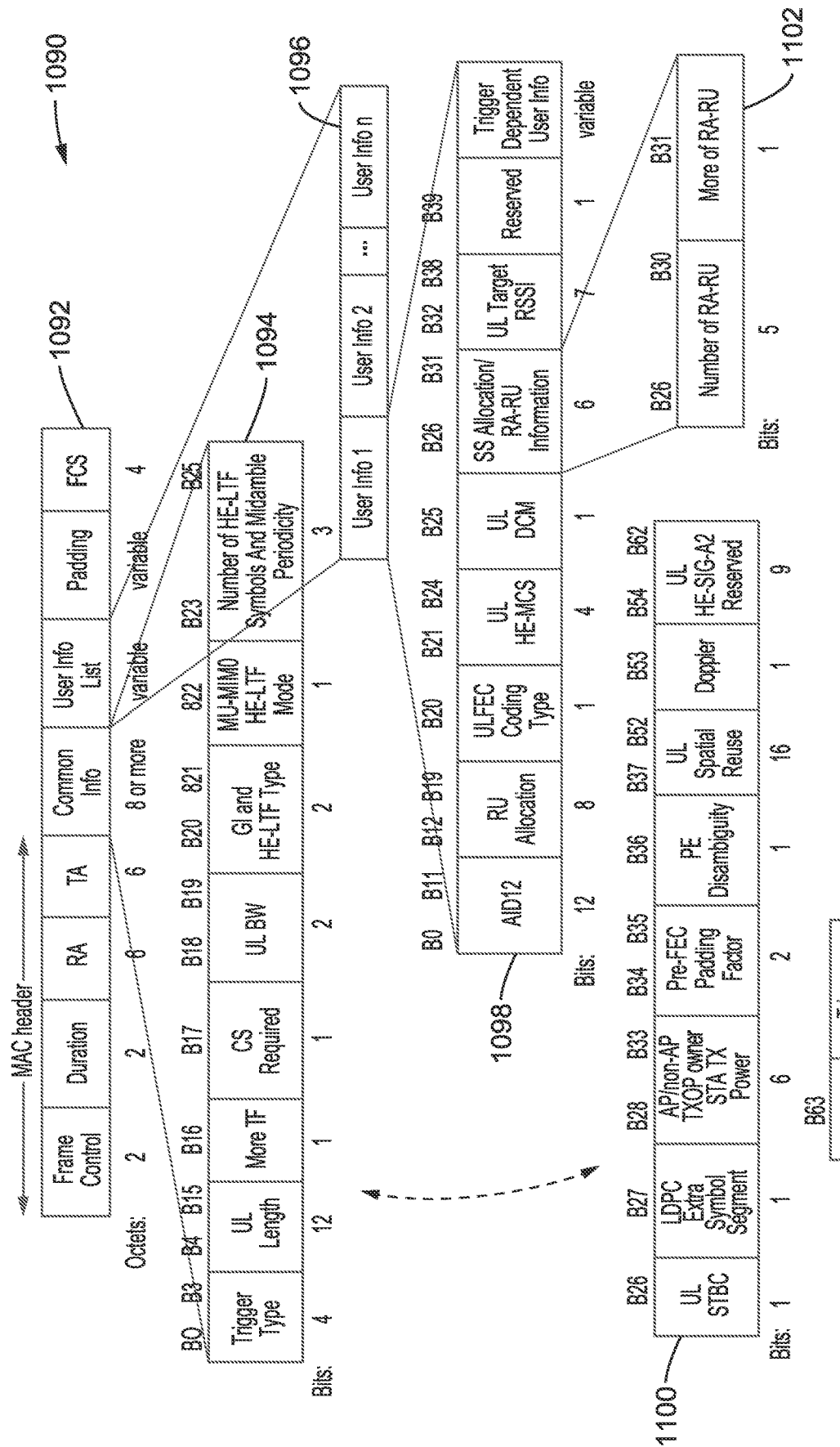
FIG. 52 is a data field diagram of a TXOP random access request trigger according to at least one embodiment of the present disclosure.

FIG. 52 illustrates an example embodiment 1090 of a frame format of the TXOP random access request trigger, at least one embodiment of which has the following fields 1092. A Frame control field indicates the type of frame. A Duration field contains NAV information used for CSMA/CA channel access. An RA field contains a MAC address for the recipient of the frame. A TA field contains the MAC address of the STA that transmitted the frame. A Common Information field is described below 1094, 1100 and 1104. A User Info List subfield is described below 1096. The frame is exemplified here with padding and an FCS.

The Common Information subfield 1094 has the following subfields. A Trigger Type subfield utilizes space that was previously reserved, in the present disclosure it is set to a specific value (e.g., 8 by way of example and not limitation) to indicate that it is a TXOP random access request trigger frame. A TXOP holder STA will reserve RUs for itself and share the remaining RUs with other STAs. After sending out the TXOP random access request trigger in a scenario without AP coordination, or of receiving the TXOP random access request trigger in the scenario with AP coordination, the TXOP holder STA unicasts UL data to the AP in the reserved RUs. After receiving the TXOP random access request trigger, the TXOP share participant STAs randomly access the channel and contend for the shared RUs.

The remaining subfields are the same as described in FIG. 50 except for the following.

In the lower portion 1100 of the Common Information are subfields utilized as follows. An AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

The TXOP holder STA announces the reserved RUs by the UL BW subfield of the Common Info and the RU Allocation subfield of the User Info field. Also it will announce its own AID in the AID12 subfield which in this example should range from 1 to 2007.

The User Info List field in the random access request trigger frame contains a list of user info fields 1096, each of which has the subfields seen below it 1098. For other associated STAs, the AID12 subfield of User Info field is set as 0, then B26-B31 of the User Info field which are marked here as SS Allocation/RA-RU information are utilized to provide RA-RU information having subfields 1102. The Number of RA-RU subfield indicates the number of contiguous RUs allocated for UL OFDMA random access (UORA). The value of the Number Of RA-RU subfield is equal to the number of contiguous RA-RUs minus one. The More RA-RU subfield is set to a first state (e.g., 1) to indicate that RA-RUs of the type indicated by the AID12 subfield in this User Info field are allocated in subsequent Trigger frames that are sent until the end of the TWT SP in which the Trigger frame carrying this field is sent; otherwise this subfield is set to a second state (e.g., 0). The More RA-RU subfield is reserved if the More TF field in the Common Info field is set to 0.

8.6. Unicast TXOP Access Request Trigger Frame

Figure 53:
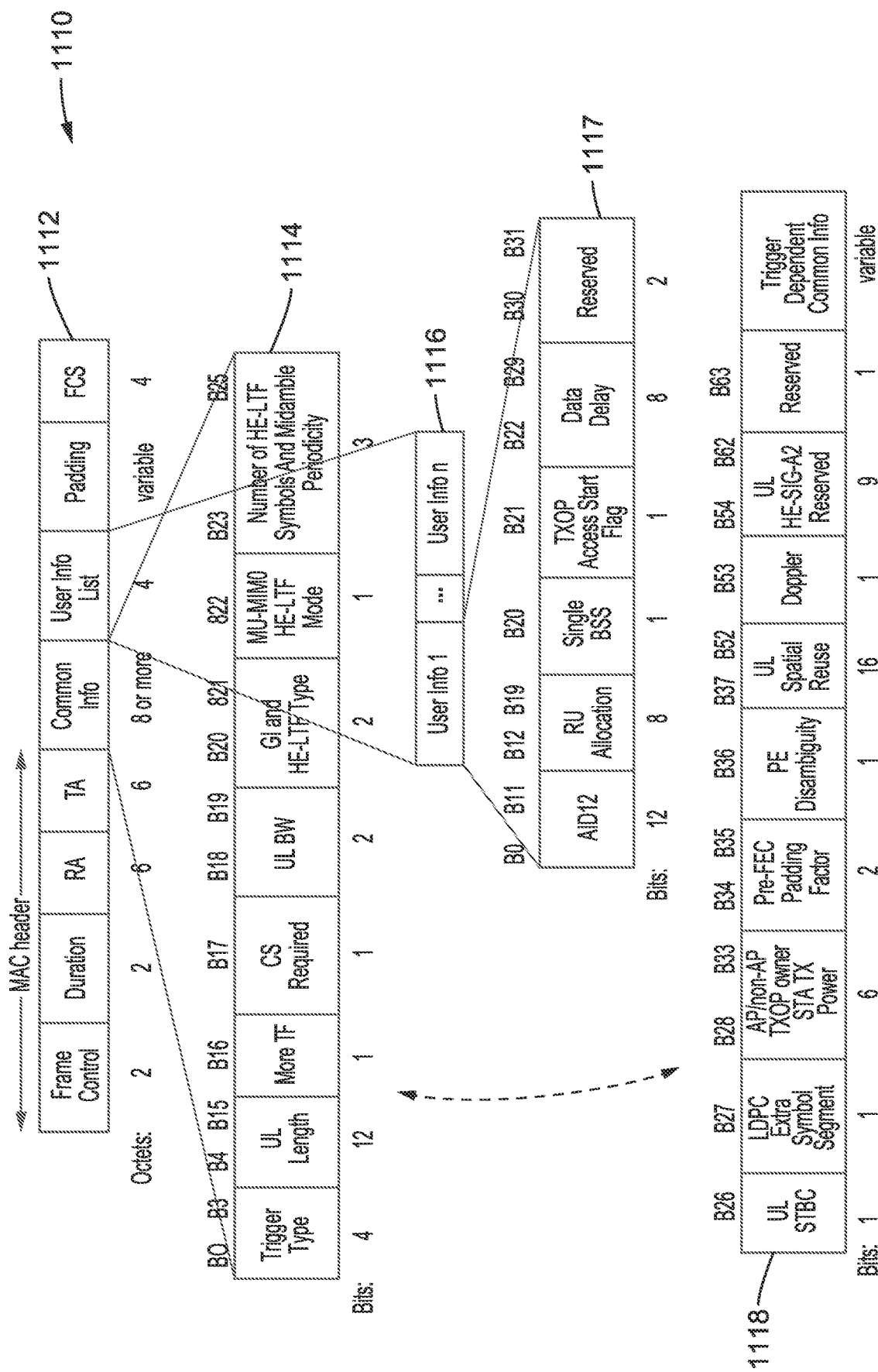
FIG. 53 is a data field diagram of a unicast TXOP access request trigger frame format according to at least one embodiment of the present disclosure.

FIG. 53 illustrates an example embodiment 1110 of a unicast TXOP access request trigger frame format, at least one embodiment of which has the following fields 1112. A Frame control field indicates the type of frame. A Duration field contains NAV information used for CSMA/CA channel access. An RA field contains a MAC address for the recipient of the frame. A TA field contains the MAC address of the STA that transmitted the frame. A Common Information field is described below 1114 and extending 1118. A User Info field having subfields described below 1116. The frame is exemplified here with padding and an FCS.

The Common Info field has the following 1114 subfields. The fields/subfields which are not described have the same function as described for data structures previously described herein, such as seen in FIG. 50 and FIG. 52. A Trigger Type subfield, which was previously a reserved field, is utilized for indicating the type of trigger frame, which in this case is a Unicast TXOP access request trigger frame and by way of example is set to 9 in this specific example.

The following is true for a single BSS scenario. (a) After sending out the last (indicated by the TXOP Access Start Flag subfield) Unicast TXOP access request trigger frame, the TXOP holder STA unicasts UL data to the AP in the reserved RUs. (b) After receiving the last Unicast TXOP access request trigger frame (even if the destination is another STA), the TXOP share participant STAs unicasts UL data to the AP in the assigned RUs.

In data segment 1118 an AP/non-AP TXOP owner STA Tx Power subfield indicates, in units of dBm, the AP (for the dynamic scenario with AP as the coordinator) or the non-AP TXOP holder STA's (for the dynamic scenario without AP as coordinator) combined transmit power at the antenna connectors of all the transmit antennas used to transmit the Trigger frame and normalized to 20 MHz bandwidth.

Turning to the User Field, the list of user information subfields are seen in 1116, each of which contains the subfields 1117. The fields/subfields which are not described have the same function as described for previously described data structures, such as seen in FIG. 50 and FIG. 52. The AID12 subfield (e.g., values from 1 to 2007) of the User Info field is addressed to an associated STA whose AID is equal to the value in the AID12 subfield. This STA is the shared TXOP participant STA. An RU Allocation subfield along with the UL BW subfield in the Common Info field identifies the size and the location of the RU. A Single BSS subfield indicates if the Unicast TXOP access request trigger frame is sent in a single BSS scenario or an OBSS scenario. For Single BSS scenario, A TXOP Access Start Flag subfield is used to indicate the last Unicast TXOP access request trigger frame. A Data Delay subfield will not be used in this example. For OBSS scenarios, the Data Delay subfield is used to indicate a delay to transmit DATA. Similarly, a TXOP Access Start Flag subfield will not be used in this example.

The TXOP Access Start Flag subfield indicates if this unicast TXOP access request Trigger frame is sent to the last TXOP share participant STA by the TXOP holder. If this is the last one, it is set it to a first state (e.g., 1); otherwise it is set to a second state (e.g., 0). For each TXOP share participant STA who receives an unicast TXOP access request Trigger, even if the frame is not send to it, the STA still checks the TXOP Access Start Flag subfield. If this field is set to the second state, then the STA retains the DATA; otherwise if this field is set to the first state, then the STA sends out its DATA to the AP. The Data Delay subfield indicates the delay between the non-AP STAs sending out/receiving a Unicast TXOP access request trigger frame to send out UL DATA.

8.7. Broadcast TXOP Access Request Trigger Frame

Figure 54:
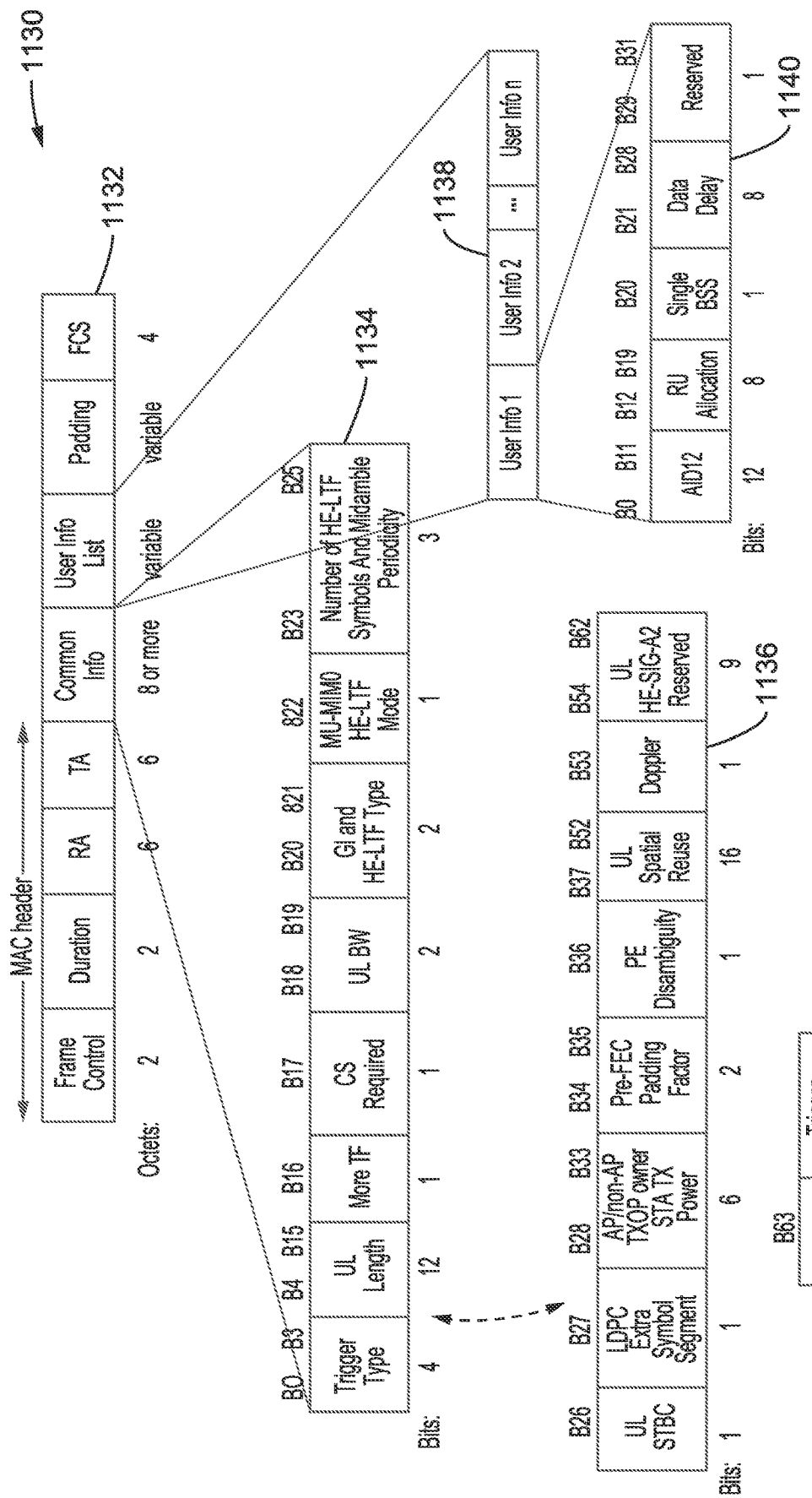
FIG. 54 is a data field diagram of a broadcast TXOP access request trigger frame format according to at least one embodiment of the present disclosure.

FIG. 54 illustrates an example embodiment 1130 of a broadcast TXOP access request trigger frame format 1132, at least one embodiment of which has the following fields. A Frame control field indicates the type of frame. A Duration field contains NAV information used for CSMA/CA channel access. An RA field contains a MAC address for the recipient of the frame. A TA field contains the MAC address for the STA that transmitted the frame. A Common Information field is described below 1134 and extending 1136 and 1142. A User Info field having subfields 1138 and 1140 is described below. The frame is exemplified here with padding and an FCS.

The Common Info field has the following subfields 1134. The fields/subfields which are not described have the same function as described for previously described data structures, such as seen in FIG. 50 and FIG. 52. A Trigger Type subfield of the Common Info field is set by way of example and not limitation to 10 in this example to indicate that it is a Broadcast TXOP access request trigger frame.

The following is true for a single BSS scenario. (a) After sending out the Broadcast TXOP access request trigger frame, the TXOP holder STA unicasts UL data to the AP in the reserved RUs. (b) After receiving the Broadcast TXOP access request trigger frame, the TXOP share participant STAs unicasts UL data to the AP in the assigned RUs.

Continuing with subfields 1136, an AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

The User Info List field has the following subfields 1138 and 1140. Multiple user information may be retained 1138, each of which has the format exemplified in 1140. An AID12 subfield (e.g., value range 1 to 2007) of the User Info field is addressed to an associated STA whose AID is equal to the value in the AID12 subfield. This STA is the shared TXOP participant STA. An RU Allocation subfield along with the UL BW subfield in the Common Info field identifies the size and the location of the RU. A Data Delay subfield indicates the delay duration for the non-AP STA whose AID is equal to the value in the AID12 subfield to send UL DATA.

8.8. CTS-to-Self-Share

Figure 55:
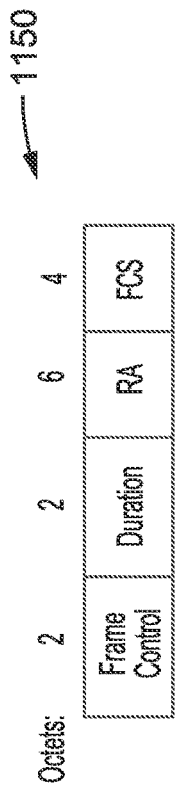
FIG. 55 is a data field diagram of a CTS-to-self-share frame format according to at least one embodiment of the present disclosure.

FIG. 55 illustrates an example embodiment 1150 of a CTS-to-self-share frame format, at least one embodiment of which has the following fields. A Frame control field indicates the type of frame. A Duration field contains NAV information used for CSMA/CA channel access. An RA field contains a MAC address for the recipient of the frame.

In a single BSS scenario, a TXOP holder STA may first unicast a CTS-to-self frame to the AP with the RA field equal to its own MAC address to reserve the medium for a TXOP transmission. When the AP receives the CTS-to-self-share frame, it broadcasts a MU-RTS-share frame to the potential TXOP share participant STAs.

The NAV can be set in the duration field of the CTS-to-self-share frame. Set up Bit 0-13 contain a NAV duration value, which ranges from 1-16,383. Set up Bit 14-15 as 01, which indicate the sharing information. It means the TXOP holder is willing to share the TXOP with other STAs. The AP receives the CTS-to-self frame from a TXOP holder STA and sends an MU-RTS-share frame to the potential TXOP share participant STAs.

8.9. TXOP Participant Announcement Frame

Figure 56:
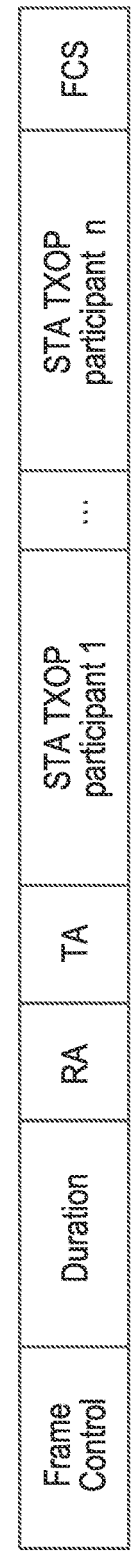
FIG. 56 is a data field diagram TXOP participant announcement frame according to at least one embodiment of the present disclosure.

FIG. 56 illustrates an example embodiment 1170 of a frame format of the TXOP participant announcement frame, at least one embodiment of which has the following fields. A Frame control field indicates the type of frame. A Duration field contains NAV information used for CSMA/CA channel access. An RA field contains a MAC address for the recipient of the frame. A TA field contains the MAC address of the STA that transmitted the frame. One or more STA TXOP participant fields (e.g., 1-n) are incorporated as are seen in FIG. 57 and described below.

Figure 57:
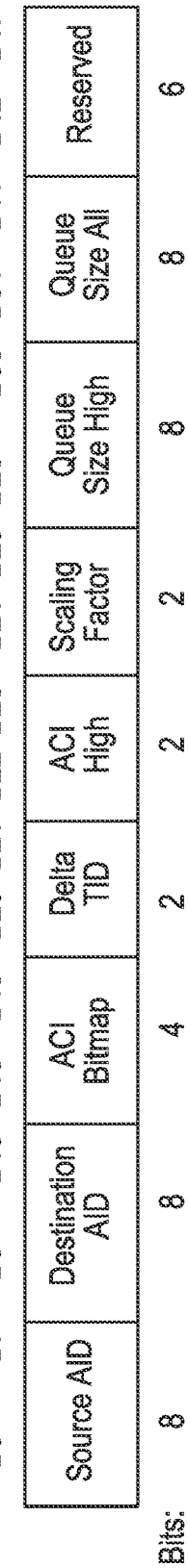
FIG. 57 is a data field diagram of a STA TXOP participant field according to at least one embodiment of the present disclosure.

FIG. 57 illustrates an example embodiment 1190 of a frame format of the STA TXOP participant field format known by AP/TXOP holder with the periodical exchange of BSRP and BSR frames, at least one embodiment of which has the following fields. A Source AID and Destination AID subfield indicate the AID of the source STA and the destination STA, respectively. An ACI Bitmap subfield indicates the access categories for which the buffer status is reported.

A Delta TID subfield, together with the values of the ACI Bitmap subfield, indicate the number of TIDs for which the STA is reporting the buffer status. An ACI High subfield indicates the ACI of the AC for which the frame is indicated in the Queue Size High subfield. A Scaling Factor (SF) subfield indicates the SF units, in octets, of the Queue Size High and Queue Size All sub-fields. A Queue Size High subfield indicates the amount of buffered traffic, in units of SF octets, for the AC identified by the ACI High subfield that is intended for the STA identified by the receiver address of the frame containing the Frame Control subfield. A Queue Size All subfield indicates the amount of buffered traffic, in units of SF octets, for all the ACs identified by the ACI Bitmap subfield that is intended for the STA identified by the receiver address of the frame containing the Frame Control subfield.

8.10. TXOP Access Scheduler Trigger Frame

Figure 58:
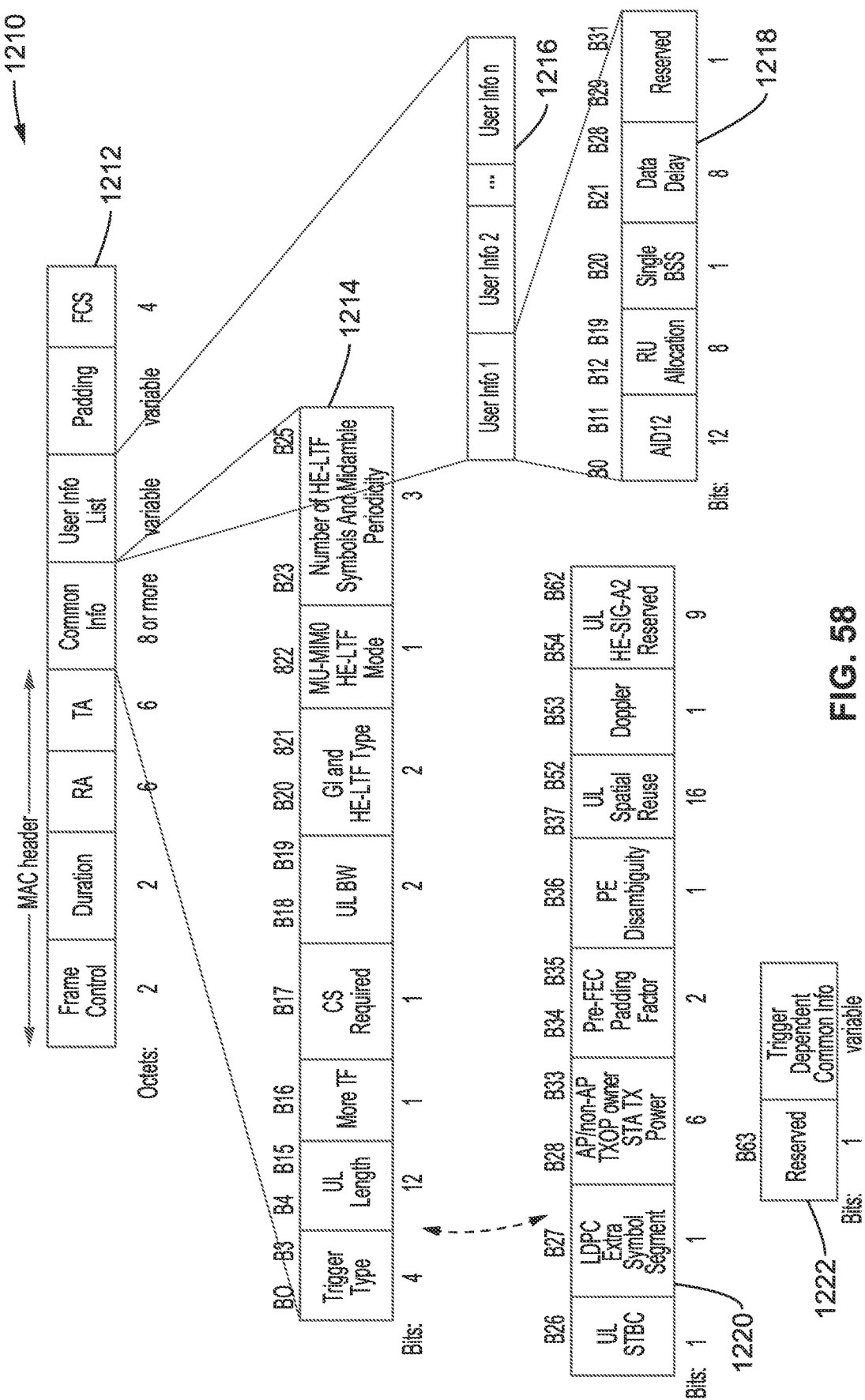
FIG. 58 is a data field diagram of a TXOP access scheduler trigger frame format according to at least one embodiment of the present disclosure.

FIG. 58 illustrates an example embodiment 1210 of a TXOP access scheduler trigger frame format 1212, at least one embodiment of which has the following fields. A Frame control field indicates the type of the frame. A Duration field contains NAV information used for CSMA/CA channel access. An RA field contains a MAC address for the recipient of the frame. A TA field contains the MAC address of the STA that transmitted the frame. A Common Information field is described below 1214 and extending 1220 and 1222. A User Info field having subfields is described below 1216 and 1218. The TXOP access scheduler trigger frame is exemplified here with padding and an FCS.

The Common Info field includes the following subfields 1214. A Trigger Type subfield (using bits which were previously reserved) of the Common Info field is set to indicate that it is a TXOP access scheduler trigger frame, which is set to 11 by way of example and not limitation.

The trigger type subfield is used in a single BSS scenario as follows. (1) After sending out the TXOP access scheduler trigger frame, the TXOP holder STA unicasts UL data to the AP after receiving the last Unicast TXOP access request trigger frame. (2) After receiving the TXOP access scheduler trigger frame, the AP sends a Unicast TXOP access request trigger frame to each TXOP share participant STA. The AP sets the TXOP Access Start Flag subfield to a first state (e.g., 1) when sending the last Unicast TXOP access request trigger frame.

In 1220 it is seen that an AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth. The fields/subfields which are not described have the same function as for the data structures previously described herein.

The User Info List field has the following subfields 1216 and 1218. A list of user fields is shown 1216, each of which contains information seen in 1218, including the following subfields. An AID12 subfield (e.g., value range 1-2007) of the User Info field is addressed to an associated STA whose AID is equal to the value in the AID12 subfield. This STA is the shared TXOP participant STA. An RU Allocation subfield along with the UL BW subfield in the Common Info field identifies the size and the location of the RU. A Data Delay subfield of the User Info field indicates the delay duration for the non-AP STA whose AID is equal to the value in the AID12 subfield to send UL DATA.

8.11. TXOP Priority Trigger Frame

Figure 59:
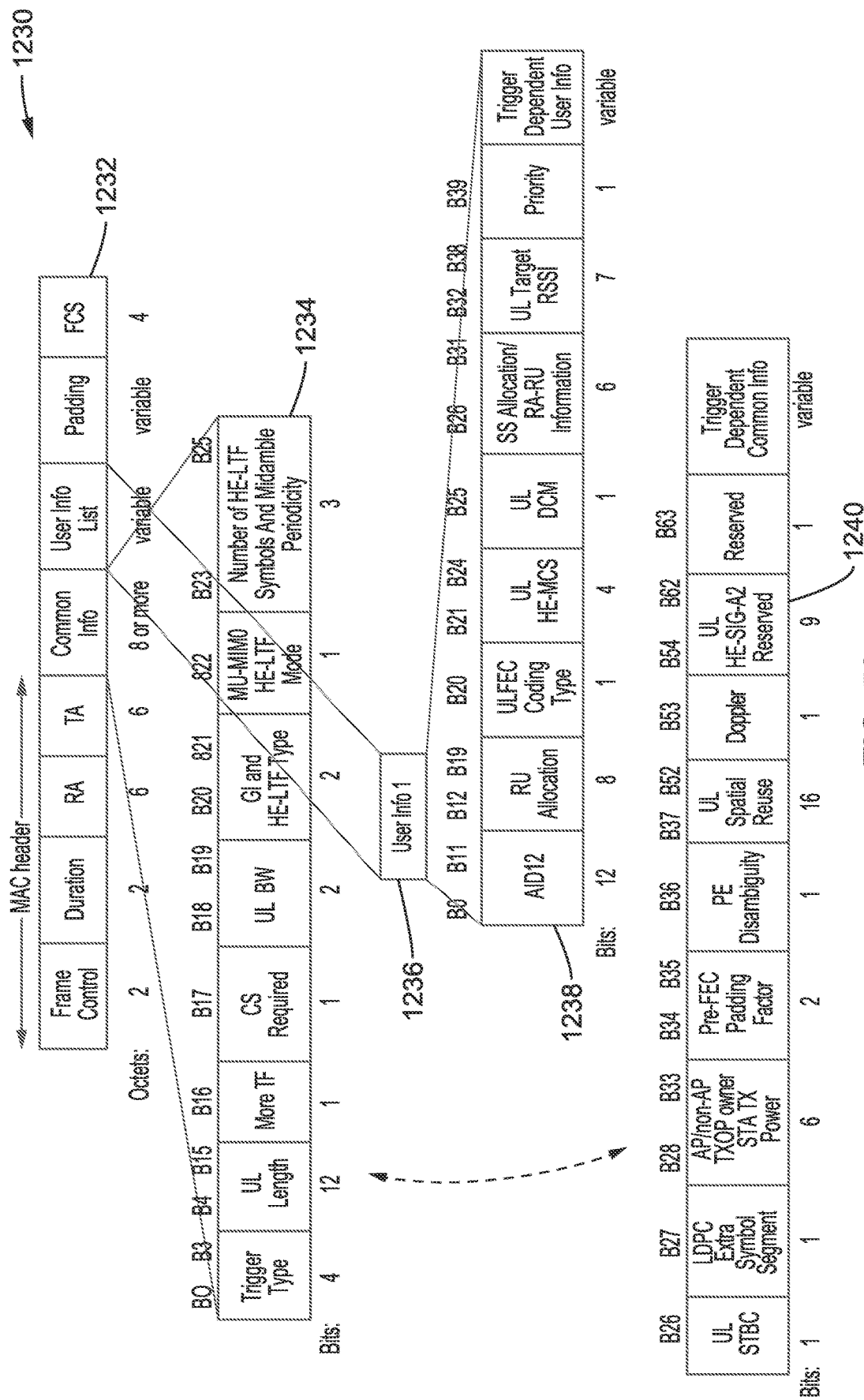
FIG. 59 is a data field diagram of a TXOP priority trigger frame format according to at least one embodiment of the present disclosure.

FIG. 59 illustrates an example embodiment 1230 of a TXOP priority trigger frame format, at least one embodiment of which has the following fields. A Frame control field indicates the type of frame. A Duration field contains NAV information used for CSMA/CA channel access. An RA field contains a MAC address for the recipient of the frame. A TA field contains the MAC address of the STA that transmitted the frame. A Common Information field is described below 1234 and extending 1240. A User Info field is described below with subfields 1236 and 1238. The frame is exemplified here with padding and an FCS.

The Common Info field includes the following subfields 1234, and the fields/subfields which are not described have the same function as data structures previously described herein. A Trigger Type subfield of the Common Info field (using bits which were previously reserved) is set to indicate that this is a TXOP Priority trigger frame, and by way of example and not limitation it has been set to 12.

The TXOP holder STA will reserve RUs for itself and share the remaining RUs with other STAs. After unicasting the TXOP Priority trigger frame to AP, the TXOP holder waits for the trigger frame from the AP with the scheduled TXOP access information. After receiving the TXOP Priority trigger frame, the AP performs shared TXOP access scheduling and trigger UL transmission, and the AP should allocate more resources for the TXOP holder STA.

Continuing in subfields 1240, An AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

Turning to the User Info List field, the subfields 1236 and 1238 are seen. The fields/subfields which are not described have the same function as data structures previously described herein. Multiple user information can be retained 1236 (here shown with only one for an example), each of which has the format exemplified in 1238. The AID12 subfield (e.g., having a value range of 1 to 2007) of the User Info field is addressed to an associated STA whose AID is equal to the value in the AID12 subfield; thus STA is the shared TXOP participant STA.

An RU Allocation subfield along with the UL BW subfield in the Common Info field identifies the size and the location of the RU.

The Priority subfield of the User Info field indicates the priority of the STA that sent the TXOP Priority Trigger frame. When set to a first state (e.g., 1), it indicates that the sender is the TXOP holder, thus the AP should assign a sufficient RU size which cannot be less than the RU size indicated by the RU Allocation subfield and the UL BW subfield.

8.12. TXOP Holder Configuration

FIG. 60 illustrates an example embodiment 1250 of a TXOP holder configuration frame format, at least one embodiment of which has the following fields. A STA TXOP Access Allocation field indicates the TXOP access allocation for each specific STA. After the AP receives the TXOP holder configuration frame, the AP records the STA TXOP Access Allocation information and sends an acknowledgement frame to the STA.

FIG. 61 illustrates an example embodiment 1270 of a frame format of the STA TXOP Access Allocation field illustrated in FIG. 60, at least one embodiment of which has the following fields. The TXOP Holder MAC Address subfield indicates the MAC address of the TXOP holder. A TXOP Participant MAC Address subfield indicates the MAC address of the TXOP share participant STA. An Allocation Control Info subfield indicates the TXOP resource allocation for the specific TXOP share participant STA and is shown in FIG. 62.

FIG. 62 illustrates an example embodiment 1290 of a priority subfield of the Allocation Control Info subfield which indicates the priority of the traffic of the TXOP share participant STA, at least one embodiment of which has the following subfields. An AID12 subfield (e.g., value range form 1 to 2007) subfield of the Allocation Control Info subfield indicates the Allocation Control Info subfield is addressed to an associated STA whose AID is equal to the value in the AID12 subfield. A UL BW subfield of the Allocation Control Info subfield indicates the bandwidth in the HE-SIG-A of the HE TB PPDU. An RU Allocation subfield along with the UL BW subfield identifies the size and the location of the assigned RU.

8.13. TXOP Access Configuration

Figure 63:
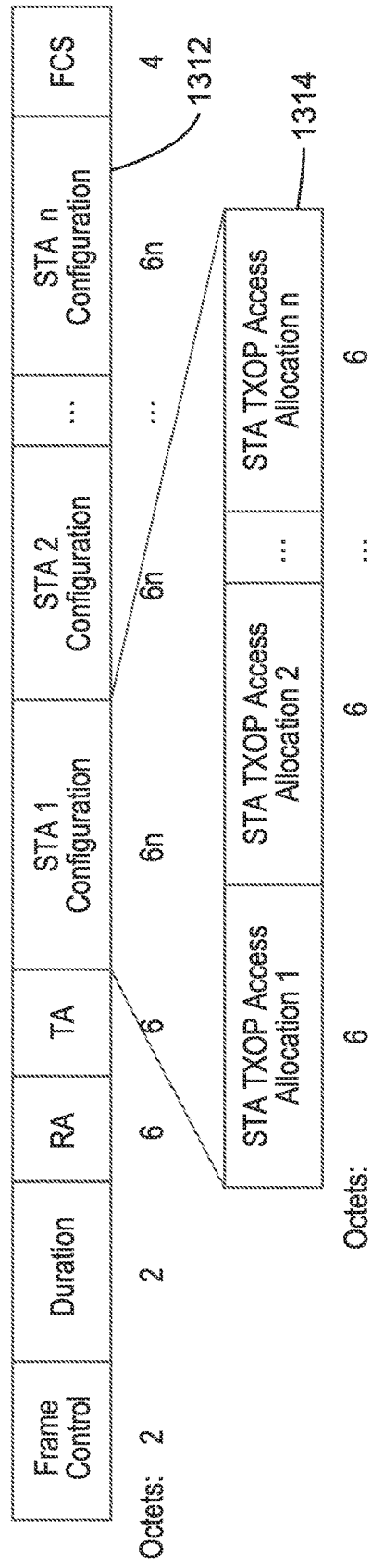
FIG. 63 is a data field diagram of a TXOP access configuration frame format according to at least one embodiment of the present disclosure.

FIG. 63 illustrates an example embodiment 1310 of a TXOP access configurations frame format, at least one embodiment of which has the following fields 1312. The Frame Control, Duration, RA and TA are utilized as described in previous sections. There can be multiple STA Configuration fields (e.g., 1 through n) indicating the configuration for each non-AP STA. The STA Configuration field format is illustrated in the lower portion of the FIG. 1314, which include TXOP Access Allocation for each non-AP STA as was shown in FIG. 61. The STAs send DATA to the AP using the allocated RU after receiving a trigger from either the TXOP holder (without using the AP as coordinator) or from the associated AP (with the AP as a coordinator).

8.14. TXOP Share Request Trigger

Figure 64:
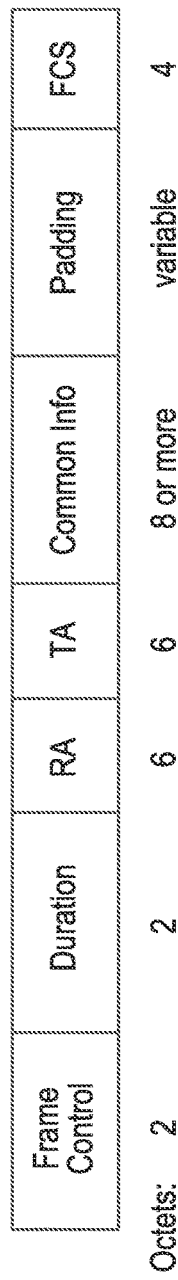
FIG. 64 is a data field diagram is a TXOP share request trigger frame according to at least one embodiment of the present disclosure.

FIG. 64 illustrates an example embodiment 1330 of a TXOP share request trigger frame format, at least one embodiment of which has the following fields. The Frame Control, Duration and Common Info are as described in previous sections, while the User Info fields are not needed in this TXOP share request trigger frame format. A TA field contains the MAC address of the transmitter station, which should be set as the MAC address of the TXOP holder. An RA field is the MAC address of the receiver which operates as follows.

In the scenario without the AP as coordinator, the RA field is set as the broadcasting MAC address (ff:ff:ff:ff:ff:ff). The TXOP holder broadcasts the TXOP share request trigger frame. Once the TXOP share participant STAs receives this frame, they should send UL DATA to the associated AP by using the assigned RU as configured in the Shared TXOP configuration stage. The TXOP holder sends UL DATA to the associated AP using the reserved RU after sending the TXOP shared request trigger frame.

In the scenario which uses the AP as coordinator, the RA field is set as the MAC address of the associated AP. The TXOP holder unicasts the TXOP share request trigger frame. Once the AP receives this frame, it broadcasts a TXOP share response trigger frame. All the applicable STAs should then send UL DATA to the associated AP using the assigned RU as configured in the Shared TXOP configuration stage.

8.15. TXOP Share Response Trigger

Figure 65:
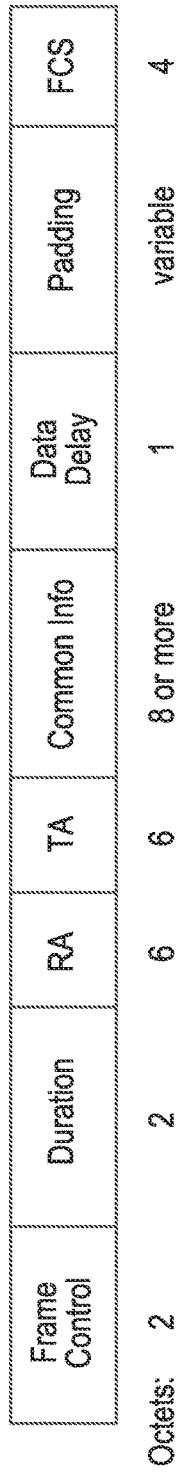
FIG. 65 is a data field diagram a TXOP share response trigger frame format according to at least one embodiment of the present disclosure.

FIG. 65 illustrates an example embodiment 1350 of a TXOP share response trigger frame format, at least one embodiment of which has the following fields. The Frame Control, Duration and Common Info fields are as described in previous sections, while the User Info List field is not needed in the TXOP share request trigger frame format. An RA field is the MAC address of the receiver, which in the scenario of using the AP as coordinator, is set as the broadcasting MAC address (ff:ff:ff:ff:ff:ff). The Data Delay field indicates a delay duration between the reception of the TXOP share response trigger to the transmission of the UL DATA in the OBSS scenario.

9. General Scope of Embodiments

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were selectively depicted for the sake of simplicity of illustration, as one of ordinary skill in the art recognizes the use of computer devices for carrying out steps involved with digital wireless communications. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

It should be appreciated that blocks at the beginning and end of these flowcharts, such as "Start" and "Stop" do not infer that the instructions are confined to a specific routine, or that it has an actual start and stop, per se, but are merely provided as points of reference in relation to executing steps involved in the process. The associated instructions for these process steps may be executed without limitation within various routines, tasks, slices, threads, and so forth, and these steps can be combined with steps to perform other functions, or can be extended to provide additional functionality, without departing from the teachings of the present disclosure.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, comprising: (a) a wireless communication circuit configured as a first station for wirelessly communicating with at least one other station; (b) a processor coupled to said wireless communication circuit within a station configured for operating on a wireless network; (c) a non-transitory memory storing instructions executable by the processor; and (d) wherein said instructions, when executed by the processor, perform sharing of a transmit opportunity (TXOP) by a non-access point (non-AP) station with other stations in a single basic-service-set (BSS) scenario in a frequency domain, by performing steps comprising: (d)(i) exchanging messages with an access point (AP) station to inform the AP, and/or gain approval by the AP, in sharing its TXOP with other stations; (d)(ii) exchanging information with other stations to indicate that a TXOP is available to be shared and identify the non-AP shared TXOP participant stations based on received responses; and (d)(iii) sending a message to non-AP shared TXOP participant stations that are willing to join the following shared TXOP, wherein the message contains information for each non-AP shared TXOP participant station of a resource unit (RU) to be utilized in transmitting upload (UL) data during the shared TXOP during channel access.

An apparatus for wireless communication in a network, comprising: (a) a wireless communication circuit configured as a first wireless station for wirelessly communicating with at least one other station; (b) a processor of said first station configured for operating on a wireless network; (c) a non-transitory memory storing instructions executable by the processor; and (d) wherein said instructions, when executed by the processor, perform sharing of a transmit opportunity (TXOP) by a non-access point (non-AP) station with other stations in a single basic-service-set (BSS) scenario in a frequency domain, by executing steps comprising: (d)(i) exchanging messages with an access point (AP) station to inform the AP station, and/or gain approval by the AP station, in sharing its TXOP with other stations; (d)(ii) upon the first station gaining access to the channel as a TXOP holder it exchanges information with other stations through the coordination of the AP station to indicate a coming TXOP is available to be shared and identify the other stations that are willing to join the coming shared TXOP; and (d)(iii) sending a message to non-AP shared TXOP participant stations that are willing to join the following shared TXOP through the coordination of the AP station and indicating the RU that each of those non-AP shared TXOP participant stations should use to transmit UL DATA when the channel is accessed.

An apparatus for wireless communication in a network, comprising: (a) a wireless communication circuit configured as a first wireless station for wirelessly communicating with at least one other station; (b) a processor of said first station configured for operating on a wireless network; (c) a non-transitory memory storing instructions executable by the processor; and (d) wherein said instructions, when executed by the processor, perform sharing of a transmit opportunity (TXOP) by a non-access point (non-AP) station with other stations in a single basic-service-set (BSS) scenario in a frequency domain, performing steps comprising: (d)(i) determining, by each non-AP station, which of the other non-AP stations can access its shared TXOP if it will be the shared TXOP holder; (d)(ii) communicating the advertised configuration of RU allocation and order of access of each potential shared TXOP participant station through the coordination of AP station as a semi-static configuration; and (d)(iii) accessing, by each non-AP station, the shared TXOP that was initiated by a specific shared TXOP holder station according to the advertised semi-static configuration.

A STA obtaining a TXOP in a wireless LAN network sharing its TXOP with other STAs in a single BSS in frequency domain by performing steps comprising: (a) exchanging messages with the AP to inform and/or gain approval of sharing its TXOP with other non-AP STAs; (b) upon gaining access to the channel, exchange information with other STAs through the coordination of the APs to indicate the coming TXOP is available to be shared and identify the STAs who is willing to join the coming shared TXOP.

A STA obtaining a TXOP in a wireless LAN network sharing its TXOP with other STAs in a single BSS scenario in frequency domain by performing steps comprising: (a) exchanging messages with an AP to inform and/or gain approval of sharing its TXOP with other STAs; (b) upon gaining access to the channel, exchange information with other STAs to indicate the coming TXOP is available to be shared and identify the non-AP shared TXOP participant STAs based on the responses; (c) sending a message to non-AP shared TXOP participant STAs that willing to join the following shared TXOP and inform the RU that each non-AP shared TXOP participant STA should use to transmit UL DATA when the channel access happens; (d) Non-AP STAs exchange information of TXOP shareability through the exchange of management frames (such as authentication/ association request/response frame and beacon frames) with the coordination of AP; (e) AP and non-AP STAs periodically exchange the traffic information with BSRP and BSR frames; and (f) after channel sounding, the TXOP holder STA sends MU-RTS-share frames to other STAs and receives CTS-share frames from those STAs who willing to join the following shared TXOP.

The apparatus or method of any preceding implementation, wherein said non-AP stations exchange information about TXOP shareability through an exchange of management frames with the coordination of the AP station.

The apparatus or method of any preceding implementation, wherein said management frames are selected from the group of message frames consisting of authentication frames, association frames, request frames, response frames and beacon frames.

The apparatus or method of any preceding implementation, wherein said instructions when executed by the processor further comprises non-AP and AP stations periodically exchanging traffic information.

The apparatus or method of any preceding implementation, wherein said traffic information is exchanged utilizing a combination of buffer status report polling (BSRP) frames and buffer status report (BSR) frames.

The apparatus or method of any preceding implementation, wherein said instructions when executed by the processor further comprises performing channel sounding by a TXOP holder station which sends MU-RTS-share frames to other stations and receives CTS-share frames from those other stations that are willing to join a following shared TXOP.

The apparatus or method of any preceding implementation, wherein said instructions when executed by the processor further comprises a TXOP holder station initiating a shared TXOP access by sending a trigger frame, selected from the group of messages consisting of: (a) a unicast TXOP access request trigger sent to each specific station with an assigned RU; (b) a broadcast TXOP access request trigger sent to all non-AP shared TXOP participant stations with distribution of RU information indicated for each of them; and (c) a TXOP random access request trigger that broadcasts to other stations and triggers random access of other stations using the shared RU.

The apparatus or method of any preceding implementation, wherein other TXOP participant stations, upon receiving the trigger frame from the TXOP holder station, perform accessing of the channel according to access information contained in the trigger frame.

The apparatus or method of any preceding implementation, wherein said exchanging information of TXOP shareability is performed through the exchange of management frames with coordination by the AP station.

The apparatus or method of any preceding implementation, wherein said management frames are selected from the group of frames consisting of authentication frames, association frames, request frames, response frames, and beacon frames.

The apparatus or method of any preceding implementation, wherein said instructions when executed by the processor further comprises periodically exchanging buffer status and traffic priority information between non-AP stations and AP stations.

The apparatus or method of any preceding implementation, wherein said buffer status and traffic priority information is exchanged by utilizing a combination of buffer status report polling (BSRP) frames and buffer status report (BSR) frames.

The apparatus or method of any preceding implementation, wherein said instructions when executed by the processor further comprises receiving a CTS-to-self-share frame from the non-AP TXOP holder station by the AP station which sends MU-RTS-share frames to other stations and receives CTS-share frames from those other stations that are willing to join the following shared TXOP, wherein the AP station sends participant information to the non-AP TXOP holder station in a TXOP participant announcement frame.

The apparatus or method of any preceding implementation, wherein said instructions when executed by the processor comprises the non-AP TXOP holder station initiating access of the shared TXOP by: (a) sending TXOP access scheduler trigger frame to the AP station which indicates the assignment of the RU for each of the other stations sharing the coming TXOP; or (b) sending a TXOP priority trigger frame to the AP station, wherein the TXOP priority trigger frame indicates the priority to the TXOP holder and allows the AP station to schedule RU distribution.

The apparatus or method of any preceding implementation, wherein said instructions when executed by the processor further perform one or more steps comprising upon an AP station receiving the TXOP access scheduler trigger, performs steps comprising: (a) unicasting TXOP access request triggers to each specific station with an assigned RU for it; or (b) broadcasting TXOP access request triggers to all the non-AP shared TXOP participant stations wherein said TXOP access request triggers contain distributing assigned RU for each of them.

The apparatus or method of any preceding implementation, wherein the AP station receiving the TXOP priority trigger, performs steps comprising: (a) scheduling is performed based on the latest traffic information indicated in BSR frames from each other station, and triggers UL transmission with a Basic trigger; or (b) broadcasting the TXOP random access request trigger to non-AP stations and triggers random access of non-AP shared TXOP participant stations to access the channel using RA-RUs.

The apparatus or method of any preceding implementation, wherein said instructions when executed by the processor further comprises the AP station triggering the non-AP TXOP holder station to access the channel using the reserved RU.

The apparatus or method of any preceding implementation, wherein upon receiving a trigger frame from the AP, the non-AP TXOP share participant stations perform accessing the channel according to the access information indicated in the trigger frame, and wherein the non-AP TXOP holder STA performs accessing the channel using the reserved RU.

The apparatus or method of any preceding implementation, wherein said instructions when executed by the processor further comprises executing a setup procedure by the non-AP stations to set up semi-static configurations by: (a) non-AP stations exchanging share offer/request frame with other non-AP stations through the coordination of the AP station; (b) AP station forwarding the shareability information of a non-AP station to all other non-AP stations; (c) non-AP stations exchanging the configuration of a semi-static TXOP sharing schedule with all other non-AP stations through the coordination of the AP station; and (d) the AP station forwards the shared TXOP access information to all non-AP stations with the TXOP access configuration frame.

The apparatus or method of any preceding implementation, wherein said instructions when executed by the processor further comprises the non-AP station performing sharing its TXOP with other non-AP stations according to an advertised allocation schedule.

The apparatus or method of any preceding implementation, wherein said instructions when executed by the processor further comprises obtaining the channel by the non-AP TXOP holder station and performing: (a) broadcasting a TXOP share request trigger without the AP station as coordinator; or (b) unicasting a TXOP share request trigger to the AP station with the AP station as coordinator; and wherein in response to (b) the AP station broadcasts a TXOP share response trigger.

The apparatus or method of any preceding implementation, wherein upon receiving a broadcast TXOP share request frame by the non-AP station, the non-AP station performs accessing the channel based on the advertised RU allocation.

The apparatus or method of any preceding implementation, wherein sending messages to non-AP shared TXOP participant STAs that willing to join the following shared TXOP through the coordination of AP and inform the RU that each non-AP shared TXOP participant STA should use to transmit UL DATA when the channel access happens.

The apparatus or method of any preceding implementation, wherein STAs exchange information of TXOP shareability through the exchange of management frames (such as authentication/association request/response and beacon frames) with the coordination of AP.

The apparatus or method of any preceding implementation, wherein the AP and non-AP STAs periodically exchanges buffer status and traffic priority information with the use of BSRP and BSR frames.

The apparatus or method of any preceding implementation, wherein after receiving the CTS-to-self-share frame from the non-AP TXOP holder STA, the AP sends MU-RTS-share frames to other STAs and receives CTS-share frames from those STAs who are willing to join the following shared TXOP; and wherein the AP sends information about participant stations to the non-AP TXOP holder STA with a TXOP participant announcement frame.

The apparatus or method of any preceding implementation, wherein the TXOP holder STA initiates the shared TXOP by sending a trigger frame, comprising: (a) a unicast TXOP access request trigger that sent to each specific STA with assigned RU; (b) a broadcast TXOP access request trigger that sent to all the non-AP shared TXOP participant STAs with distribution of RU information indicated for each of them; or (c) a TXOP random access request trigger that broadcast to other STAs and triggers random access of other STAs with using the shared RU.

The apparatus or method of any preceding implementation, wherein upon receiving the trigger frame from the TXOP holder STA, the other TXOP share participant STAs access the channel according to the access information indicated in the trigger frame.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
    (a) a wireless communication circuit configured as a first station for wirelessly communicating with at least one other station;
    (b) a processor coupled to said wireless communication circuit within a station configured for operating on a wireless network;
    (c) a non-transitory memory storing instructions executable by the processor; and
    (d) wherein said instructions, when executed by the processor, perform sharing of a transmit opportunity (TXOP) by a non-access point (non-AP) station with other stations in a single basic-service-set (BSS) scenario in a frequency domain, by performing steps comprising:
        (i) exchanging messages with an access point (AP) station to inform the AP, and/or gain approval by the AP, in sharing its TXOP with other stations;
        (ii) exchanging information with other stations to indicate that a TXOP is available to be shared and identify the non-AP shared TXOP participant stations based on received responses; and
        (iii) sending a message to non-AP shared TXOP participant stations that are willing to join the following shared TXOP, wherein the message contains information for each non-AP shared TXOP participant station of a resource unit (RU) to be utilized in transmitting upload (UL) data during the shared TXOP during channel access.

2. The apparatus of claim 1, wherein said non-AP stations exchange information about TXOP shareability through an exchange of management frames with the coordination of the AP station.

3. The apparatus of claim 2, wherein said management frames are selected from the group of message frames consisting of authentication frames, association frames, request frames, response frames and beacon frames.

4. The apparatus of claim 1, wherein said instructions when executed by the processor further comprises non-AP and AP stations periodically exchanging traffic information.

5. The apparatus of claim 4, wherein said traffic information is exchanged utilizing a combination of buffer status report polling (BSRP) frames and buffer status report (BSR) frames.

6. The apparatus of claim 1, wherein said instructions when executed by the processor further comprises performing channel sounding by a TXOP holder station which sends MU-RTS-share frames to other stations and receives CTS-share frames from those other stations that are willing to join a following shared TXOP.

7. The apparatus of claim 1, wherein said instructions when executed by the processor further comprises a TXOP holder station initiating a shared TXOP access by sending a trigger frame, selected from the group of messages consisting of: (a) a unicast TXOP access request trigger sent to each specific station with an assigned RU; (b) a broadcast TXOP access request trigger sent to all non-AP shared TXOP participant stations with distribution of RU information indicated for each of them; and (c) a TXOP random access request trigger that broadcasts to other stations and triggers random access of other stations using the shared RU.

8. The apparatus of claim 1, wherein other TXOP participant stations, upon receiving the trigger frame from the TXOP holder station, perform accessing of the channel according to access information contained in the trigger frame.

9. An apparatus for wireless communication in a network, comprising:
(a) a wireless communication circuit configured as a first wireless station for wirelessly communicating with at least one other station;
(b) a processor of said first station configured for operating on a wireless network;
(c) a non-transitory memory storing instructions executable by the processor; and
(d) wherein said instructions, when executed by the processor, perform sharing of a transmit opportunity (TXOP) by a non-access point (non-AP) station with other stations in a single basic-service-set (BSS) scenario in a frequency domain, by executing steps comprising:
(i) exchanging messages with an access point (AP) station to inform the AP station, and/or gain approval by the AP station, in sharing its TXOP with other stations;
(ii) upon the first station gaining access to the channel as a TXOP holder it exchanges information with other stations through the coordination of the AP station to indicate a coming TXOP is available to be shared and identify the other stations that are willing to join the coming shared TXOP; and
(iii) sending a message to non-AP shared TXOP participant stations that are willing to join the following shared TXOP through the coordination of the AP station and indicating the RU that each of those non-AP shared TXOP participant stations should use to transmit UL DATA when the channel is accessed.

10. The apparatus of claim 9, wherein said exchanging information of TXOP shareability is performed through the exchange of management frames with coordination by the AP station.

11. The apparatus of claim 10, wherein said management frames are selected from the group of frames consisting of authentication frames, association frames, request frames, response frames, and beacon frames.

12. The apparatus of claim 9, wherein said instructions when executed by the processor further comprises periodically exchanging buffer status and traffic priority information between non-AP stations and AP stations.

13. The apparatus of claim 12, wherein said buffer status and traffic priority information is exchanged by utilizing a combination of buffer status report polling (BSRP) frames and buffer status report (BSR) frames.

14. The apparatus of claim 9, wherein said instructions when executed by the processor further comprises receiving a CTS-to-self-share frame from the non-AP TXOP holder station by the AP station which sends MU-RTS-share frames to other stations and receives CTS-share frames from those other stations that are willing to join the following shared TXOP, wherein the AP station sends participant information to the non-AP TXOP holder station in a TXOP participant announcement frame.

15. The apparatus of claim 9, wherein said instructions when executed by the processor further comprises the non-AP TXOP holder station initiating access of the shared TXOP by: (a) sending TXOP access scheduler trigger frame to the AP station which indicates the assignment of the RU for each of the other stations sharing the coming TXOP; or (b) sending a TXOP priority trigger frame to the AP station, wherein the TXOP priority trigger frame indicates the priority to the TXOP holder and allows the AP station to schedule RU distribution.

16. The apparatus of claim 9, wherein an AP station receiving the TXOP access scheduler trigger, performs steps comprising: (a) unicasting TXOP access request triggers to each specific station with an assigned RU for it; or (b) broadcasting TXOP access request triggers to all the non-AP shared TXOP participant stations wherein said TXOP access request triggers contain distributing assigned RU for each of them.

17. The apparatus of claim 9, wherein upon the AP station receiving the TXOP priority trigger, performs steps comprising: (a) scheduling is performed based on the latest traffic information indicated in BSR frames from each of the other stations and triggering UL transmissions with a Basic trigger; or (b) broadcasting the TXOP random access request trigger to non-AP stations and triggering random access of non-AP shared TXOP participant stations to access the channel using RA-RUs.

18. The apparatus of claim 17, wherein said instructions when executed by the processor further comprises the AP station triggering the non-AP TXOP holder station to access the channel using the reserved RU.

19. The apparatus of claim 9, wherein upon receiving a trigger frame from the AP, the non-AP TXOP share participant stations perform accessing the channel according to access information indicated in the trigger frame, and wherein the non-AP TXOP holder STA performs accessing the channel using the reserved RU.

20. An apparatus for wireless communication in a network, comprising:
(a) a wireless communication circuit configured as a first wireless station for wirelessly communicating with at least one other station;
(b) a processor of said first station configured for operating on a wireless network;
(c) a non-transitory memory storing instructions executable by the processor; and
(d) wherein said instructions, when executed by the processor, perform sharing of a transmit opportunity (TXOP) by a non-access point (non-AP) station with other stations in a single basic-service-set (BSS) scenario in a frequency domain, performing steps comprising:
(i) determining, by each non-AP station, which of the other non-AP stations can access its shared TXOP if it will be the shared TXOP holder;
(ii) communicating the advertised configuration of RU allocation and order of access of each potential shared TXOP participant station through the coordination of AP station as a semi-static configuration; and
(iii) accessing, by each non-AP station, the shared TXOP that was initiated by a specific shared TXOP holder station according to the advertised semi-static configuration.

21. The apparatus of claim 20, wherein said instructions when executed by the processor further comprises executing a setup procedure by the non-AP stations to set up semi-static configurations by: (a) non-AP stations exchanging share offer/request frame with other non-AP stations through the coordination of the AP station; (b) AP station forwarding the shareability information of a non-AP station to all other non-AP stations; (c) non-AP stations exchanging the configuration of a semi-static TXOP sharing schedule with all other non-AP stations through the coordination of the AP station; and (d) the AP station forwards the shared TXOP access information to all non-AP stations with the TXOP access configuration frame.

22. The apparatus of claim 20, wherein said instructions when executed by the processor further comprises the non-AP station performing sharing its TXOP with other non-AP stations according to an advertised allocation schedule.

23. The apparatus of claim 20, wherein said instructions when executed by the processor further comprises obtaining the channel by the non-AP TXOP holder station and performing: (a) broadcasting a TXOP share request trigger without the AP station as coordinator; or (b) unicasting a TXOP share request trigger to the AP station with the AP station as coordinator; and wherein in response to (b) the AP station broadcasts a TXOP share response trigger.

24. The apparatus of claim 20, wherein upon receiving a broadcast TXOP share request frame by the non-AP station, the non-AP station performs accessing the channel based on the advertised RU allocation.

* * * * *